(12) United States Patent
Kohso et al.

(10) Patent No.: US 7,031,099 B2
(45) Date of Patent: Apr. 18, 2006

(54) HEAD POSITIONER AND INFORMATION RECORDING/REPLAYING APPARATUS

(75) Inventors: Hiroshi Kohso, Osaka (JP); Hideki Kuwajima, Kyoto (JP); Toshio Inaji, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 300 days.

(21) Appl. No.: 10/206,591

(22) Filed: Jul. 29, 2002

(65) Prior Publication Data

US 2003/0030937 A1 Feb. 13, 2003

(30) Foreign Application Priority Data

Jul. 31, 2001 (JP) ............................ P2001-231435
Sep. 6, 2001 (JP) ............................ P2001-270162

(51) Int. Cl.
*G11B 5/596* (2006.01)

(52) U.S. Cl. ..................................... 360/78.05; 360/75
(58) Field of Classification Search .................. 360/75, 360/76, 77.01, 77.02, 77.04, 77.06, 78.01, 360/78.04, 78.09, 78.06, 78.07, 78.05
See application file for complete search history.

(56) References Cited

U.S. PATENT DOCUMENTS

| | | | | | |
|---|---|---|---|---|---|
| 4,374,402 | A | * | 2/1983 | Blessom et al. | 360/266.2 |
| 5,978,752 | A | * | 11/1999 | Morris | 702/186 |
| 6,052,251 | A | | 4/2000 | Mohajerani et al. | |
| 6,072,665 | A | * | 6/2000 | Ferrari et al. | 360/245.9 |
| 6,088,187 | A | | 7/2000 | Takaishi | |
| 6,088,194 | A | * | 7/2000 | Imaino et al. | 360/294.3 |
| 6,160,676 | A | * | 12/2000 | Takaishi | 360/78.05 |
| 6,292,320 | B1 | * | 9/2001 | Mason et al. | 360/63 |
| 6,483,659 | B1 | * | 11/2002 | Kobayashi et al. | 360/78.04 |
| 6,618,215 | B1 | * | 9/2003 | Fung et al. | 360/31 |

FOREIGN PATENT DOCUMENTS

| | | |
|---|---|---|
| JP | 60-35383 | 2/1985 |
| JP | 4-205864 | 7/1992 |
| JP | 08-288564 | 11/1996 |
| JP | 11-232810 | 8/1999 |
| JP | 2000-48503 | 2/2000 |
| JP | 2001-6305 | 1/2001 |
| JP | 2001-6305 A | 1/2001 |
| WO | WO 99/66501 | 12/1999 |

* cited by examiner

*Primary Examiner*—David Hudspeth
*Assistant Examiner*—Jason Olson
(74) *Attorney, Agent, or Firm*—McDermott Will & Emery LLP

(57) ABSTRACT

A head positioner has a configuration employing a dual-stage actuator method, wherein positioning control is performed for a write/read according to cooperative operations of a coarse actuator and a fine actuator, and the fine actuator is configured using a piezoelectric device. A positioning control unit for controlling the coarse actuator and the fine actuator is configured to include a coarse control system including a coarse drive unit for driving the coarse actuator and coarse control unit for controlling the coarse drive unit, a fine control system including a fine drive unit for driving the fine actuator and a fine control unit for controlling the fine drive unit. In addition, a driving-signal limiting unit is provided. The piezoelectric device is prone to property deterioration because of erosion due to an electrochemical reaction. The driving-signal limiting unit limits the level of a fine control signal fed from the fine control unit to the fine drive unit to be below a threshold at which property deterioration of the piezoelectric device is caused by an electrochemical reaction. Further, as a median-value signal, a relative displacement signal ranked in the center of a plurality of relative displacement signals sent from a plurality of the individual fine actuators is selected. The coarse actuator is controlled according to the selected median-value signal.

50 Claims, 47 Drawing Sheets

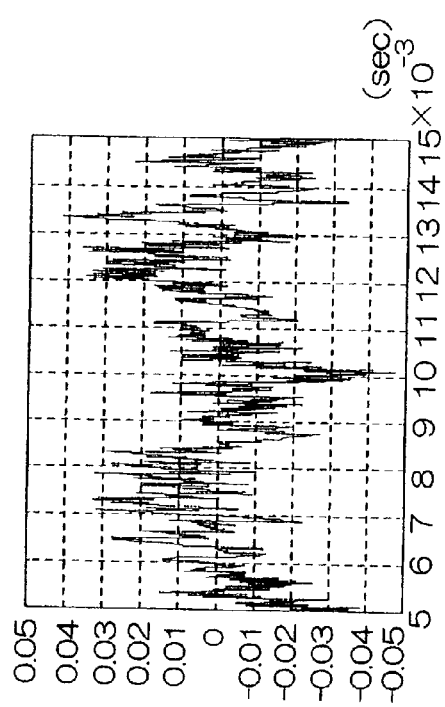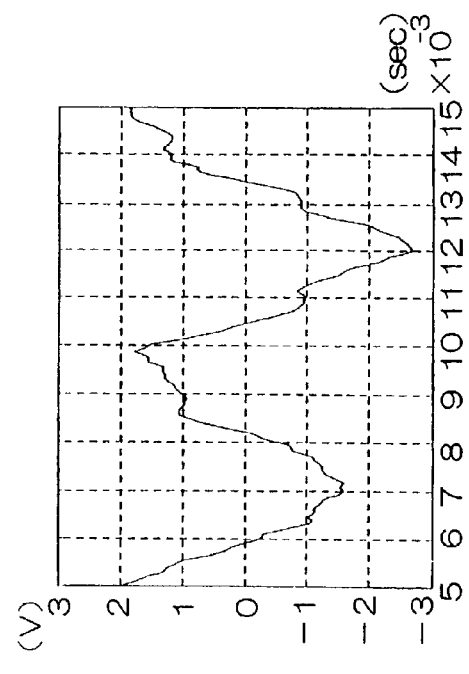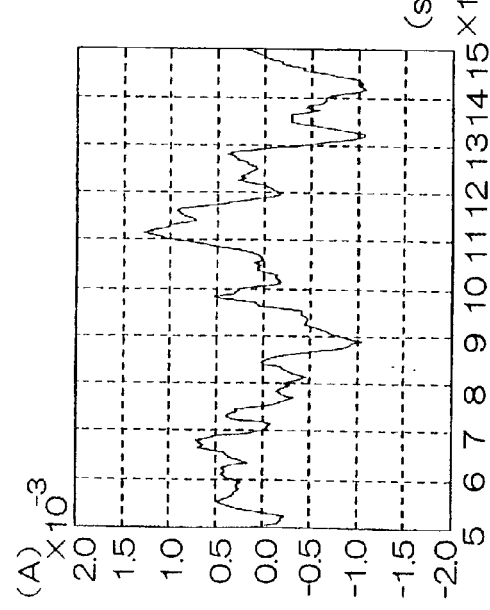

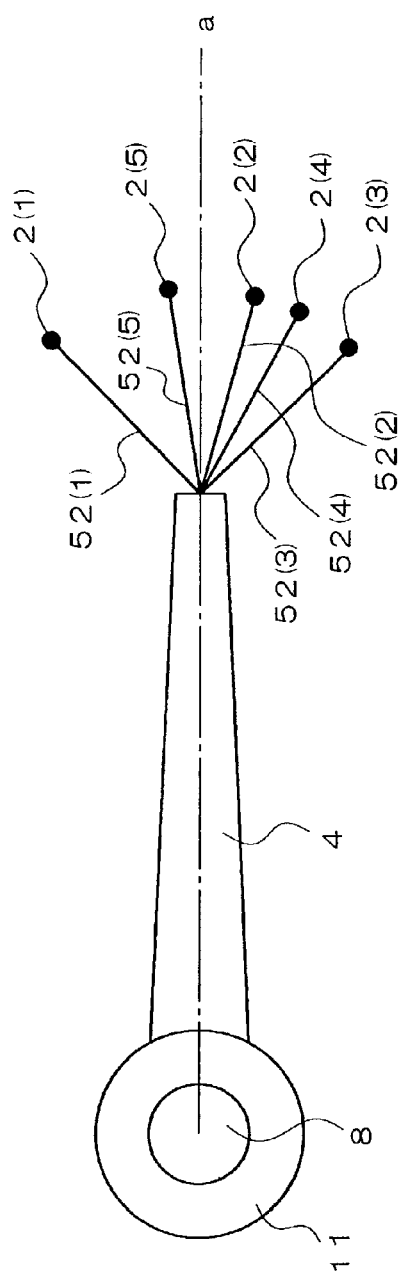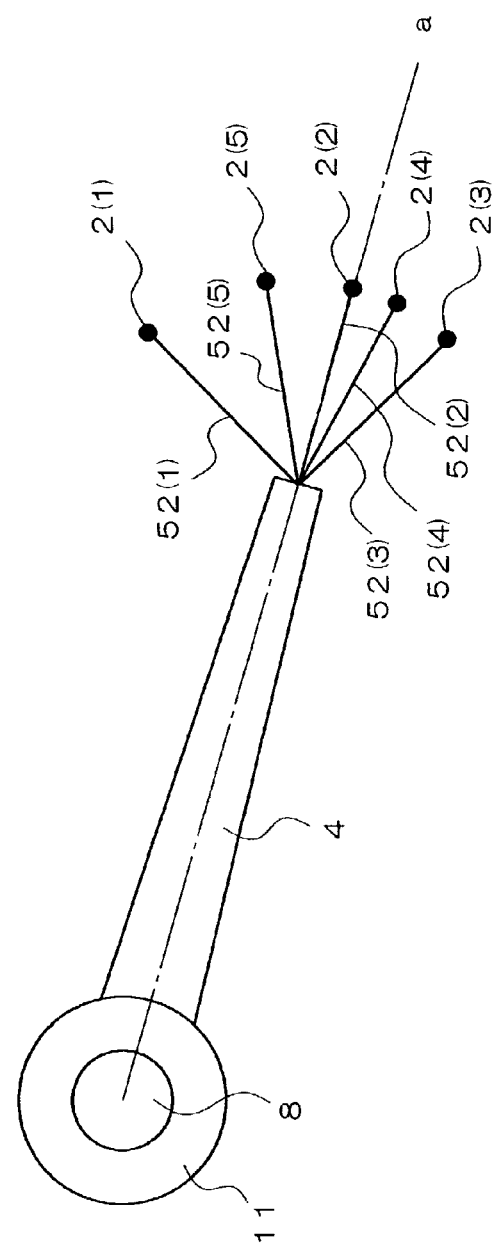
F I G. 36A
F I G. 36B

HEAD POSITIONER AND INFORMATION RECORDING/REPLAYING APPARATUS

BACKGROUND OF THE INVENTION

1. Field of the Invention

This invention relates to a head positioner employing a dual-stage actuator method. In the dual-stage actuator method, a record/replay head ("record" and "replay" hereinbelow will also be referred to as "write" and "read", respectively) is position-controlled through cooperative operations of a coarse actuator and a fine actuator. This invention relates to a head positioner having a configuration employing the dual-stage actuator method, wherein a fine actuator is configured using a piezoelectric device.

Preferably, although the head positioner of the invention is primarily mounted on a magnetic disk drive, the invention is not limited thereby. The head positioner of the invention may be mounted another information storage apparatus, such as a magnetooptical disk drive, or an optical disk drive.

In addition, the invention also relates to an information recording/replaying apparatus represented by a magnetic disk drive.

2. Description of the Related Art

Conventionally, there are apparatuses for performing high-speed and high-accuracy positioning of a write/read head over an information storage disk such as a hard disk. These apparatuses include a dual-stage-type head positioner formed of a coarse actuator and a fine actuator(s). The fine actuator is generally called a "microacuator (MA)", "dual-stage actuator", or "piggyback actuator". A piezoelectric device (PZT device) is widely used to form the fine actuator.

For the coarse actuator, voice coil motor (VCM) is generally used. The coarse actuator is used for large movement as in a seeking operation or a multitrack jumping operation. The coarse actuator drive a head-mounted supporting mechanism to rotationally move on an axis on a chassis. In contrast, the fine actuator used to perform high-speed and fine positioning as in a track following operation and a single-track jumping operation. The fine actuator is configured with the piezoelectric device being disposed between the coarse actuator and a head slider. The amount of head displacement is adjusted by controlling application voltage for the piezoelectric device constituting the fine actuator. The displacement stress increases proportionally to the increase in the level of the application voltage. This enables head positioning with improved sensitivity.

Nevertheless, however, using the piezoelectric device as the fine actuator arises problems described hereunder. With a high voltage being applied to the two electrodes of the piezoelectric device, a metal component in the piezoelectric device causes an electrochemical reaction, thereby precipitating the metal component in the electrodes. For example, a thin-film PZT device made of a lead-zirconia-titanium alloy. Practically, the PZT device is not formed only of PZT crystal, and the device is doped with, for example, lead oxide and water in the fabrication. When lead, water, and the like are included, the electrochemical reaction is activated in a voltage-applied state, phenomena occur in which lead is precipitated on the cathodic side. In proportion to the increase in the application voltage, the lead precipitation phenomena increasingly tend to occur. Although adverse effects of the lead precipitation do not immediately occur prominent, the lead precipitation gradually advances. When erosion phenomena due to long-term lead precipitation continue, the displacement property of the piezoelectric device deteriorates. Further continuation of the erosion phenomena can disable the piezoelectric device to be displaced. Finally, the lead precipitation causes shortcircuiting, thereby causing breakdown of the piezoelectric device.

As described above, while application of high voltage to the piezoelectric device satisfies requirements for the high-speed sensitivity, adverse effects due to long-term lead precipitation causes a problem in the service life of the device. Conventionally, sufficient study has not made regarding the balanced relationship among the positioning accuracy, high-speed sensitivity, and application voltage. As such, the problems as described above occur. The importance of resolving the problems increases in proportion to the increase to be made in the control band for satisfying the high-speed sensitivity.

Conventionally, there is a configuration employing a positioning method developed to implement an increased information mass-storage capacity. In the configuration, a plurality of information storage disks are coaxially disposed, fine actuators and heads are disposed corresponding to the disks, and a plurality of head supporting mechanisms individually mounted to the fine actuators are moved in batches by using a coarse actuator. Specifically, the aforementioned configuration includes a plurality of heads for independently accessing a plurality of disks, a plurality of fine actuators for finely displacing the individual heads, a plurality of head supporting mechanisms for individually supporting the fine actuators, and a coarse actuator for batch-driving the plurality of head supporting mechanisms. Generally known conventional methods for driving the coarse actuator include a method as described in the following paragraphs.

Weightings are individually added to relative displacement signals of a plurality of fine actuators, and a coarse actuator is controlled to converge each of the weighting-added signals to zero. The relative displacement signals are weighted according to importances preliminarily allocated to individual heads. The importance typically determines the priority in the access order. However, when the coarse actuator is controlled on the basis of the importances set to weighting points, and weightings are added to all the relative displacement signals, problems are arisen in that the head supporting mechanism is frequently moved, and oscillations are caused thereby.

When a large wobbly movement occurs with a desired track corresponding to a head having the highest importance, the highest-importance head is maximally displaced. Accordingly, the value of the corresponding relative displacement signal becomes largest, and the amount of operation of the coarse actuator is large in proportion to the greatest weighting added to the relative displacement signal of the highest-importance head. Thereby, the individual fine actuators are over-displaced. Since the frequency of access-command issuance to the highest-importance head is high, the individual fine actuators are induced to cause oscillations. The oscillations influence the structural stability of each of the fine actuators. In addition, structural resonances are caused due to inter-fine actuator mutual interference. A condition occurs such that the positioning control itself of the head toward a desired track introduces a positional deviation from the desired track. Consequently, for example, read or write errors tend to occur at the desired track. These problems will be described in more detail with reference to FIGS. 46 and 47.

As countermeasures to prevent occurrence of the oscillations, there is proposed an idea of increasing the speed of following operations to a desired track. In order to improve the sensitivity, however, a proportionally high voltage needs to be applied to the piezoelectric device, which constitutes the fine actuator. As described above, application of overvoltage causes the problems of lead precipitation, property deterioration, and in addition, breakdown of the piezoelectric device.

SUMMARY OF THE INVENTION

Accordingly, a primary object of the present invention is to provide a head positioner that prevents property deterioration of a piezoelectric device from being caused by an electrochemical reaction to thereby implement prolonged service life when the piezoelectric device constituting a fine actuator is driven according to a dual-stage actuator method in high frequency bands. This enables high-speed and high-accuracy head positioning to be obtained, and in addition, enables high recording density of an information storage device to be implemented.

Another object of the invention is to provide a head positioner capable of implementing head positioning exhibiting high stability while inhibiting occurrence of oscillations by using a configuration employing a method of moving a plurality of heads with associated fine actuators and head supporting mechanisms for a plurality of disks in batches. A further object of the invention is to provide an information recording/replaying apparatus capable of exhibiting functions similar to the above.

Further objects, features, and advantages of the invention will become apparent from descriptions given hereunder.

To solve the above-described problems, according to one aspect of the invention, a head positioner of the invention has as a prerequisite a configuration employing a dual-stage actuator method, in which two actuators, namely, coarse and fine actuators, are used to perform the control. The fine actuator is formed of a piezoelectric device. According to the head positioner of the aspect, the level of a drive signal to be fed to the piezoelectric device is set equal to or lower than a threshold at which property deterioration of the piezoelectric device is caused by an electrochemical reaction.

In more detail, the head positioner of the invention includes a coarse actuator and a fine actuator for performing positioning-control according to a dual-stage actuator method for a write/read head provided for accessing an information storage disk, and a positioning control unit for controlling the coarse actuator and the fine actuator. The fine actuator is configured using a piezoelectric device. The positioning control unit includes a coarse control system and a fine control system. The coarse control system is configured to include a coarse drive unit for driving and coarse control unit for controlling the coarse drive unit. The fine control system is configured to include a fine drive unit for driving the fine actuator and a fine control unit for controlling the fine drive unit. The head positioner further includes a driving-signal limiting unit for limiting the level of a fine control signal fed to the fine drive unit. The driving-signal limiting unit is disposed between the fine control unit and the fine drive unit, wherein the driving-signal limits the level of a fine control signal fed from the fine control unit to the fine drive unit to be equal to or lower than a threshold at which property deterioration of the piezoelectric device is caused by an electrochemical reaction.

A feature of the present invention is that the level of a fine control signal fed to the fine drive unit is limited equal to or lower than the threshold at which property deterioration of the piezoelectric device is caused by an electrochemical reaction. The invention includes various ways as described below for setting the threshold. The limitation of the drive signal solves the problem occurring in that the properties of the piezoelectric device deteriorates because of erosion developed in an electrochemical reaction attributed to a high level of the drive signal. As such, the function of the high-accuracy positioning of the head over a desired track can be maintained for a long time (service-life prolongation). Consequently, the invention effectively works to implement a high-recording-density information storage device.

This invention is effective in a case where the piezoelectric device of the fine actuator is a thin-film PZT device composed of lead, zirconia, and titanium. The PZT device is a typical example of high-property piezoelectric devices. Practically, the PZT device is not formed only of PZT crystal, and is doped with foreign elements such as lead oxide and water in the fabrication. When voltage is applied to the piezoelectric device, an electrochemical reaction is activated depending on the level of the application voltage, and lead is precipitated in the electrode. In the course of advancement of the phenomena, the piezoelectric device causes shortcircuiting, thereby being disabled to perform displacement operation. This invention exhibits maximum effects and inhibits the lead precipitation in the head positioner using the fine actuator formed of the above-described PZT device.

Hereinbelow, a description will be made regarding the aforementioned threshold of the drive signal fed to the piezoelectric device. The property deterioration due to an electrochemical reaction in the piezoelectric device is caused by the lead precipitation.

The lead precipitation occurs for the reasons that, for example, lead oxide (PbO) as an impurity permeates into the piezoelectric device, moisture unexpectedly permeates into the piezoelectric device from the outside during the fabrication, and/or the moisture permeates into the piezoelectric device during the operation in a high-temperature-and-humidity phenomenon. In practical use, it is impossible to completely prevent the moisture permeation.

The lead oxide PbO reacts with the moisture, and lead ions $Pb^{2+}$ are thereby generated. Particularly, the lead ions $Pb^{2+}$ are easily generated in an acid region. When voltage is applied to the piezoelectric device in the state where the lead ions $Pb^{2+}$ are generated, an electrochemical reaction occurs. Thereby, lead is precipitated at the cathodic side. As such, in principle, the potential difference occurring when the lead ions $Pb^{2+}$ changes to lead Pb may preferably set to the threshold to prevent the lead precipitation. The potential difference in this case is called "theoretical decomposition voltage of lead". However, for practical advancement of electrochemical reaction, a voltage called "oxygen overvoltage" needs to be added to the theoretical decomposition voltage. For this reason, the voltage obtained by addition of the oxygen overvoltage to the theoretical decomposition voltage of lead may be set to the threshold. As such, the lead precipitation can be prevented by driving the piezoelectric device by applying a voltage equal to or lower than the voltage corresponding to the threshold. However, in this case, the water electrolysis is not taken into consideration. Since the theoretical decomposition voltage of lead is lower than the theoretical decomposition voltage of water, lead is more prone to precipitation.

In comparison to the above, with the moisture being included, since the electric resistance is reduced, the current can be easily caused to flow because of the voltage application. When the current abruptly increases, water electrolysis occurs, and hydroxyl ions H+ are thereby generated. Lead Pb, which is a component composing the piezoelectric device, reacts with hydroxyl ions H+, and is thereby converted into lead ions $Pb^{2+}$. The lead ions $Pb^{2+}$ is then combined with electrons to be lead Pb and is precipitated in the electrode. In this case, to prevent the lead precipitation, in principle, the arrangement may be made such that the potential difference at which water induces electrolysis is set to the threshold, and the application voltage is set equal to or lower than the threshold. The potential difference at which electrolysis is induced by water is called "theoretical decomposition voltage of water". Also in this case, the oxygen overvoltage needs be added to the theoretical decomposition voltage to practically cause a phenomenon in which electrolysis is practically advances, oxygen is generated, and hydroxyl ions $H^+$ are generated. As such, the voltage obtained by addition of the oxygen overvoltage to the theoretical decomposition voltage of water may be set to the threshold. The lead precipitation can be prevented by making the arrangement such that the piezoelectric device is driven by applying a voltage equal to or lower than the threshold. This arrangement prevents also lead precipitation attributable to lead oxide PbO.

There are several approaches to practically determine the threshold. In any one of the approaches, it is important make the arrangement such that the electric resistance is maintained higher than a predetermined level not to cause unnecessary current to flow into the piezoelectric device. To achieve the above, the threshold is determined such that the relationship an application voltage V (V) for the fine actuator using the piezoelectric device and a current I (A) flowing into the disk drive unit is, as a target, $V/I > 10^6 [\Omega]$. The threshold is determined to set a necessary electrical resistance value necessary of the piezoelectric device to 1 MΩ or higher. In this case, when a target allowable current is 50 μA, the threshold of the driving voltage for the piezoelectric device can be predicted to be 50 V.

The threshold will be as follows in the relationship with the film thickness of the piezoelectric device. The smaller the film thickness, the lower the threshold needs to set. For example, when 2.5 μm is selected as a reference value of the film thickness, the electrofield strength may preferably be set as $E = 2 \times 10^7$ (V/m). The relationship between a film thickness t (m) and a threshold V (V) may preferably be set as $V/t < 2 \times 10^7$ (V/m). More preferably, the threshold is set to 10 V, which is obtained through multiplication of a safety factor of 0.2 with the predicted threshold of 50 V. The safety factor is obtained through practical experiences and tests. For the threshold of 10 V being set, the allowable current is reduced to ⅕, that is, 10 μA; and the relationship with the film thickness is as $V/t < 4 \times 10^6$ (V/m). As such, the safety for the lead precipitation is improved. In this case, since the electrical resistance value of the piezoelectric device is 1 MΩ or higher, the electrofield strength may set lower than $4 \times 10^6$ (V/m). When the electrofield magnitude is as high as the aforementioned, the piezoelectric device can be used for a long time in the state where the lead precipitation is inhibited.

To further prolong the service life, the order may be increased by one to set the threshold so that to attain $V/I > 10^7$ (MΩ). The threshold is determined to obtain a necessary electrical resistance value of the piezoelectric device to 10 MΩ or higher. In this case, when a target allowable current is 5 μA, the threshold of the driving voltage for the piezoelectric device can be predicted to be 50 V. In this case, the relationship with the film thickness may preferably be set as $V/t < 2 \times 10^7$ (V/m) as in the above-described case. More preferably, the threshold is set to 10 V, which is obtained through multiplication of a safety factor of 0.2 with the predicted threshold of 50 V. For the threshold of 10 V being set, since the allowable current is reduced to ⅕, that is, 10 μA, the safety for the lead precipitation is sufficiently is high. In this case, the electrical resistance value of the piezoelectric device is 10 MΩ or higher. When the electrofield magnitude is as high as the aforementioned, the piezoelectric device can be used for a long time in the state where the lead precipitation is securely inhibited.

As described above, the electrical resistance value of the piezoelectric device is set to 1 MΩ as a target in consideration of possible permeation of water during the use in a high-temperature-and-high-humidity environment. As such, the threshold is preferably set under conditions in which the piezoelectric device has an electric resistance maintained to be 1 MΩ or higher in a 500-hour continuous operation in an environment having a temperature of 85° C. and a humidity of 90%.

Preferably, the fine control system performs controlling and driving operations such that, when an amount of compensation by the fine actuator is zero, the fine control system outputs a specific value of an offset voltage at a voltage of zero for the piezoelectric device or at ½ of the threshold; and when the amount of compensation is other than zero, the fine control system adds a positive/negative voltage corresponding the amount of compensation to the offset voltage.

In this case, the offset voltage in the drive signal for the fine actuator is preferably equal to or lower than a water decomposition voltage (including zero).

In addition, preferably, the above-described invention further includes a property inspection unit and a limitation-voltage modifying unit that individually have the following functions. The property inspection unit performs detection of the relationship between a command-driving voltage for the fine actuator and a current flowing through the piezoelectric device. The limitation-voltage modifying unit modifies a threshold of the command-driving voltage according to the result of the detection performed by the property inspection unit.

This configuration provides the following operational effects. Ordinarily, the current flowing through the piezoelectric device is on the order of $10^{-7}$ [A] or lower. However, when moisture permeates into the piezoelectric device, the order of the current flowing at a voltage higher than or equal to the decomposition voltage is increased 100 times or greater. The increment of the current is variable depending on the piezoelectric device. Theoretically, the decomposition voltage of the piezoelectric device is constant, although it depends on the material. In practical use, however, there are individuality variations in property including, for example, oxygen-overvoltage variations and composition variations. As such, the threshold of the driving voltage needs to be regulated for each fine actuator. The property inspecting unit detects a practical relationship between the command-driving voltage and the current flowing through a driving circuit. The limitation-voltage modifying unit modifies a threshold of the command-driving voltage according to the result of the detection performed by the property inspection unit. This arrangement enables high-accuracy head-positioning control to be implemented, regardless of the individuality variations of the piezoelectric device and variations in the application environment (particularly, temperature variations).

The above-described embodiment preferably has the configuration further including a time function filter. The time function filter limits a time in which the driving voltage is continually output according to a command-driving voltage when the command-driving voltage for the fine actuator is higher than or equal to the threshold.

This configuration provides the operational effects as described hereunder. The current flowing through the piezoelectric device increases proportionally to the electroconductive time. As such, when the command-driving voltage is higher than or equal to a threshold, the continuous drive and output time needs to be controlled. Thereby, high-accuracy control can be implemented for the head actuators, regardless of variations in the command-driving voltage.

Next, another aspect of the present invention will be described. According to the aspect of the invention, a head positioner performs compensation for a positional deviation of a head from a desired track because of a disturbance that is imposed on a fine actuator and that exceeds a predetermined operation range thereof. The head positioner according to the aspect has, as a prerequisite, a configuration employing a dual-stage actuator method, wherein positioning control is performed for a write/read head for accessing an information storage disk by using a coarse actuator and a fine actuator. The fine actuator is configured using a piezoelectric device. The configured head positioner is configured to perform compensation for a positional deviation of the head from a desired track because of a disturbance that is imposed on the fine actuator and that exceeds a predetermined operation range thereof, and to prevent overvoltage-causing deterioration of the piezoelectric device of the fine actuator. Specifically, the head positioner is configured to perform compensation by driving the coarse actuator, not the fine actuator, for the positional deviation of the head from a desired track because of a disturbance that is imposed on the fine actuator and that exceeds a predetermined operation range thereof. In addition, the head positioner is configured such that the level of a drive signal to be fed to the fine actuator using the piezoelectric device is set equal to or lower than a threshold at which property deterioration of the piezoelectric device is caused by an electrochemical reaction.

More specifically, the head positioner according to the aspect of the invention is configured as follows. The head positioner includes a coarse actuator and a fine actuator for performing positioning-control according to a dual-stage actuator method for a write/read head provided for accessing an information storage disk, and a positioning control unit for controlling the coarse actuator and the fine actuator. The fine actuator is configured using a piezoelectric device. The positioning control unit includes a coarse control system and a fine control system. The coarse control system includes a coarse drive unit for driving at least the coarse actuator and coarse control unit for controlling the coarse drive unit. The fine control system includes a fine drive unit for driving the fine actuator and a fine control unit for controlling the fine drive unit. The head positioner further includes a position-error separating unit and a driving-signal limiting unit. The position-error separating unit separates compensation so as to be performed through operation of the coarse actuator for a positional deviation of the head that occurs from a desired track because of a disturbance exceeding a predetermined operation range of the fine actuator. The driving-signal limiting unit is disposed between the fine control unit and the fine drive unit, and limits the level of a fine control signal fed from the fine control unit to the fine drive unit to be equal to or lower than a threshold at which property deterioration of the piezoelectric device is caused by an electrochemical reaction.

This configuration provides operational effects as described hereunder. In this configuration, the positional deviation of the head from a desired track because of the disturbance exceeding a predetermined operation range of the fine actuator to cause the head to follow the desired track, and the compensation is performed by using the fine actuator using the piezoelectric device. As such, an overvoltage is applied to the piezoelectric device, and a case can occur in which erosion of the piezoelectric device is caused by an electrochemical reaction, and property deterioration thereof is introduced. For the compensation for the displacement caused by the disturbance exceeding the predetermined operation range, the load to be imposed on the side of the piezoelectric device can be reduced in the configuration built such that the compensation is performed on the side of the coarse actuator. In addition, the driving-signal limiting unit limits the level of the fine control signal for the piezoelectric device, which is a configuration member of the fine actuator, to be equal to or lower than a threshold at which property deterioration of the piezoelectric device is caused by an electrochemical reaction. This solves the problem occurring in that the properties of the piezoelectric device deteriorates because of a high level of the drive signal. Consequently, the function of high-speed and high-accuracy positioning of the head over a desired track can be maintained for a long time.

In the above, when the disturbance exceeding the predetermined operation range on the fine actuator is a rotational synchronization disturbance caused by, for example, disk eccentricity, data of the rotational synchronization disturbance due to the disk eccentricity or the like is detected in advance or immediately, and the compensation is then performed. For the compensation for the positional deviation of the head from a desired track because of the rotational synchronization disturbance of the disk, and for the overvoltage-causing deterioration of the piezoelectric device of the fine actuator, the configuration is arranged such that the compensation for the positional deviation of the head because of the rotational synchronization disturbance of the head is performed by driving the coarse actuator, not the fine actuator; and in addition, the level of a drive signal to be fed to the fine actuator using the piezoelectric device is set equal to or lower than a threshold at which property deterioration of the piezoelectric device is caused by an electrochemical reaction. More specifically, a disturbance compensating unit is provided to replace the position-error separating unit. The disturbance compensating unit performs compensation in the coarse control system for a positional deviation of the head that occurs from a desired track because of a rotational synchronization disturbance of the disk.

This configuration provides operational effects as described hereunder. Similar to the preceding case, also in this configuration, the positional deviation of the head from a desired track because of the rotational synchronization disturbance of the disk, and the compensation is performed by using the coarse actuator, not the fine actuator. Thereby, the load to be imposed on the side of the piezoelectric device can be reduced. In addition, the level of the drive signal to be fed to the fine actuator using the piezoelectric device is set equal to or lower than a threshold at which property deterioration of the piezoelectric device is caused by an electrochemical reaction. This solves the problem occurring in that the properties of the piezoelectric device deteriorates because of erosion developed in an electrochemical reaction attributed to a high level of the drive signal. As such, the function of the high-accuracy positioning of the head over a desired track can be maintained for a long time.

Preferably, the above may be arranged as described hereunder. While the disturbance compensating unit is provided primarily to provide the amount of compensation to the coarse control system, a case can occur in which, in the coarse control system and the fine control system, individual control amounts thereof are influenced in one way or in two ways. Specifically, depending on the amount of compensation to be provided to the coarse control system for performing compensation for the rotational synchronization disturbance of the disk, a case can occur in which the level of the drive signal for the piezoelectric device exceeds the level corresponding to the threshold. Even in this case, according to the techniques of this preferable case, a function can be secured such that the compensation is performed for the rotational synchronization disturbance, and concurrently, the piezoelectric device is prevented from erosion and property deterioration that can occur because of a high level of the drive signal.

More specifically, in the configuration in which the amount of compensation performed by the disturbance compensating unit is provided to the coarse control system, a synchronous-disturbance compensation regulating unit is provided so that the amount of compensation is provided not only to the coarse control system but also to the fine control system. The arrangement is made as above to perform compensation at a track following event for a level equal to or lower than the threshold as the level of the drive signal for the fine actuator. The synchronous-disturbance compensation regulating unit receives amounts of compensation performed by the disturbance compensating unit, performing weighting of the amounts of compensation for the coarse control system and the fine control system, and then providing weighted (weighting-added) amounts of compensation to the coarse control system and the fine control systems. Thereby, the function can suitably be secured such that the compensation is performed for the rotational synchronization disturbance, and concurrently, the piezoelectric device is prevented from erosion and property deterioration that can occur because of a high level of the drive signal.

In addition, the above may preferably be arranged as described hereunder. The preferable arrangement is made such that the coarse control system includes a low-frequency filter for providing the coarse actuator with an amount as a control amount obtained through multiplication of a weighting function having weighting effects in a low frequency band with the control amount, and the fine control system includes a high-frequency filter for providing the fine actuator with an amount as a control amount obtained through multiplication of a weighting function having weighting effects in a high frequency band with the control amount.

This arrangement is effective corresponding to the frequency for compensation for a load of disturbance in a case where compensation is performed for a positional deviation of the head from a desired track because of not only a rotational synchronization disturbance but also a load of disturbance such as a mechanical resonance. This arrangement provides operational effects the head positioner in a state where a rotational synchronization disturbance having a relatively large amplitude overlaps with a mechanical-resonance disturbance having a relatively small amplitude. While the primary object of the invention is to perform the compensation for a rotational synchronization disturbance in the coarse control system, the fine control system is used to perform compensation for a mechanical-resonance disturbance or the like imposed to overlap with a rotational synchronization disturbance. The sharing is performed according to the frequency. For example, a rotational synchronization disturbance having a relatively large amplitude tends to occur in a low frequency band, and a mechanical-resonance disturbance having a relatively small amplitude tends to occur in a high frequency band. For this reason, the low-frequency filter and the high-frequency filter are provided. The low-frequency filter is used to cut out high frequency components, and a control amount reduced to be a state corresponding to a rotational synchronization disturbance is provided to the coarse control system. In addition, the high-frequency filter is used to cut out low frequency components, and a control amount reduced to be a state corresponding to, for example, a mechanical-resonance disturbance, is provided to the fine control system.

Thereby, the function can be controlled to effectively work such that compensation is performed for a positional deviation of the head from a desired track because of a rotational synchronization disturbance, a mechanical-resonance disturbance, and the like in order to implement high-accuracy positioning.

An aspect of the invention which hereinbelow be described relates to a head positioner including a plurality of fine actuators. In the head positioner, amounts of displacement of the individual fine actuators are considered, a fine actuator corresponding to the median value in a displacement-amount distribution is selected therefrom, and control is performed according to cooperative operations of the selected single fine actuator and a coarse actuator.

According to this aspect of the present invention, a head positioner includes a plurality of write/read heads for individually accessing a plurality of concentric information storage disks, a plurality of fine actuators for finely displacing the individual heads, a plurality of head supporting mechanisms for supporting the individual fine actuators; and a coarse actuator for driving the plurality of head supporting mechanisms in batches. In the head positioner, according to a head position signal read out by each of the head from each of the disks, control is performed for each of the fine actuators so that the corresponding head follows a desired track. In addition, a median value is selected from relative displacement values of the individual fine actuators, and control is performed for the coarse actuator according to the selected median value.

More specifically, the head positioner further includes a control unit for controlling the displacement of each of the fine actuators and the movement of each of the head supporting mechanisms according to the coarse actuator. The control unit includes a plurality of fine positioning control units, a median-value selecting unit, and a coarse control system that have functions as mentioned hereunder. The plurality of fine positioning control units correspond to the individual heads, and individually generate a head-position error signal representing a differential between a head position signal contained in servo information stored on the disk and which is reproduced (read out) in units of each of the head and a desired position signal of each of the heads, individually control the fine actuators according to the head-position error signal, and individually perform positioning control in unit of the head. The median-value selecting unit corresponds to the plurality of fine actuator, and selects the relative displacement signal, as a median-value signal, ranked in the center of the plurality of relative displacement signals sent from the individual fine actuators. The coarse control system performs control according to the selected median-value signal for the batch movements of the head supporting mechanisms according to the coarse actuator.

The above-described functions may be implemented using software. Specifically, the control unit may be configured to include a microprocessor capable of controlling the individual fine actuators and the coarse actuator, a memory for storing a program used to operate the microprocessor, and the program used to operate the microprocessor. The program is composed to include a head-positioning control program that is read and executed by the microprocessor to implement functions of the head positioning. Thus, the head-positioning control program read out from the memory is executed with the microprocessor. Thereby, processing can be performed accurately and flexibly.

Preferably, the head-positioning control program includes a plurality of fine positioning control means, a median-value selecting means, a coarse control system means that have functions as mentioned hereunder. The plurality of fine positioning control means individually generate head-position error data representing a differential between head position data contained in servo information stored on the disk and which is reproduced (read out) in units of each of the head and desired position data of each of the heads, that individually control the fine actuators according to the head-position error data, and that individually perform positioning control in units of the heads. The median-value selecting means selects the relative displacement data, as median-value data, ranked in the center of the plural items of relative displacement data sent from the individual fine actuators. The coarse control system means performs control according to the selected median-value data for the batch movements of the head supporting mechanisms according to the coarse actuator.

The above-described configuration provides operational effects as described hereunder. Regardless of the degree of importance for, for example, the access priority, control is implemented for the coarse actuator according to a median value selected from a plurality of relative displacement values. Accordingly, the control is performed such that a central fine actuator is always given precedence, and the central fine actuator is always positioned at a home position. As such, even when tracks of the plurality of disks are wobbly moved in real time or at random, the amounts of displacement and the displacement directions vary either in real time or at random, frequent movements of the head supporting mechanisms according to the coarse actuator do not easily occur, and the control is stably performed with less movements.

In the tracking-following operation, when the central head has reached the desired track, the amount of displacement of the corresponding fine actuator converges to zero. That is, the median-value signal converges to zero, and the movement of the head supporting mechanism according to the coarse actuator is stopped. Then, a tracking-following operation of the head positioned at a portion other than the center is performed in the aforementioned state. In this case, tracking-following operations are implemented in a most stable state. That is, high-accuracy and stable head-positioning control can be performed in a state where the occurrence of oscillations is inhibited.

To prevent occurrence of the oscillations by performing on-track operations at an increased speed, there is proposed an idea of applying a higher voltage to the piezoelectric device constituting the fine actuator. However, application of overvoltage causes the problems of lead precipitation in the piezoelectric device, property deterioration, and in addition, breakdown of the piezoelectric device. The present invention thus employs the novel method in which the limited application voltage is applied to the piezoelectric device to thereby property deterioration of the piezoelectric device, and concurrently, control is performed for the coarse actuator according to the selected median value to thereby inhibit the occurrence of oscillations.

Preferably, the median-value selecting means may be configured as described hereunder. The median-value selecting unit is configured to select a plurality of relative displacement signals sent from the fine actuators. In this case, the median-value selecting unit is configured to exclude a relative displacement signal of the fine actuator corresponding to the head that has been positioned on-track over a desired track and that has completed a read/write operation. Specifically, among the plurality of relative displacement signals, relative displacement signals corresponding to active access command signals for the heads are selected as candidate for selecting the median value. Then, the relative displacement signal ranked in the center as the median-value signal is selected from the plurality of relative displacement signals selected as the candidates.

A preferable software method of the above may be configured as described hereunder. A central processing unit selects relative displacement data as candidates of the median value to be selected, the relative displacement data corresponding active access command data for the heads, from the plural items of relative displacement data sent from the individual fine actuators, and selects the relative displacement data ranked in the center as the median-value data from the plural items of relative displacement data selected as the candidates.

The above configuration provides operational effects as described hereunder. The access command signal becomes inactive upon completion of a read/write access of the central head. Thereby, a relative displacement signal corresponding to the head is excluded from selection candidates for the median value. That is, the selection candidates are reduced by one. After completion of the read/write access, the operated head stays on the on-track accessed track, and is excluded from the control of the coarse actuator. The candidate relative displacement signals for controlling the coarse actuator are thereby limited to those that have not completed a read/write operation. As such, the displacement frequency of the fine actuators is reduced. As a result, the amount of displacement of a head currently performing a read/write operation is also reduced. A head that has completed a read/write access (read/write-completion head) is not any more related to the read/write operation even though it finely displaces. According to the above-described synergetic effects, occurrence of oscillations can further be reduced, high-accuracy and stable head-positioning control can be implemented, and read/write can suitably be implemented. Furthermore, since the displacement frequency is reduced, service life of each of the fine actuators can be prolonged thereby.

In the above, the number of unoperated heads is reduced one by one. The number of the heads for selecting the median value alternately assumes an odd number and an even number. When the number of the relative displacement signals assumes an odd number, the central object exists. However, when the number of the relative displacement signals is an even number, no central head exists. From two central objects, the one head corresponding to a smaller relative displacement signals is selected. In comparison to a case where a larger one is selected, oscillations are inhibited, and the stability in head positioning is improved.

In the above aspect of the invention, preferably, the fine positioning control unit may be configured as described hereunder. The fine positioning control unit performs positioning control for the head according to a synthetic signal of a track position signal contained in the servo information stored on the disk and which is reproduced (read out) in units of each of the head and a burst demodulation signal when an access command signal for the head is active. On the other hand, the fine positioning control unit performs positioning control for the head by using the burst demodulation and without using the track position signal when the access command signal is inactive.

In the case of the software method, preferably, the fine positioning control unit may be configured as described hereunder. The fine positioning control means performs positioning control for the head according to a synthetic data of a track position data contained in the servo information stored on the disk and which is reproduced (read out) in units of each of the head and burst demodulation data when access command data for the head is active. On the other hand, the fine positioning control means performs positioning control for the head by using the burst demodulation and without using the track position data when the access command data is inactive.

The above configuration provides operational effects as described hereunder. Before an inactive access command signal is generated, head-positioning control is performed according to the synthetic signal of the track position signal and the burst demodulation signal. Upon completion of a read/write operation of a central head, an access command signal corresponding to the head becomes inactive. Then, the track position signal is invalidated, and the operation is switched to positioning control using the burst signal. Suppose a case has occurred in which, when performing a tracking-following operation of a read/write-incompletion head, the coarse actuator is driven to move the head supporting mechanism toward a different desired track. In this case, the amount of displacement is increased. However, according to the present case, the track position signal is disregarded, and only the burst demodulation signal is used. As such, even when the desired track is set to a different track as in the above case, control is performed such that track-following operation is performed in the direction to a central position within the track region, and the movement of a fine actuator corresponding to a read/write-completion head is inhibited. As a result, the read/write-completion fine actuator is substantially kept positioned in the vicinity of the central portion, and enters a standby mode for a subsequent operation. In this state, the fine actuator is structurally most stabilized. In addition, the position-information processing unit functions to inhibit the movement of the read/write-completion fine actuator toward the previous on-track-accessed track. Thereby, occurrence of oscillations can be reduced, and read/write operation can be implemented stable in a high-accuracy positioning state. Furthermore, since the level of driving voltage to be applied to the read/write-completion fine actuator is reduced, service life of the piezoelectric device constituting each of the fine actuators can be prolonged.

In the above, it is preferable that the arrangement for reducing the candidates for selecting the median value is combined with the arrangement for limiting the signals to the burst demodulation signal after completion of a read/write operation. Specifically, the median-value selecting unit and the fine positioning control unit may individually be configured as described hereunder. The median-value selecting unit performs selection of relative displacement signals as candidates of the median value to be selected, the relative displacement signals corresponding to active access command signals for the heads, from the plurality of relative displacement signals sent from the individual fine actuators; and selection of the relative displacement signal ranked in the center as the median-value signal from the plurality of relative displacement signals selected as the candidates. The fine positioning control unit performs positioning control for the head according to a synthetic signal of a track position signal contained in the servo information stored on the disk and which is reproduced (read out) in units of each of the head and a burst demodulation signal when an access command signal for the head is active; and positioning control for the head by using the burst demodulation and without using the track position signal when the access command signal is inactive.

In the case of a software method, it is preferable that the median-value selecting means and the fine positioning control means may individually be configured as described hereunder. Specifically, the median-value selecting means performs selection of items of relative displacement data as candidates of the median value to be selected, the relative displacement data corresponding to active access command data for the heads, from the plural items of relative displacement data sent from the individual fine actuators; and selection of the relative displacement data ranked in the center as the median-value data from the plurality of relative displacement data selected as the candidates. The fine positioning control means performs positioning control for the head according to synthetic data of track position data contained in the servo information stored on the disk and which is reproduced (read out) in units of each of the head and a burst demodulation data when access command data for the head is active; and positioning control for the head by using the burst demodulation and without using the track position data when the access command data is inactive.

In the above relative displacement signal, the relative displacement signal may be generated by a predictor formed by modeling each of the fine actuators. The relative displacement signal of the individual fine actuators may not be detected in case of realization of positioning control for the head with less oscillations.

Furthermore, the present invention relates to a information recording/replaying apparatus. The information recording/replaying apparatus is configured to include a rotatable information storage disk, a write/read head for accessing the disk, a fine actuator for finely displacing the head, a head supporting mechanism for supporting the fine actuator, a coarse actuator for driving the head supporting mechanism, and a head positioner for performing positioning control for the write/read head according to a dual-stage actuator method using the coarse actuator and the fine actuator. The fine actuator is configured using a piezoelectric device. In addition, the head positioner has the configuration according to one of the above-described aspects of the present invention.

According to the information recording/replaying apparatus of the present invention, as already described above, the level of a drive signal to be fed to the piezoelectric device is set equal to or lower than a threshold at which property deterioration of the piezoelectric device is caused by an electrochemical reaction. The limitation of the drive signal solves the problem occurring in that the properties of the piezoelectric device deteriorates because of erosion developed in an electrochemical reaction attributed to a high level of the drive signal. As such, the function of the high-accuracy positioning of the head over a desired track can be maintained for a long time (service-life prolongation). Consequently, sufficiently high-density recording can be implemented with the information recording/replaying apparatus.

BRIEF DESCRIPTION OF THE DRAWINGS

These and other objects as well as advantages of the invention will become clear by the following description of preferred embodiments of the invention with reference to the accompanying drawings, wherein:

FIG. 21A is a waveform diagram of a head-position error signal at a track-following event plan view according to a comparison example not including a disturbance compensating unit;

FIG. 21B is a waveform diagram of a driving current for a coarse actuator according to the comparison example;

FIG. 21C is a waveform diagram of a driving voltage for a fine actuator according to the comparison example;

FIGS. 36A and 36B each show an explanatory view of operation of a semiconductor integrated circuit according to the eleventh embodiment;

In all these figures, like components are indicated by the same numerals.

DETAILED DESCRIPTION OF THE PREFERRED EMBODIMENTS

Hereinbelow, preferred embodiments of head positioning devices according to the invention will be described with reference to the accompanying drawings.

(First Embodiment)

Figure 1:
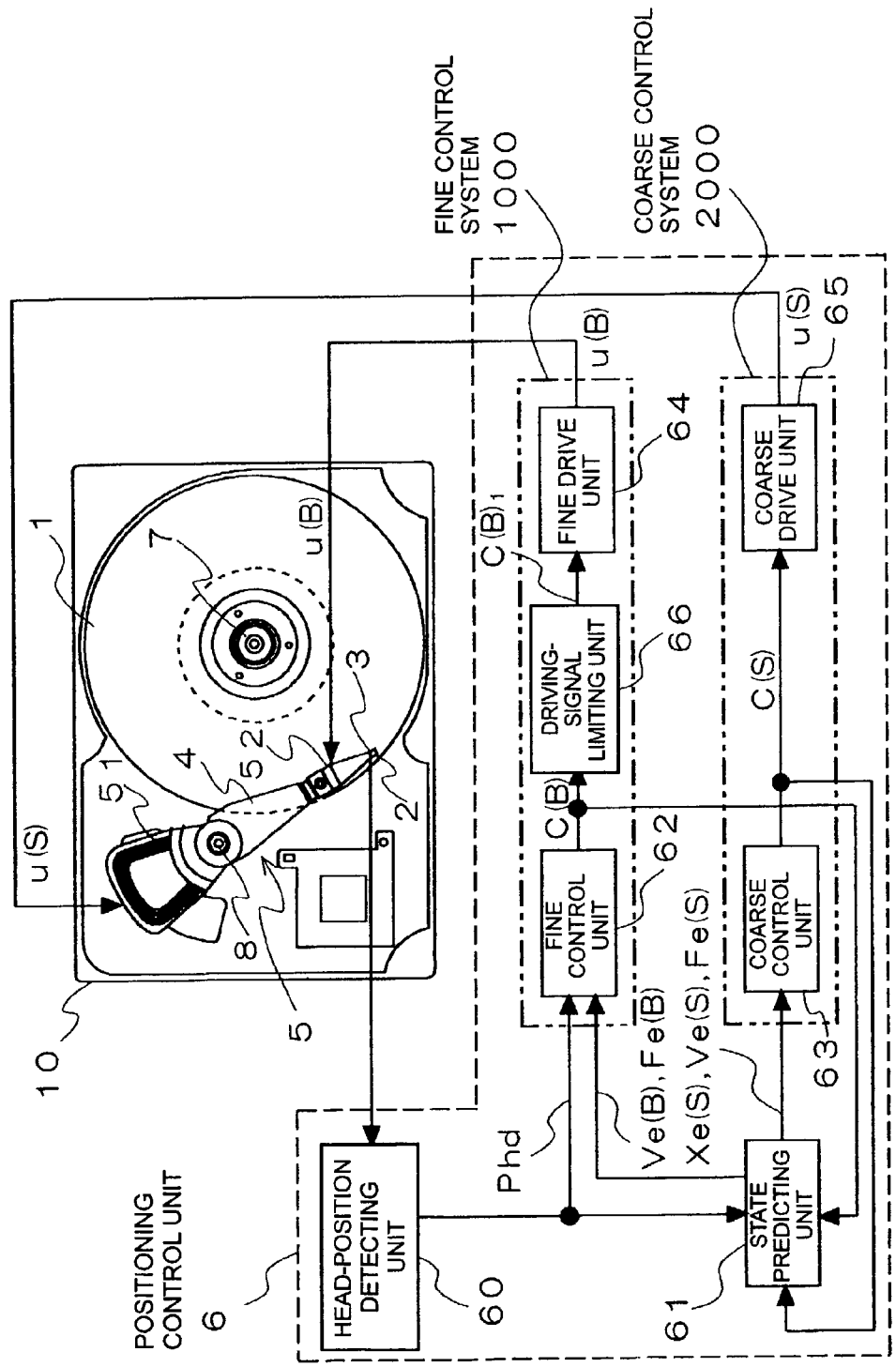
FIG. 1 is a schematic configuration view of a magnetic disk drive including a head positioner according to a first embodiment of the present invention.

Hereinbelow, a first embodiment will be described with reference to FIGS. 1 to 11. Referring to FIG. 1 (showing the configuration of a magnetic disk drive), the reference numerals/symbols denotes the portions as follows: 1 for a magnetic disk; 2 for a compound magnetic head including write and read heads; 3 for a head slider; 4 for a head supporting mechanism; 5 for a positioning mechanism; 51 for a coarse actuator formed of a voice coil motor (VCM); 52 for a fine actuator formed of a microactuator (MA) including a piezoelectric device (PZT device); 6 for a positioning control unit; 7 for a spindle motor; 8 for a rotational axis; 10 for a housing; 60 for a head-position detecting unit; 61 for a state predicting unit; 62 for a fine control unit; 63 for a coarse control unit; 64 for a fine drive unit; 65 for a coarse drive unit; 66 for a driving-signal limiting unit 66; 1000 for a fine control system configured inclusive of the fine control unit 62, the fine drive unit 64, and the driving-signal limiting unit 66; 2000 for a coarse control system configured to include the coarse control unit 63 and the coarse drive unit 65.

Figure 2:
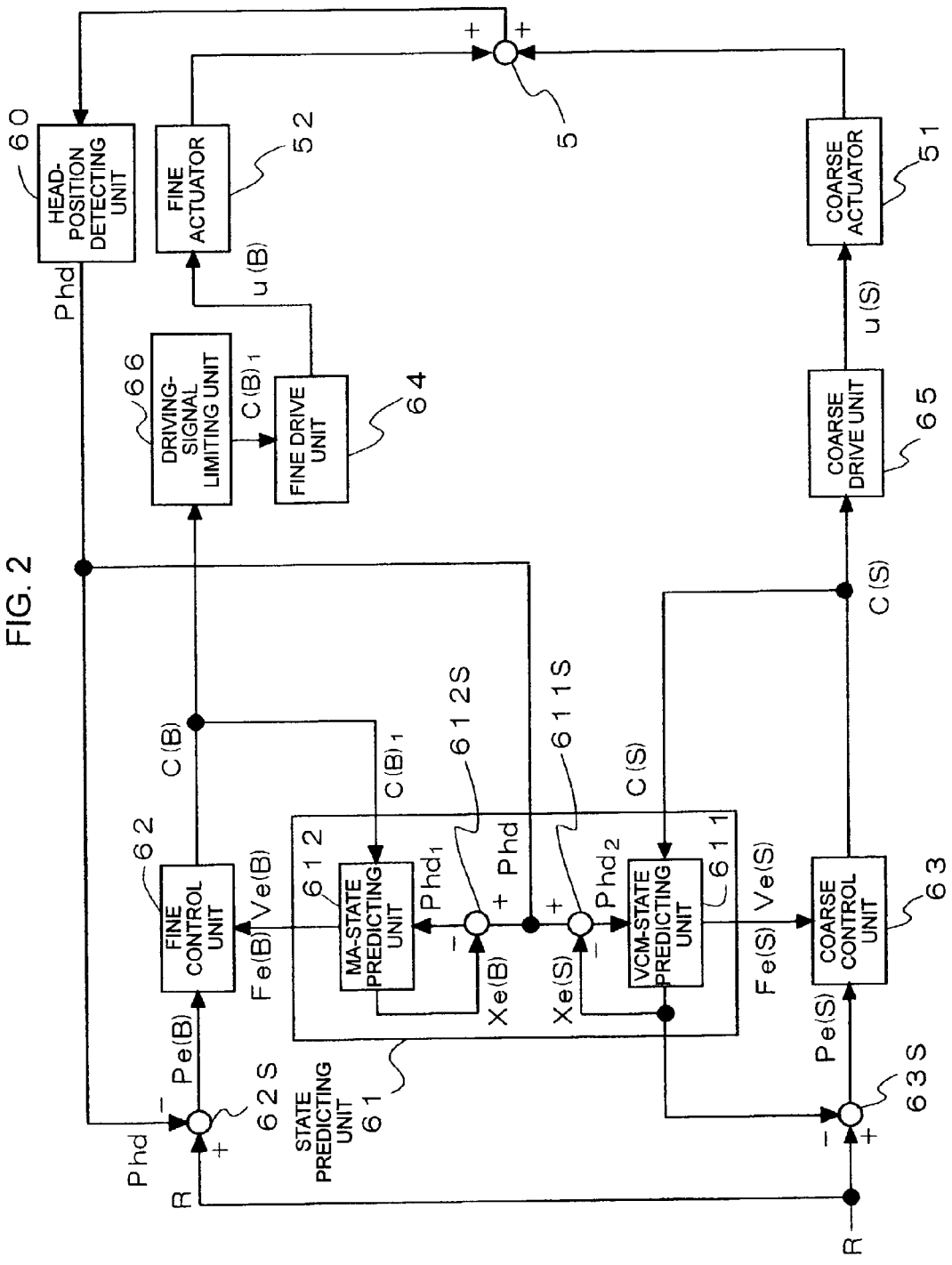
FIG. 2 is a block diagram showing a configuration of the head positioner according to the first embodiment.

The compound head 2 is configured to include a read head and a write head. The read head is formed of a GMR head (giant magnetoresistive head) using a GMR effect, and the write head is formed of an inductive magnetic head. These heads are mounted to the head slider 3. As shown in FIG. 2, the state predicting unit 61 is configured as a mathematical model for the fine actuator 52, which is formed of the VCM, and the fine actuator 52, which is formed of the MA. That is, the state predicting unit 61 includes a VCM-state predicting unit 611 and an MA-state predicting unit 612. The head supporting mechanism 4 supports the head slider 3, and therethrough supports the compound-type magnetic head 2 so that it opposes the disk 1. When the coarse actuator 51 drives the head supporting mechanism 4 to rotate about the rotational axis 8 as the center, the compound-type magnetic head 2 is moved together with the fine actuator 52. The fine actuator 52 is disposed between the head supporting mechanism 4 and the head slider 3. The fine actuator 52 thus disposed drives the head slider 3 to position the head 2 on a desired track of the disk 1. The coarse actuator 51 performs coarse positioning control of the head 2 to the fine actuator 52, whereas the coarse actuator 51 performs fine positioning control of the head 2 to the desired track. For preliminary information, embodiments discussed below include those having a plurality of disks 1 and pluralities of individually corresponding heads 2, head sliders 3, fine actuators 52, and head supporting mechanisms 4. In this configuration, the coarse actuator 51 moves the plurality of head supporting mechanism 4 in batches.

Hereinbelow, operation sequences of a servo system in the magnetic disk drive will be described. Control is performed such that the head 2 is moved on the disk 1 according to a dual-stage actuator that is formed of the coarse actuator 51 and the fine actuator 52, and the head 2 is positioned on-track according to cooperative operation of the two actuators. The read head of the head 2 detects a servo pattern as position information prewritten on the disk 1, and then sends a detected signal indicative of the position information to the head-position detecting unit 60 in the positioning control unit 6. In response to the received position information, the head-position detecting unit 60 detects the current position of the head 2, and feeds it as a head position signal Phd to the fine control unit 62 and the state predicting unit 61.

Figure 3:
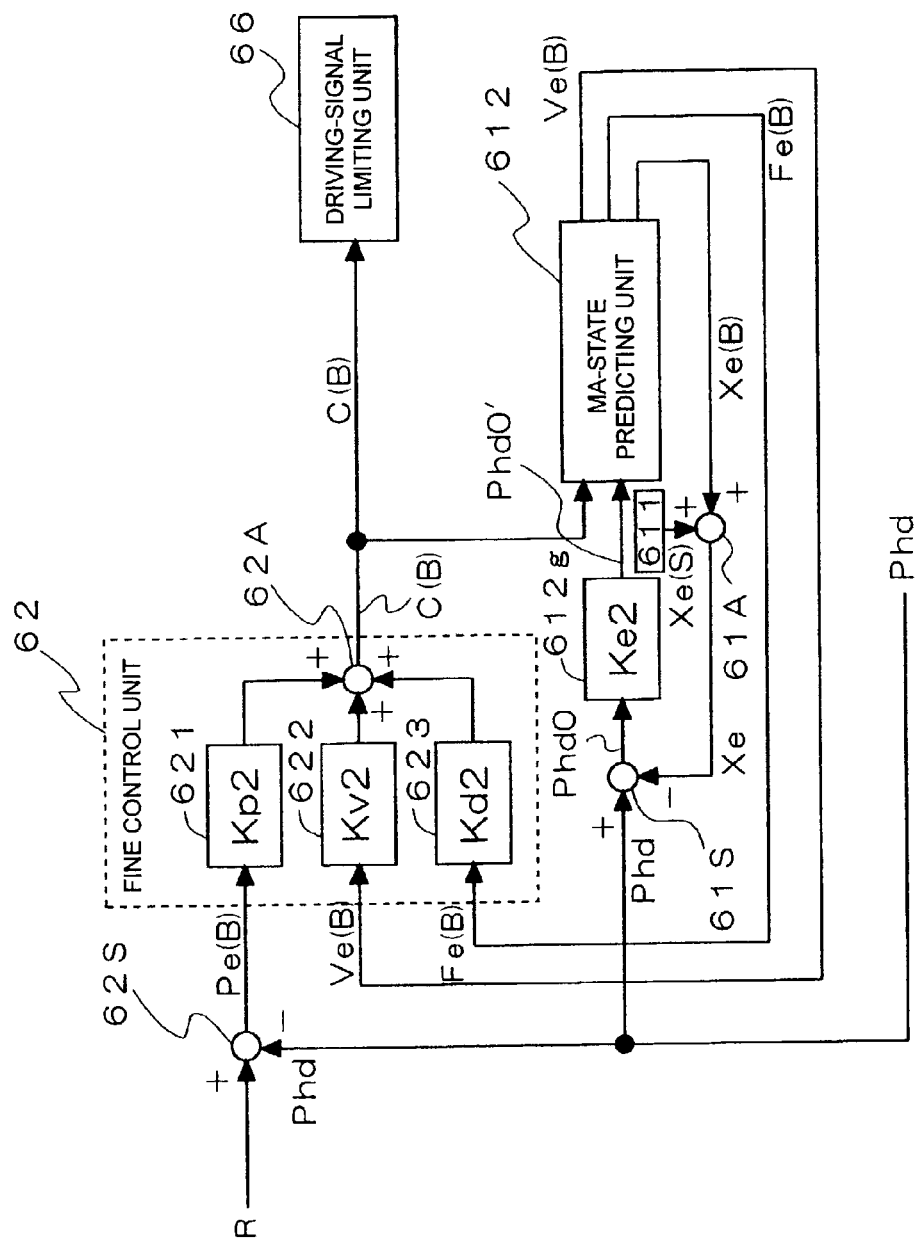
FIG. 3 is a block diagram showing a configuration of a fine control system according to the first embodiment.

Next, the fine control system 1000 will be described hereinbelow. As shown in FIG. 3, the fine control system 1000 is configured of a subtracter 62S, the MA-state predicting unit 612 in the state predicting unit 61 (in the state predicting unit 61 functioning as a state predicting unit for the fine actuator 52 ), the driving-signal limiting unit 66, and the fine drive unit 64. The head position signal Phd is input to the subtracter 62S from the head-position detecting unit 60. In the subtracter 62S, the differential between a desired position signal R and the head position signal Phd is taken out therefrom; and as a result, a position error signal Pe(B) indicative of the differential is fed into the fine control unit 62. The fine control unit 62 inputs the position error signal Pe(B) as well as a prediction speed signal Ve(B) and a prediction disturbance signal Fe(B) from the MA-state predicting unit 612 provided in the state predicting unit 61 (refer to FIGS. 2 and 3 ). Then, the predicting unit 612 outputs the signal to the driving-signal limiting unit 66.

As shown in FIG. 3, the MA-state predicting unit 612 inputs the head position signal Phd from the head-position detecting unit 60 and a fine control signal C(B) used as a feedback element from the fine control unit 62. According to the two signals, the MA-state predicting unit 612 predicts disturbances (such as force disturbances and positional disturbances) that will be imposed on the movement speed of the head 2 and on the head 2. Then, the MA-state predicting unit 612 calculates a prediction displacement signal Xe(B), a prediction speed signal Ve(B), and a prediction disturbance signal Fe(B) associated with the fine actuator 52. Thereafter, the MA-state predicting unit 612 outputs a prediction speed signal Ve(B) and the prediction disturbance signal Fe(B) to the fine control unit 62, and outputs a prediction displacement signal Xe(B) to an adder 61A. The adder 61A performs the addition of the prediction displacement signal Xe(B) associated with the fine actuator 52 to a prediction displacement signal Xe(S) associated with the coarse actuator 51, calculates a total prediction displacement signal Xe, and outputs the signal to a subtracter 61S. The subtracter 61S generates a prediction position error signal Phd0 obtained through subtraction of the total prediction displacement signal Xe from the head position signal Phd. A compensation signal Phd0' is obtained through multiplication of an MA-state prediction unit gain 612g with the aforementioned prediction position error signal Phd0'.

The fine control unit 62 multiplies a position-error feedback gain 621, a speed feedback gain 622, and a disturbance-amount feedforward gain 623 with the respective position error signal Pe(B), prediction speed signal Ve(B) and prediction disturbance signal Fe(B). Then, the fine control unit 62 outputs the resultant signals to an adder 62 A. Upon receipt, the adder 62 A performs the addition of the three signals and outputs the fine control signal C(B) to the driving-signal limiting unit 66 and the MA-state predicting unit 612. The fine control signal C(B) reduces the magnitude of the position error signal Pe (B). In the above case, the fine control unit 62 may be configured such as to multiply individual coefficients of a proportional differentiator (phase lead compensator) and an integrator with the input position error signal Pe(B) and to thereby generate the fine control signal C(B).

The fine control signal C(B), which has been output from the fine control unit 62, is not directly fed into the fine drive unit 64, but is beforehand fed into the driving-signal limiting unit 66. The driving-signal limiting unit 66 limits the level of the fine control signal C(B) and generates a real fine control signal $C(B)_1$. This is done so as to drive the fine actuator 52 at a threshold that is equal to or lower than a threshold at which the properties of the piezoelectric device (PZT device), which constitutes the fine actuator 52, begins to deteriorate because of erosion caused by electrochemical reaction. Having been input with the real fine control signal $C(B)_1$, the fine drive unit 64 generates a fine drive signal u(B), outputs the signal to the fine actuator 52, and thereby controls and drives the fine actuator 52.

Figure 4:
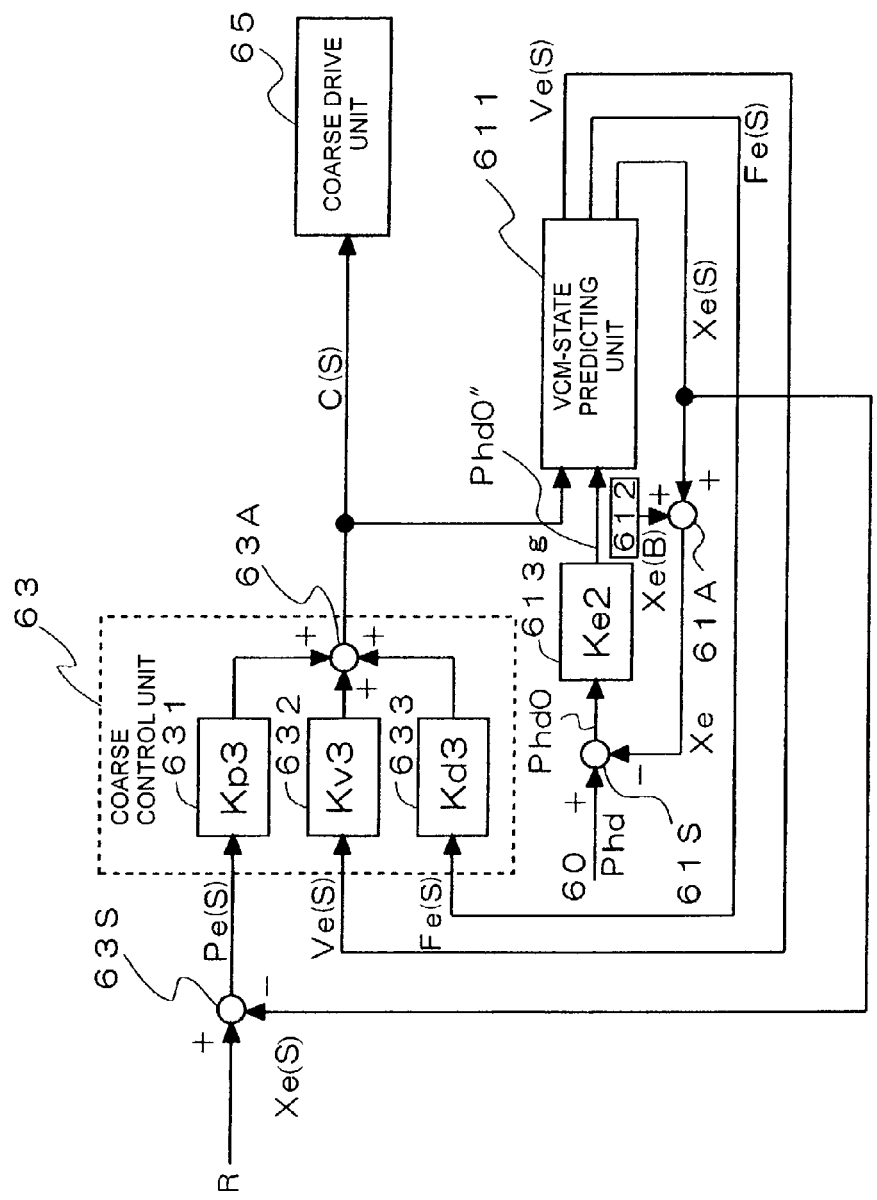
FIG. 4 is a block diagram showing a configuration of a coarse control system according to the first embodiment.
Figure 5:
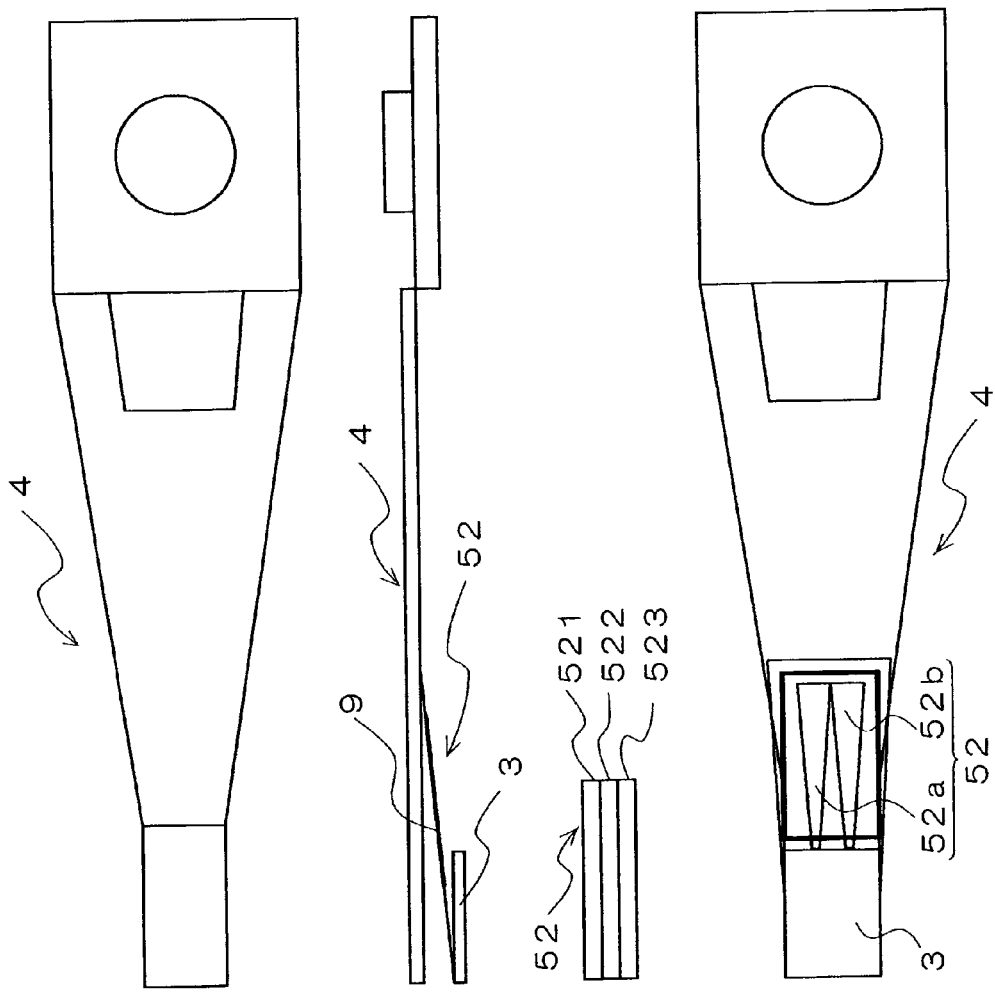
FIG. 5A is a plan view showing a configuration of a head supporting mechanism with a fine actuator.
FIG. 5B is a side view of the head supporting mechanism.
FIG. 5C is a configuration view of the fine actuator.
FIG. 5D is a bottom view showing a configuration of the head supporting mechanism.

As shown in FIG. 4, the coarse control system 2000 associated with the coarse actuator 51 is configured of a subtracter 63S, the coarse control unit 63, and the VCM-state predicting unit 611 functioning as a state predicting unit for the fine actuator 51. The VCM-state predicting unit 611 in the state predicting unit 61 predicts the current position of the head 2 according to the head position signal Phd received from the head-position detecting unit 60, and outputs a prediction displacement signal Xe(S) to the coarse control unit 63. The prediction displacement signal Xe(S), which has been fed to the coarse control unit 63 from the VCM-state predicting unit 611, is output to the subtracter 63S before being input to the coarse control unit 63. In the subtracter 63S, a differential between the desired position signal R and the prediction displacement signal Xe(S) is taken out, and the prediction displacement signal Xe(S) is fed as a compensation relative displacement signal Pe(S) into the coarse control unit 63. As shown in FIG. 4, the VCM-state predicting unit 611 predicts disturbances (such as force disturbances and positional disturbances) that will be imposed on the movement speed of the head 2 and on the head 2 according to a fed-back compensation signal Phd0" and the coarse control signal C(S) received from the coarse control unit 63. Then, the VCM-state predicting unit 611 calculates a prediction displacement signal Xe(S), a prediction speed signal Ve(S), and a prediction disturbance signal Fe(S) that are associated with the fine actuator 51. Thereafter, the VCM-state predicting unit 611 outputs the prediction displacement signal Xe(S) and the prediction disturbance signal Fe(S) to the coarse control unit 63, and outputs the prediction displacement signal Xe(S) to the adder 61A.

The state predicting unit 61A operates similarly as in the preceding case. The adder 61A performs the addition of the prediction displacement signal Xe(B) associated with the fine actuator 52 to a prediction displacement signal Xe(S) associated with the coarse actuator 51, calculates a total prediction displacement signal Xe that is associated with to the fine actuator 52 and the coarse actuator 51, and then outputs the signal to a subtracter 61S. Also the subtracter 61S operates similarly in the preceding case. That is, the subtracter 61S generates a prediction position error signal Phd0 obtained through subtraction of the total prediction displacement signal Xe from the head position signal Phd. The compensation signal Phd0" is obtained through multiplication of a VCM-state prediction unit gain 613g with the aforementioned prediction position error signal Phd0.

In the coarse control unit 63, a position-error feedback gain 631, a speed feedback gain 632, and a disturbance-amount feedforward gain 633 are multiplied with the compensation relative displacement signal Pe(S), the prediction speed signal Ve(S), the prediction disturbance signal Fe(S), respectively. Thereafter, these individual signals are added in an adder 63A; and as a result, a coarse control signal C(S) for controlling the compensation relative displacement signal Pe(S) to be close to zero is calculated. The coarse control signal C(S) is then output to the coarse drive unit 65, and is fed back to the VCM-state predicting unit 611. In the above, the arrangement may be made such that the coarse control signal C(S) is provided to the VCM-state predicting unit 611 so as to be feed forwarded thereto. The coarse control unit 63 may be configured so as to multiply individual coefficients of a proportional differentiator (phase lead compensator) and an integrator with the input compensation relative displacement signal Pe(S) to thereby generate the coarse control signal C(S). Having been input with the coarse control signal C(S), the coarse drive unit 65 generates a coarse drive signal u(S), outputs the signal to the coarse actuator 51, and thereby controls and drives the coarse actuator 51.

Thus, each of the actuator control systems carries out the operation sequences described above.

As shown in FIGS. 5A to 5D, the head slider 3 is supported to the head supporting mechanism 4 via a flexure 9 (flexible printed circuit board), and the fine actuator 52 is provided drivable on the flexure 9. The fine actuator 52 is formed of a pair of subactuators 52a and 52b. Each of the subactuators 52a and 52b is formed of an upper electrode 521, an piezoelectric device 522, and a lower electrode 523. In this configuration, the two piezoelectric devices are driven in a push-pull manner, and the amount of deformation of the individual piezoelectric devices is converted by an expansion mechanism into the amount of displacement of the head 2. According to the expansion mechanism, the head slider 3 rotationally moves on a pivot in the center, and the head 2 is pivotably moved. In this configuration, the center of gravity and the center of rotational movement are aligned with each other.

Hereinbelow, a description will be made regarding erosion of a piezoelectric device, which can occur because of electrochemical reaction, with reference to an example case where the piezoelectric device is formed of a PZT device. The PZT device is a typical device formed of a ceramic piezoelectric material, and it is expressed using chemical symbols as follow:

$$Pb(Zr,Ti)O_3 \qquad (1)$$

Generally, the PZT device is produced according to a sintering method that includes a powdering step and a sintering step. A thin-film PZT device is deposited according to, for example, sol-gel techniques, sputtering techniques, or CVD (chemical vapor deposition) techniques.

An example PZT thin-film is expressed by the following composition formula:

$$\{Pb(Zr_{0.53}Ti_{0.47})\}_{0.8} + (PbO)_{0.2} \quad (2)$$

In this example, the ratio of Zr:Ti is 53:47, and lead oxide (PbO) is excessively included by 20%. In the lead oxide, electrochemical reaction is caused by moisture permeating through the device during the processing or by moisture permeating through the device in the atmospheric environment during operation. The lead oxide (PbO) chemically reacts as follows:

When the hydrogen ion exponent (PH) is PH>9, $$PbO + H_2O \rightarrow H^+ + HPbO_2^- \quad (3)$$

When PH<9, $$PbO + H_2O \rightarrow Pb^{2+} + 2OH^- \quad (4)$$

Figure 6:
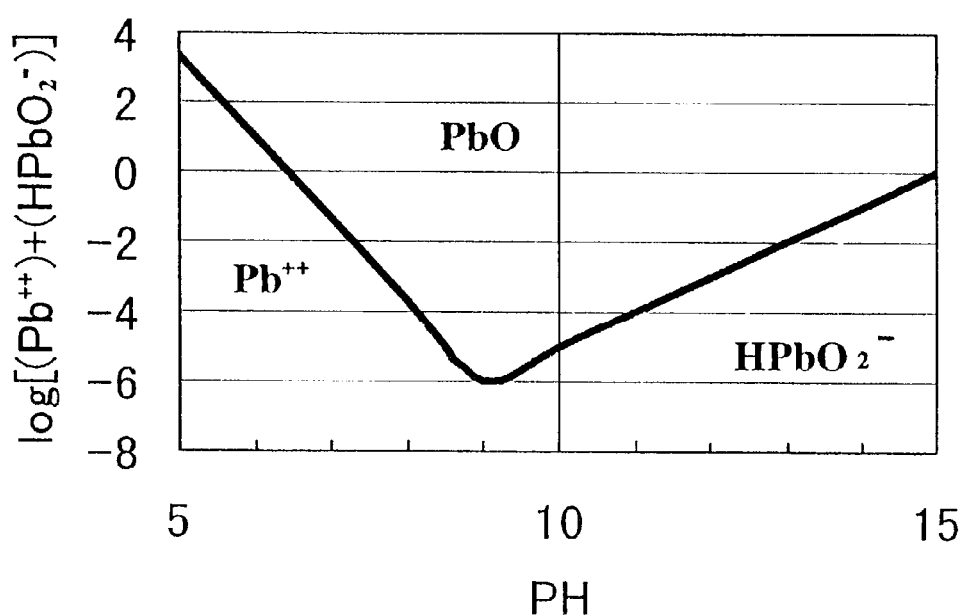
FIG. 6 is an explanatory view showing an electrochemical reaction of lead oxide in a PZT device.

Accordingly, as shown in FIG. 6, the lead oxide (PbO) is conditioned near PH=9 at which it is most stabilized; and as acidic, the lead ions $PbO^+$ is generated. That is, the lead oxide (PbO) in the PZT device reacts with moisture in the device to become lead ions.

Figure 7:
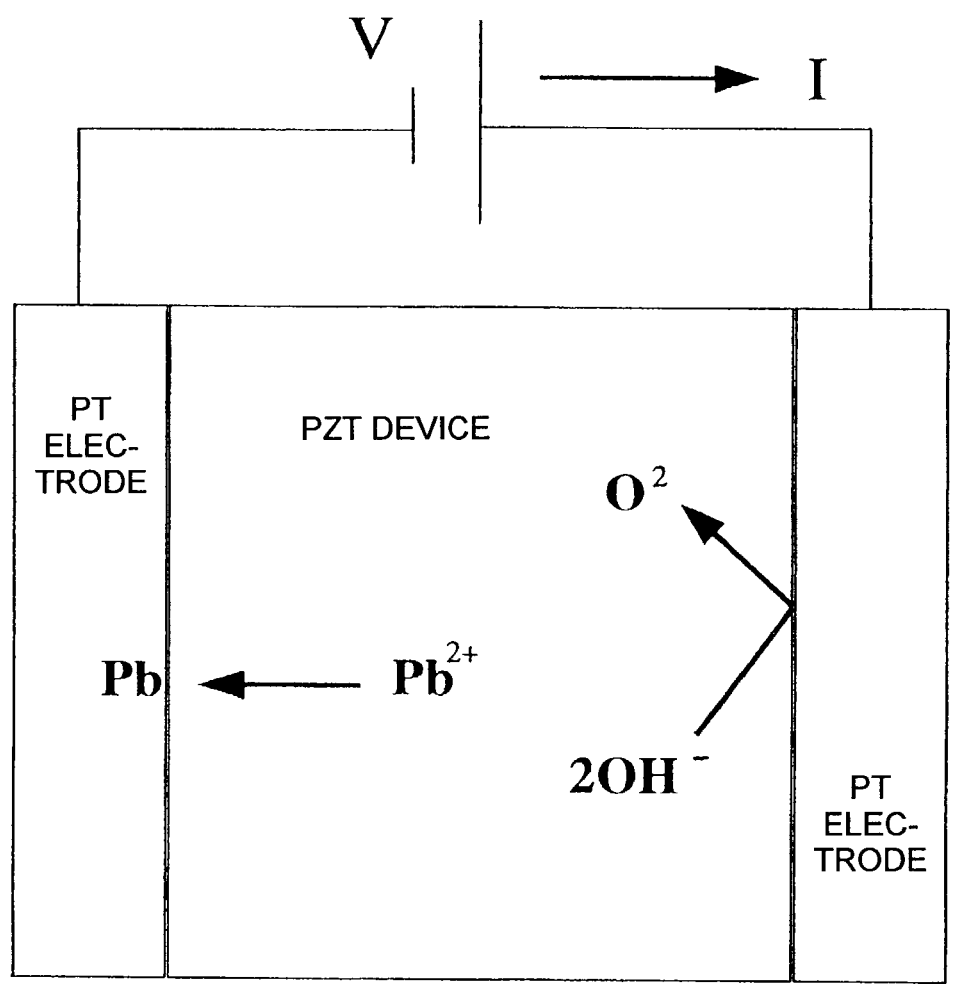
FIG. 7 is a schematic view showing an electrochemical reaction of the PZT device.

Referring to FIG. 7, Pt electrodes are disposed on two sides of the PZT device, and voltage is applied to the electrodes. In this case, the electrochemical reaction including precipitation of lead at the anodic side and the cathodic side is expressed by the following chemical formulas:

On the anodic side (positive side);

$$4OH^- \rightarrow 2H_2O + O_2 + 4e^- \quad (5)$$

On the cathodic side (negative side);

$$Pb^{2+} + 2e^- \rightarrow Pb \quad (6)$$

According to Formula (5), hydrogen and oxygen occurs from hydroxyl ions on the anodic side; and according to Formula (6), lead precipitates on the cathodic side. The reactions are summarized as:

$$2Pb^{2+} + 4OH^- \rightarrow 2Pb + 2H_2O + O_2 \quad (7)$$

As such, lead precipitates when the fine actuator 52 is driven with voltage being applied to the PZT device. Consequently, the anodic and cathodic electrodes can cause short-circuiting because of the presence of lead.

As above, description has been made regarding PBO excessively contained in the PZT device. However, also with a lead Pb component, provided as a composition element of the PZT device, lead ions precipitates because of water electrolysis occurring with voltage application.

The water electrolysis (electrochemical reaction) is expressed as follows:

On the anodic side;

$$2H_2O \rightarrow O_2 + 4H^+ + 4e^- \quad (8)$$

On the cathodic side;

$$2H^+ + 2e^- \rightarrow H_2 \quad (9)$$

As above, oxygen occurs at the anodic side, hydroxyl ions are attracted to the cathodic side, and water occurs there. In this case, since lead in the vicinity of the cathodic side has an increased tendency in comparison to water, the following chemical reactions occur:

$$Pb + 2H^+ \rightarrow Pb^{2+} + H_2 \quad (10)$$

$$Pb^{2+} + 2e^- \rightarrow Pb \quad (11)$$

That is, lead is ionized by hydroxyl ions caused in the water electrolysis. In addition, lead ions precipitates in the cathodic electrode.

However, the chemical reaction such as lead precipitation or electrolysis is characterized in that the reaction is abruptly accelerated at the voltage level exceeding a voltage threshold.

Figure 8:
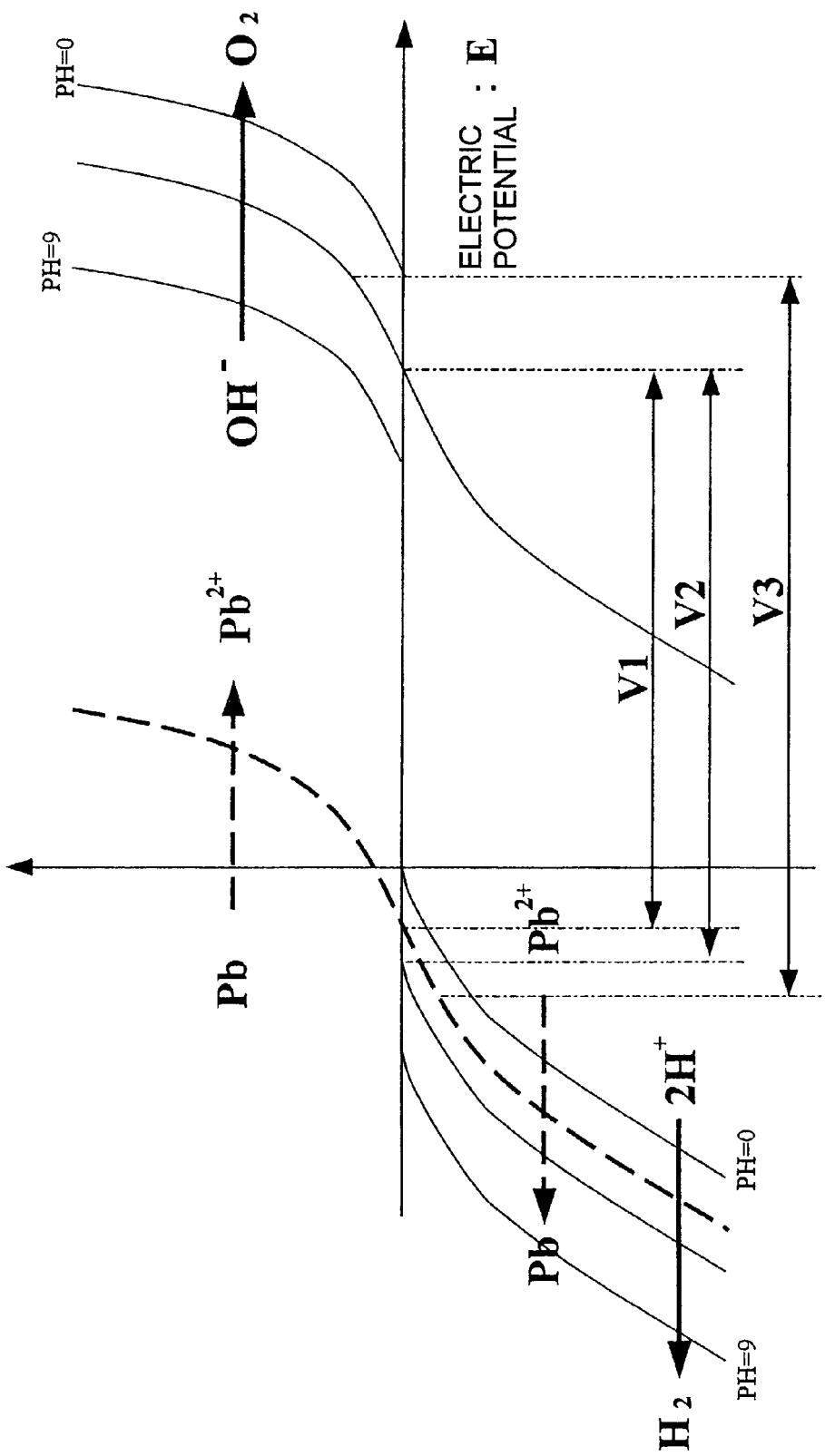
FIG. 8 is a view showing the relationship between an application voltage (potential difference) in an electrochemical reaction in which lead is precipitated and the current flowing to the PZT device.

In connection with the above, FIG. 8 shows the relationship between the voltage (potential difference) applied in the electrochemical reaction and the current flowing through the PZT device during the reaction. As shown in the figure, the reaction advances at a potential difference V1 or higher, and the current flowing through the device greater increases in proportion to the advancement of electrolysis. The electric potential at which the reaction advances is generally called "theoretical decomposition voltage" of lead. The theoretical decomposition voltage is 0.572 V at the events of the reactions shown by Formulas (5) and (6), and is 1.229 V at the events of the reactions shown by Formulas (8) and (9). The potential difference V1 is indicative of the theoretical decomposition voltage of lead, and a potential difference V2 is indicative of the theoretical decomposition voltage of water.

However, in practice, voltage called "oxygen overvoltage" needs to be added to the theoretical decomposition voltage to cause the electrolysis to advance and to generate oxygen. That is, the electrochemical reaction advances according to the application of the added voltages of the theoretical decomposition voltage and the oxygen overvoltage. The oxygen overvoltage is ranged from 0.37 to 0.47 V. In specific, in the event of driving and controlling the fine actuator by applying voltage to the PZT device, the voltage value at which the reactions expressed by the Formulas (5) and (6) is expressed by the following expression:

0.527+(0.37 to 0.47)≈0.97 to 1.0 V

The voltage value at which the reactions expressed by the Formulas (8) and (9) is expressed by the following expression:

1.229+(0.37 to 0.47)≈1.6 to 1.7 V

As can be known from the above, the lead-precipitating electrochemical reaction almost does not advance at 1 V or lower. In addition, at about 1.7 V or lower, also the influence in the atmospheric environment is accelerated according to the water electrolysis, whereas the lead-precipitating electrochemical reaction almost does not advance.

In practice, an arbitrary voltage of ±10 V is applied to the piezoelectric device corresponding to the position error for the reasons described hereafter.

In the fine actuator according to the present embodiment, since the electrode positive/negative polarities keep altering depending on the magnetic head position, lead Pb precipitates at the two sides. The PZT device has a small thickness on the order of μm. As such, the precipitated lead Pb causes short-circuiting and hence breakdown of the PZT device. However, as described above, the threshold voltages exist at which the chemical reaction between the lead Pb and the water electrolysis are the same in the qualitative aspect, and decomposition reaction is not caused (not accelerated). As such, in practice, there exist threshold voltages at which properties of the PZT device are within ranges that assures the lead Pb precipitation amount and chemical reaction speed as properties of the PZT device.

Figure 9:
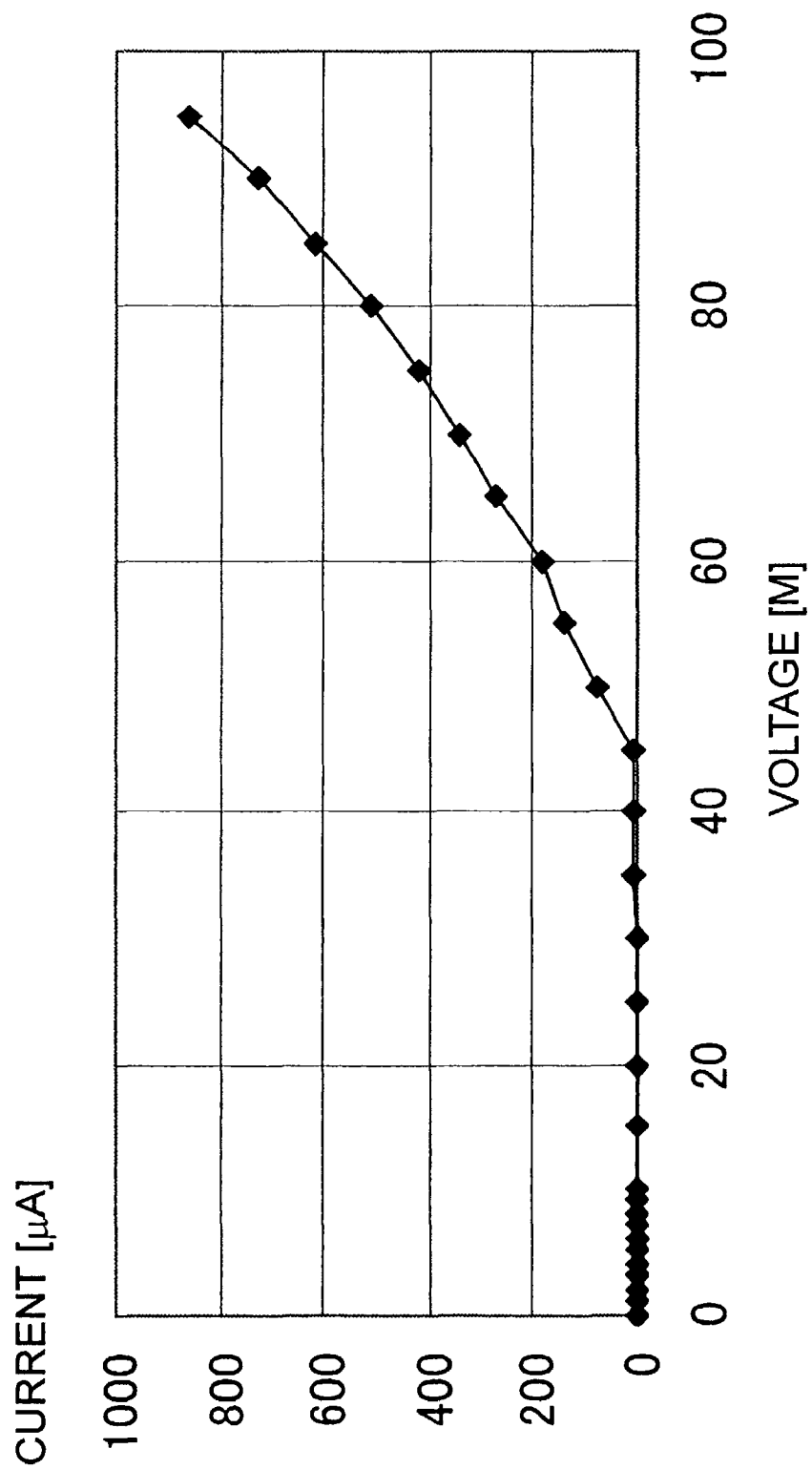
FIG. 9 shows the relationship between the application voltage for the PZT device and the current flowing thereto.

FIG. 9 shows the relationship between a voltage V [V] and a current I [μA] when voltage is applied to the PZT device of the fine actuator. The horizontal axis represents the application voltage, and the vertical axis represents the current flowing through the PZT device. According to the figure, the current flowing through the PZT device sharply increases in the vicinity of an application voltage of 50 V. In an application-voltage range of from 0 to 50 V, the application voltage V and current I are mutually related at a sufficiently low proportion factor, in which an electrical resistance value R is expressed as $R=V/I=10\times10^6[\Omega]=10$ [M$\Omega$]. In comparison, at an application voltage higher than 50 V, $V/I=70\times10^3[\Omega]$, in which the electrical resistance value is significantly small.

Figure 10:
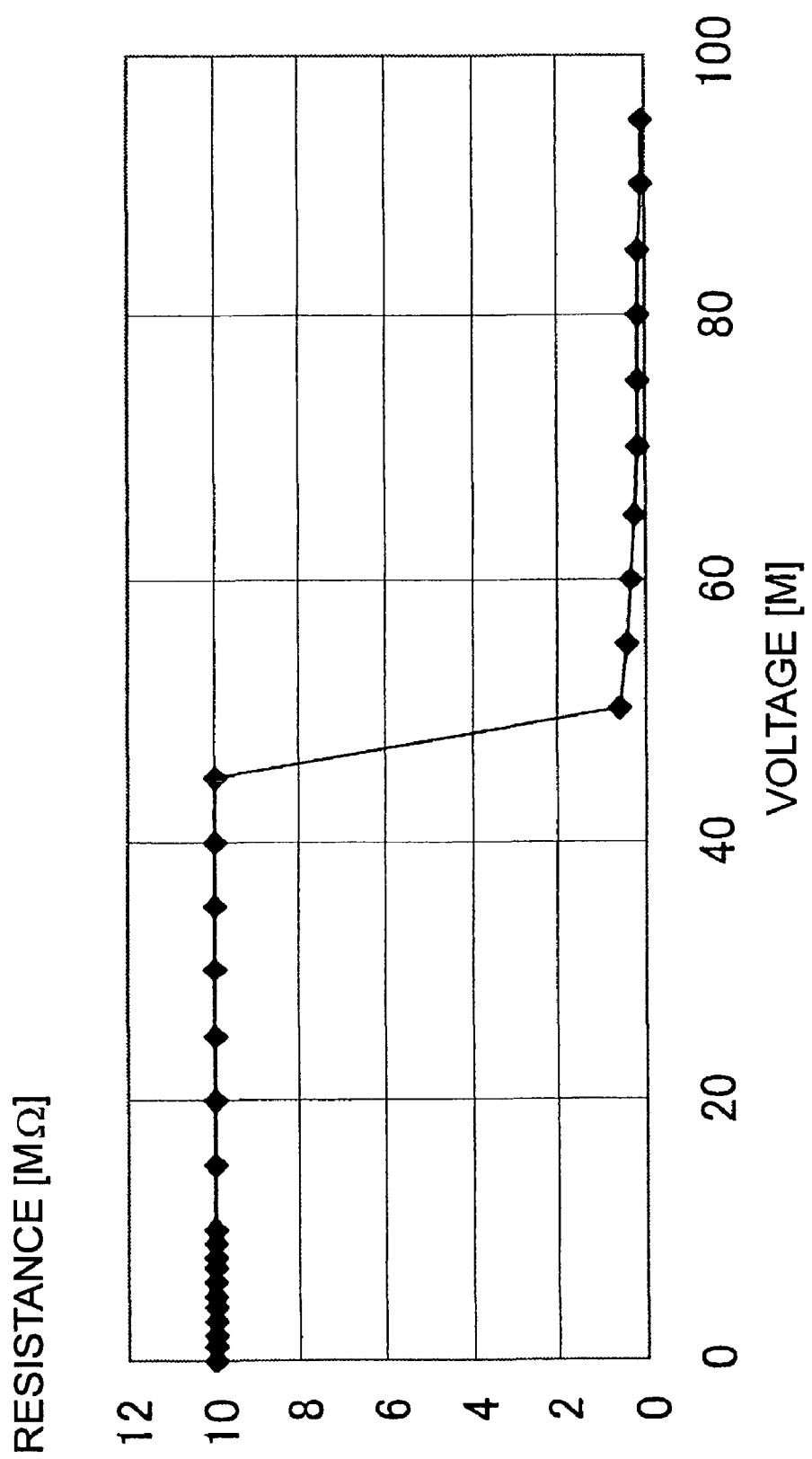
FIG. 10 shows the relationship between the application voltage for the PZT device and an internal electric resistance value thereof.

FIG. 10 shows the relationship between the application voltage and the electrical resistance value R in the state shown in FIG. 9. With a border of the application voltage of 50 V, the electric resistance of the 10 M$\Omega$ is reduced to a level of 70 to 100 k$\Omega$. At a further increased application voltage, the resistance value abruptly decreases. When the fine actuator is used in an excessively low band, a breakdown thereof can occur.

In consideration of the above, the arrangement should be made such that the PZT-device using fine actuator is driven in a voltage range that is not higher than the voltage corresponding to the abrupt electric-resistance changing point. In practice, this arrangement enables the prevention of short-circuiting in the PZT device as well as the breakdown of the fine actuator.

In more specific, the electric-resistance changing point is variable depending on the layer quality and the film thickness of the PZT device. The dependency to the layer quality is a matter relevant to the fabrication. However, to handle the matter regarding the dependency to the film thickness, the properties thereof need to be understood to arrange the driving system.

Figure 11:
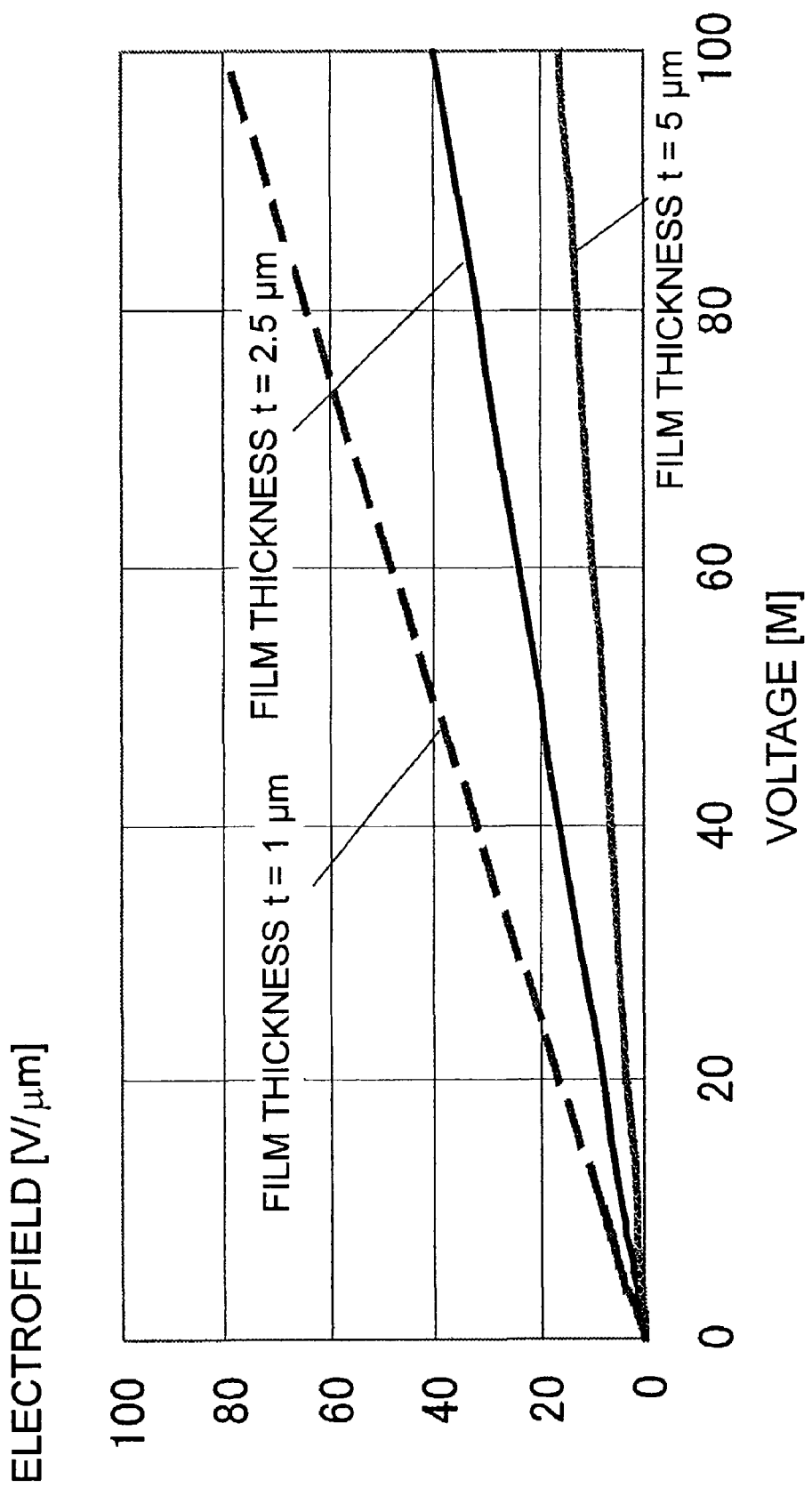
FIG. 11 is a view showing the relationship between the application voltage for the PZT device and the electrofield by using parameters representing film thicknesses.

FIG. 11 shows the relationship between an application voltage V and an electrofield (E=V/t) imposed on the PZT device when a film thickness t of the PZT device is ranged from 1 to 5 $\mu$m. For example, when the film thickness t of the PZT device constituting the fine actuator is 2.5 $\mu$m, the aforementioned application voltage not higher than 50 V corresponds to an electrofield of 20 V/$\mu$m or lower.

In addition, a safety factor of 0.2 is multiplied with a tolerance application voltage, the bias voltage is set to 0 V which is equal to or lower than the decomposition voltage, and the threshold of the application voltage is set to ±10 V. Specifically, under these conditions, the current can be used by controlling it so as to be equal to or lower than 1 $\mu$A. This arrangement enables the prevention of breakdown of the fine actuator and short-circuiting in the piezoelectric device.

In the present embodiment, the fine actuator constituted of the PZT device is driven and controlled by the driving-signal limiting unit 66 at voltages that is equal to or lower than the above-described threshold (decomposition voltage) or the vicinity thereof.

FIGS. 12 show simulation results of an embodied example according to the present embodiment. Conditions of the simulation are as follows:

| | |
|---|---|
| Rotational speed: | 12,000 r/min |
| Track density: | 45,000 track/inch |
| Track pitch: | 0.56 $\mu$m |
| Sampling frequency: | 20 kHz |
| Servo band: | 1.5 kHz |

Threshold for the driving-signal limiting unit: 1.2 V

FIGS. 12A to 12D each shows a simulation experiment result performed using a configuration in which a servo loop of a microactuator includes the driving-signal limiting unit 66.

Figure 12B:
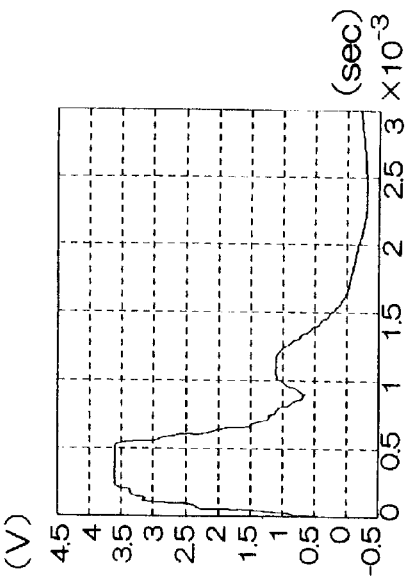
FIG. 12B is a view showing a driving voltage for the fine actuator as a result of simulation at the track jump event in the first embodiment.
Figure 12D:
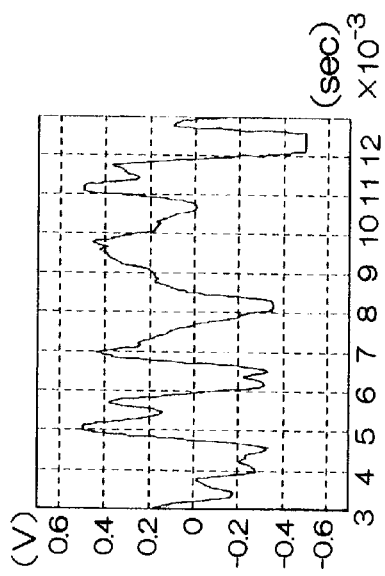
FIG. 12D is a view showing a driving voltage for the fine actuator as a result of simulation at the track-following event in the first embodiment.
Figure 12A:
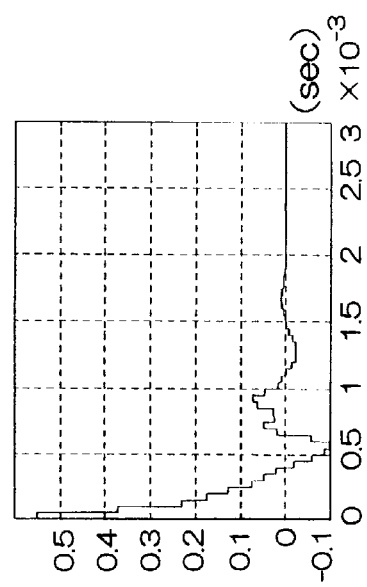
FIG. 12A is a view showing a head positional error as a result of simulation at a track jump event in the first embodiment.
Figure 12C:
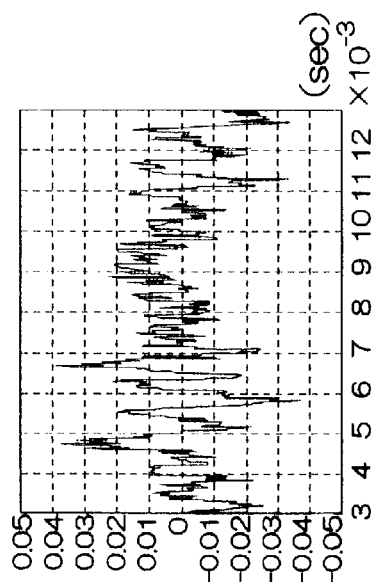
FIG. 12C is a view showing a head positional error as a result of simulation at a track-following event in the first embodiment.

FIGS. 12A and 12B each shows the simulation experiment result at a track jump event; specifically, FIG. 12A shows head positions (position errors), and FIG. 12B shows driving voltages for the fine actuator 52 at that event. FIGS. 12C and 12D each shows the simulation experiment result at a track following event; specifically, FIG. 12C shows head positions (position errors), and FIG. 12D shows driving voltages applied to the fine actuator 52 at that event.

The simulation results teach the following. According to the magnetic disk drive of the present embodiment, at a track jump event, when head position errors converge to zero, also displacements of the fine actuator 52 converge to zero. According to FIG. 12B, under the condition where 3.6 V is set to the threshold for the driving voltage for the fine actuator 52, 3.6 V is applied for 0.4 msec. However, the voltage decreases thereafter, keeping decreasing to 1 V or lower after 0.7 msec has passed. At the track-following event, it is conditioned for the position error such that a 10% track pitch is on-tracked. According to FIG. 12D, while the driving voltage for the fine actuator 52 is limited to 0.5 V or lower, the head 2 is positioned stable.

As described above, while the application voltage to the fine actuator 52 is limited by the driving-signal limiting unit 66, the positioning accuracy can be maintained stable.

The present embodiment developed to carry out by software makes the positioning control method including the following steps:

(1) Step 1—Generates position-error data from position error data and desired position data used for positioning. The position error data represents an error occurred between an error in head position data received from servo information on a disk which is to be read by a head, and desired position data is used for positioning.

(2) Step 2—Generates fine control data used for controlling the amount of displacement of the fine actuator of the head, according to the position error data.

(3) Step 3—Generates real fine control data obtained by limiting the fine control data according to the threshold at which property deterioration occurs because of the electrochemical reaction of the piezoelectric device constituting the fine actuator. Then, the step replaces the real fine control data with the fine control data, and outputs the fine control data to the fine actuator.

(4) Step 4—Inputs relative displacement data corresponding to the amount of displacement of one of the coarse actuator and the fine actuator.

(5) Step 5—Generates coarse control data for controlling the amount of displacement of the coarse actuator, according to the relative displacement data.

(6) Step 6—Outputs to the coarse actuator a signal based on the coarse control data to be used as a coarse drive signal.

A group of steps (1) to (3) and a group of steps (4) to (6) may be processed in the form of parallel processing to synchronously proceed. Alternatively, the two groups may be processed in the form of sequential processing to precede one of them.

The above-described head-positioning control method is thus capable of solving the problem of property deterioration of the piezoelectric device that can occur because of a high-level drive signal. In addition, the head-positioning control method is capable of maintaining the function of high-speed and high-accuracy positioning the head on a desired track for a long time. Consequently, the head-positioning control method effectively operates for the implementation of a high-record-density disk drive unit.

(Second Embodiment)

Figure 13:
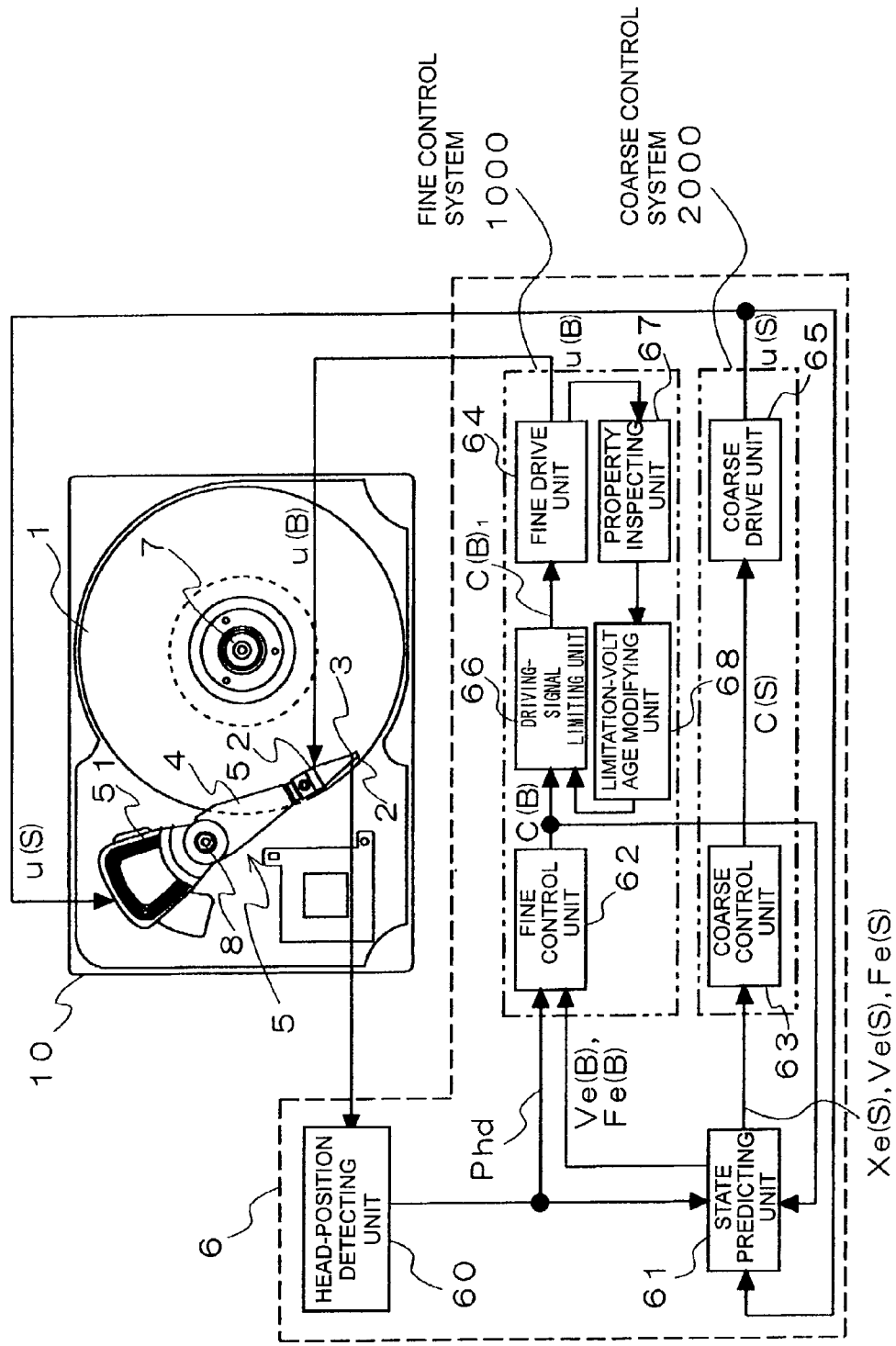
FIG. 13 is a schematic configuration view of a magnetic disk drive including a head positioner according to a second embodiment of the present invention.

Hereinbelow, a second embodiment of the invention will be described with reference to FIG. 13. In FIG. 13, the same reference numeral/symbols are used to refer to the same configuration members as those of the first embodiment shown in FIG. 1. In the second embodiment, a property inspecting unit 67 and a limitation-voltage modifying unit 68 is additionally provided. The property inspecting unit 67 measures the relationship between the voltage output from the fine drive unit 64 to the fine actuator 52 and the current flowing to the piezoelectric device of the fine actuator 52, and performs inspection for existing of an overcurrent. The limitation-voltage modifying unit 68 modifies the threshold set in the driving-signal limiting unit 66 according to the inspection result obtained by the property inspecting unit 67.

Ordinarily, the current flowing through the piezoelectric device is equal to or lower than a current Io (Io=$1 \times 10^{-1}$ [μA]). However, when a case can occur in that moisture in the atmosphere in, for example, a high-temperature-and-humidity environment, permeates into the device, or moisture permeates into the device during processing. In this case, the current flowing at a voltage higher than the decomposition voltage increases one hundred times or higher on the order. The decomposition voltage is theoretically constant while it depends on the material. In practice, however, there are individuality variations in property including, for example, oxygen-overvoltage variations and composition variations. As such, the threshold of the driving voltage needs to be regulated for each fine actuator.

The displacement property of the fine actuator 52 deteriorates when the electrochemical reaction is accelerated because of the flow of a current that is higher than the intra-piezoelectric-device current Io by a predetermined multiple (for example, 10) thereof. The property inspecting unit 67 detects current flowing through a driving circuit by using a detection resistance, derives the value of the current flowing in the piezoelectric device from a detected voltage value, and compares it with the value of the current Io. If the value of the current Io is greater than the aforementioned predetermined multiple (for example, 10), the limitation-voltage modifying unit 68 reduces the threshold voltage set in the driving-signal limiting unit 66 by 0.1 (V). These operations are iterated, thereby preventing the property deterioration of the fine actuator 52. As described above, the additional provision of the limitation-voltage modifying unit 68 enables the positioning accuracy to be maintained stable while limiting the application voltage for the fine actuator 52.

The present embodiment developed to carry out by software makes the positioning control method including the following steps:

(1) Step 1—Generates position-error data from position error data and desired position data used for positioning. The position error data represents an error occurred between an error in head position data received from servo information on a disk which is to be read by a head, and desired position data is used for positioning.

(2) Step 2—Generates fine control data used for controlling the amount of displacement of the fine actuator of the head, according to the position error data.

(3) Step 3—Inspects variations in either in the displacement property or the electrical resistance property of the fine actuator. Then, according to the property variations, the step modifies the threshold (threshold at which the property variations occur because of the electrochemical reaction of the piezoelectric device constituting the fine actuator. Subsequently, the step generates real fine control data generated by limiting the fine control data by using the modified threshold, and outputs the real fine control data to the fine actuator.

(4) Step 4—Inputs relative displacement data corresponding to the amount of displacement of one of the coarse actuator and the fine actuator.

(5) Step 5—Generates coarse control data for controlling the amount of displacement of the coarse actuator, according to the relative displacement data.

(6) Step 6—Outputs to the coarse actuator a signal based on the coarse control data to be used as a coarse drive signal.

A group of steps (1) to (3) and a group of steps (4) to (6) may be processed in the form of parallel processing to synchronously proceed. Alternatively, the two groups may be processed in the form of sequential processing to precede one of them.

The above-described head-positioning control method is thus capable of implementing the control of the head actuators with high accuracy regardless of individuality variations in properties of the piezoelectric devices and humidity variations in the use environment, particularly, humidity variations.

(Third Embodiment)

Figure 14:
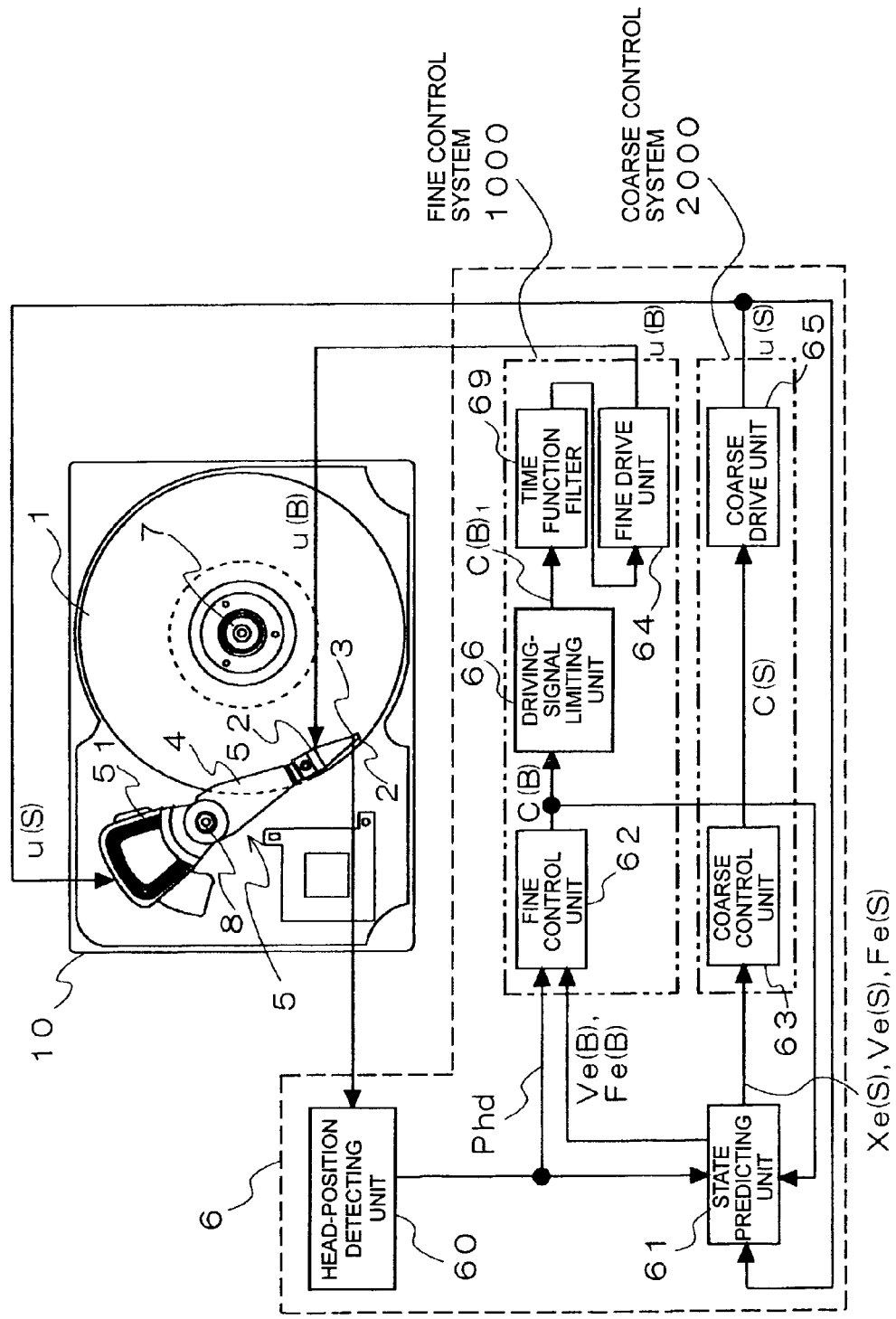
FIG. 14 is a schematic configuration view of a magnetic disk drive including a head positioner according to a third embodiment of the present invention.

Hereinbelow, a third embodiment of the invention will be described with reference to FIG. 14. In FIG. 14, the same reference numeral/symbols are used to refer to the same configuration members as those of the first embodiments shown in the FIG. 1. In the third embodiment, a time function filter 69 is additionally provided. When the voltage having been output to the fine actuator 52 from the fine drive unit 64 is equal to or lower than the threshold, the time function filter 69 outputs the voltage as it is. However, when the voltage is higher than the threshold, the time function filter 69 limits the time during which outputs are continually produced. As in the second embodiment, the function of the time function filter 69 is provided as a countermeasure against the permeation of moisture. Since the current value increases as electroconductive time passes, when a driving voltage higher than or equal to the threshold is applied, a continuous drive output time is limited.

When performing positioning control for the head 2 in, for example, in a settling mode or a truck jump mode, the time function filter 69 operates according to a driving voltage that increases higher than or equal to a decomposition voltage of 2.2 V. As such, the time function filter 69 is provided to function such that when the driving voltage is higher than or equal to 4 V, the time is set equal to or less than 200 μsec. Similarly, when the driving voltage is higher than or equal to 3 V and lower than 4 V, the time is set the time is set equal to or less than 400 μsec; and when the driving voltage is higher than or equal to 2 V and lower than 3 V, the voltage is set equal to or less than 500 μsec. Thereby, the current flowing into the piezoelectric device can be prevented from being abruptly increased because of the electrolysis. In this way, the additional provision of the time function filter 69 enables the positioning accuracy to be maintained stable while limiting the application voltage for the fine actuator 52.

As above, the present embodiment has been described with reference to the example case where the decomposition voltage is 2.2 V. However, taking a safety allowance into account, the threshold of the application voltage may be ±10 V, as described in the first embodiment with reference to FIGS. 6 to 11. Also in this case, effects similar effects can be obtained. Moreover, the time function filter 69 has been described with reference to the case of functioning in four stages depending on the individual driving voltage values. However, the time function filter 69 may be arranged to work in an arbitrary number of stages as long as being capable of limiting the continuous output time to thereby prevent the current flowing into the piezoelectric device from being increased.

The present embodiment developed to carry out by software makes the positioning control method including the following steps:

(1) Step 1—Generates position-error data from position error data and desired position data used for positioning. The position error data represents an error occurred between an error in head position data received from servo information on a disk which is to be read by a head, and desired position data is used for positioning.

(2) Step 2—Generates fine control data used for controlling the amount of displacement of the fine actuator of the head, according to the position error data.

(3) Step 3—Generates real fine control data obtained by limiting the fine control data according to the threshold at which property deterioration occurs because of the electrochemical reaction of the piezoelectric device constituting the fine actuator. Then, the step outputs the real fine control data to the fine actuator. Subsequently, according to the real fine control data, the step limits the time during which the driving voltage is continuously output to the fine actuator.

(4) Step 4—Inputs relative displacement data corresponding to the amount of displacement of one of the coarse actuator and the fine actuator.

(5) Step 5—Generates coarse control data for controlling the amount of displacement of the coarse actuator, according to the relative displacement data.

(6) Step 6—Outputs to the coarse actuator a signal based on the coarse control data to be used as a coarse drive signal.

A group of steps (1) to (3) and a group of steps (4) to (6) may be processed in the form of parallel processing to synchronously proceed. Alternatively, the two groups may be processed in the form of sequential processing to precede one of them.

The above-described head-positioning control method is thus capable of implementing the control of the head actuators with high accuracy regardless of variations in the command-driving voltage.

In the magnetic disk drive, disturbances that are synchronous with the disk rotation (rotationally-synchronous disturbances) occur because of eccentricity of the disk. Fourth to ninth embodiments described below are capable of correcting the rotationally-synchronous disturbances and preventing the deterioration in the piezoelectric-device properties that can occur because of the electrochemical reaction.

(Fourth Embodiment)

Figure 15:
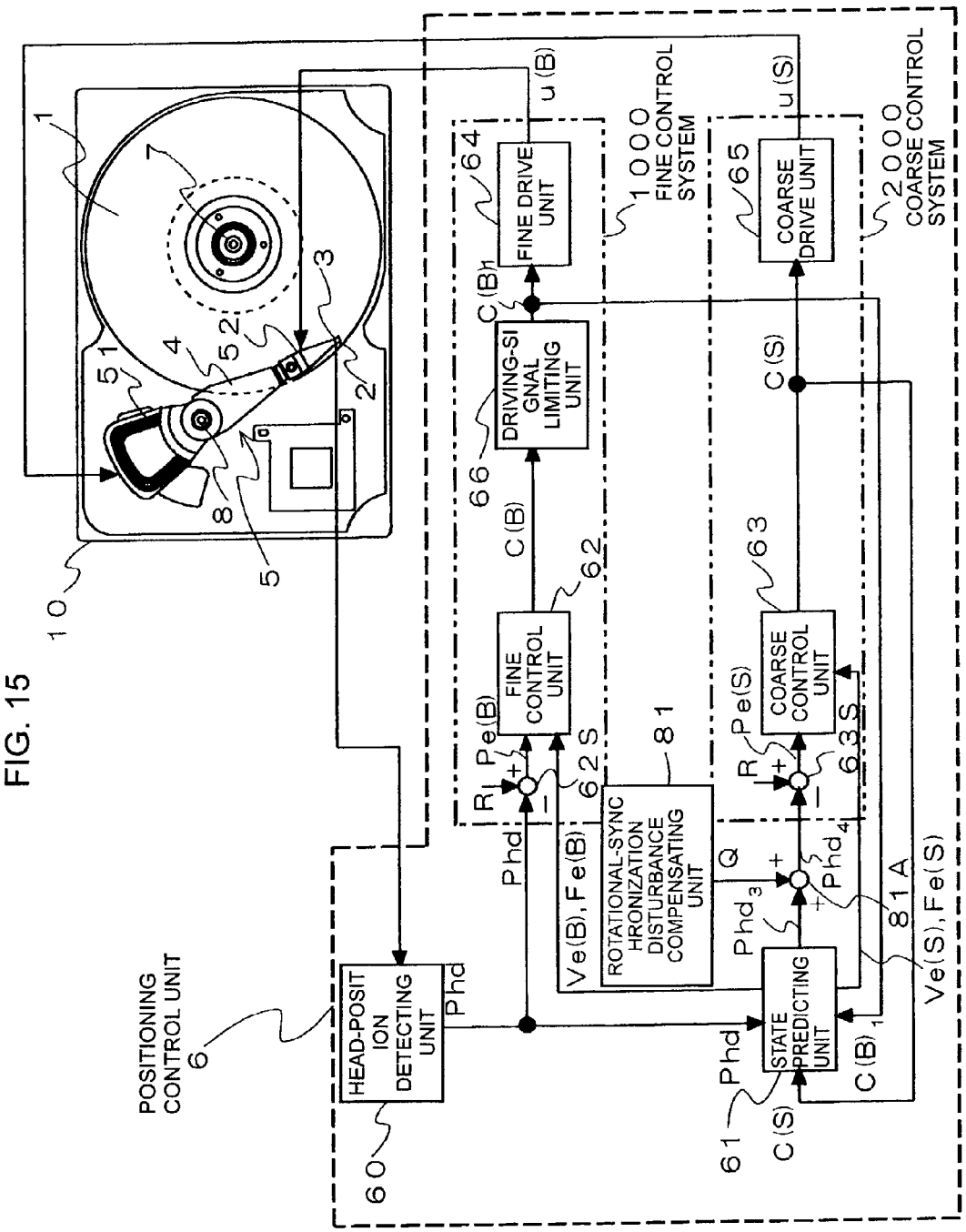
FIG. 15 is a schematic configuration view of a magnetic disk drive including a head positioner according to a fourth embodiment of the present invention.
Figure 16:
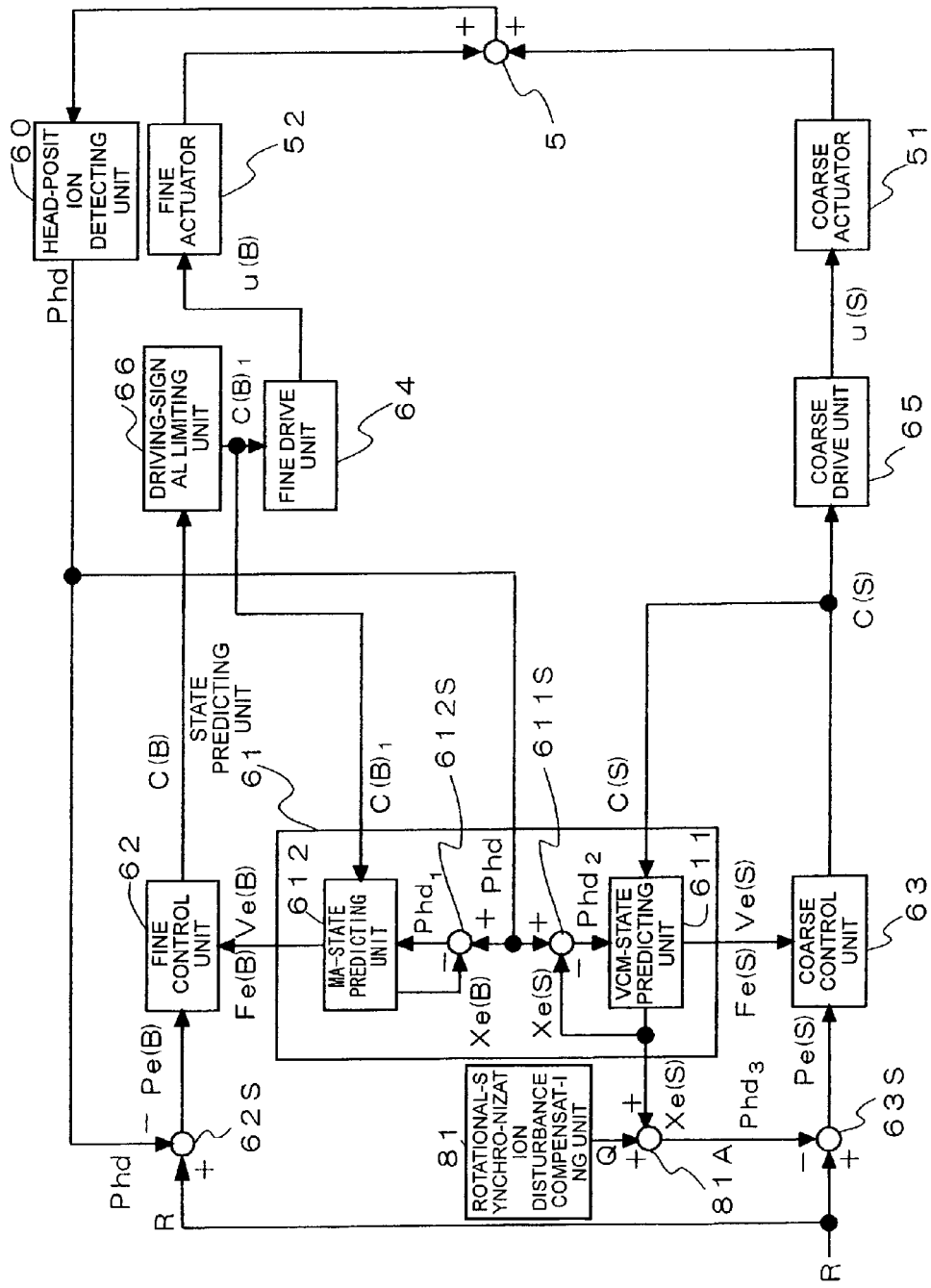
FIG. 16 is a block diagram showing a configuration of the head positioner according to the fourth embodiment.

Hereinbelow, a fourth embodiment of the invention will be described with reference to FIGS. 14 to 20. Referring to FIG. 15, the reference numerals/symbols denotes the portions as follows: 1 for a magnetic disk; 2 for a magnetic head, 3 for a head slider; 4 for a head supporting mechanism; 5 for a positioning mechanism; 51 for a coarse actuator; 52 for a fine actuator formed of a microactuator (MA) including a piezoelectric device (PZT device); 6 for a positioning control unit; 7 for a spindle motor; 8 for a rotational axis; 10 for a housing; 60 for a head-position detecting unit; 61 for a state predicting unit; 62 for a fine control unit; 63 for a coarse control unit; 64 for a fine drive unit; 65 for a coarse drive unit; 66 for a driving-signal limiting unit 66; 1000 for a fine control system configured inclusive of the fine control unit 62, the fine drive unit 64, and the driving-signal limiting unit 66; 2000 for a coarse control system configured to include the coarse control unit 63 and the coarse drive unit 65. These configuration members are the same as those of the first embodiment. Reference numeral 81 denotes a disturbance compensating unit for controlling the head 2 to follow a desired track in opposition to rotationally-synchronous disturbances.

Figure 17:
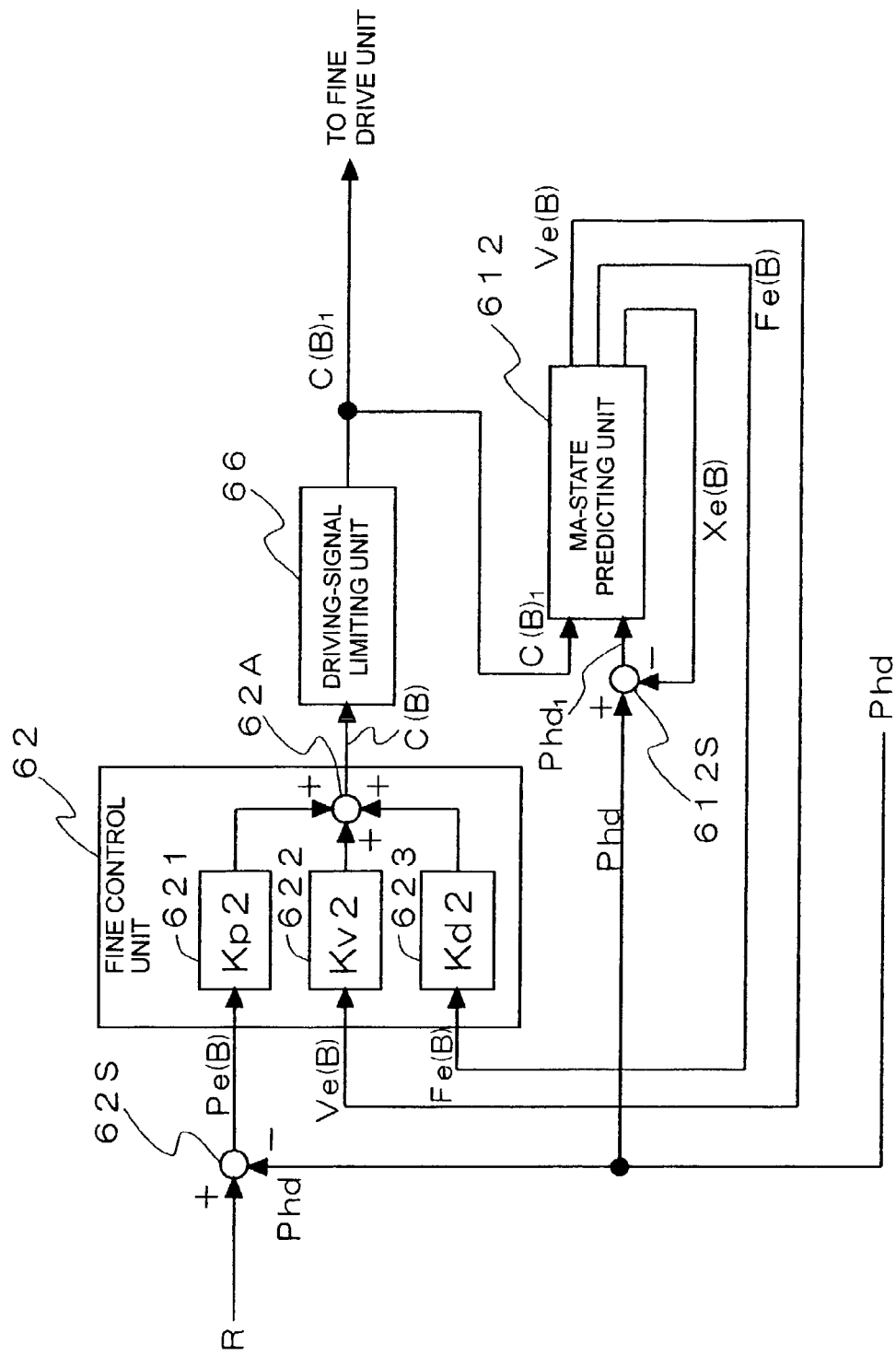
FIG. 17 is a block diagram showing a configuration of a fine control system according to the fourth embodiment.

In the first embodiment, the fine control signal C(B) is directly fed back from the fine control unit 62 to the MA-state predicting unit 612 of the state predicting unit 61. In the present embodiment, however, as shown in FIG. 17, a real fine control signal $C(B)_1$ is fed back to the MA-state predicting unit 612 from the fine control unit 62. The MA-state predicting unit 612 inputs a head position signal Phd from the head-position detecting unit 60 and the real fine control signal $C(B)_1$ from the fine control unit 62. According to the two signals, the MA-state predicting unit 612 predicts disturbances (such as force disturbances and positional disturbances) that will be imposed on the movement speed of the head 2 and on the head 2. Then, the MA-state predicting unit 612 calculates a prediction displacement signal Xe(B), a prediction speed signal Ve(B), and a prediction disturbance signal Fe(B) associated with the fine actuator 52. Thereafter, the MA-state predicting unit 612 outputs a prediction speed signal Ve(B) and the prediction disturbance signal Fe(B) to the fine control unit 62, and outputs a prediction displacement signal Xe(B) to a subtracter 612S. The subtracter 612S subtracts the prediction displacement signal Xe(B) from the head position signal Phd, thereby calculates a compensation position signal $Phd_1$, and feeds the compensation head position $Phd_1$ back to the MA-state predicting unit 612.

The fine control unit 62 multiplies a position-error feedback gain 621, a speed feedback gain 622, and a disturbance-amount feedforward gain 623 with the respective position error signal Pe(B), the individual prediction speed signal Ve(B), and prediction disturbance signal Fe(B). Then, these signals are added by the adder 62A, and a fine control signal C(B) for making the position error signal Pe(B) to be close to zero is calculated, and is output to the driving-signal limiting unit 66. In the above case, the fine control unit 62 may be configured such as to multiply individual coefficients of a proportional differentiator (phase lead compensator) and an integrator with the input position error signal Pe(B) and to thereby generate the fine control signal C(B).

The fine control signal C(B), which has been output from the fine control unit 62, is not directly fed into the fine drive unit 64, but is beforehand fed into the driving-signal limiting unit 66. The driving-signal limiting unit 66 limits the level of the fine control signal C(B) and generates a real fine control signal $C(B)_1$. This is done so as to drive the fine actuator 52 at a voltage that is equal to or lower than a threshold at which the properties of the piezoelectric device (PZT device), which constitutes the fine actuator 52, begins to deteriorate because of erosion caused by electrochemical reaction. Having been input with the real fine control signal $C(B)_1$, the fine drive unit 64 generates a fine drive signal u(B), outputs the signal to the fine actuator 52, and thereby controls and drives the fine actuator 52. The real fine control signal $C(B)_1$, which has been output to the driving-signal limiting unit 66, is fed back to the MA-state predicting unit 612.

Next, the coarse control system 2000 will be described hereinbelow. The VCM-state predicting unit 611 in the state predicting unit 61 predicts the current position of the head 2 according to the head position signal Phd received from the head-position detecting unit 60, and outputs a prediction displacement signal Xe(S).

Figure 18:
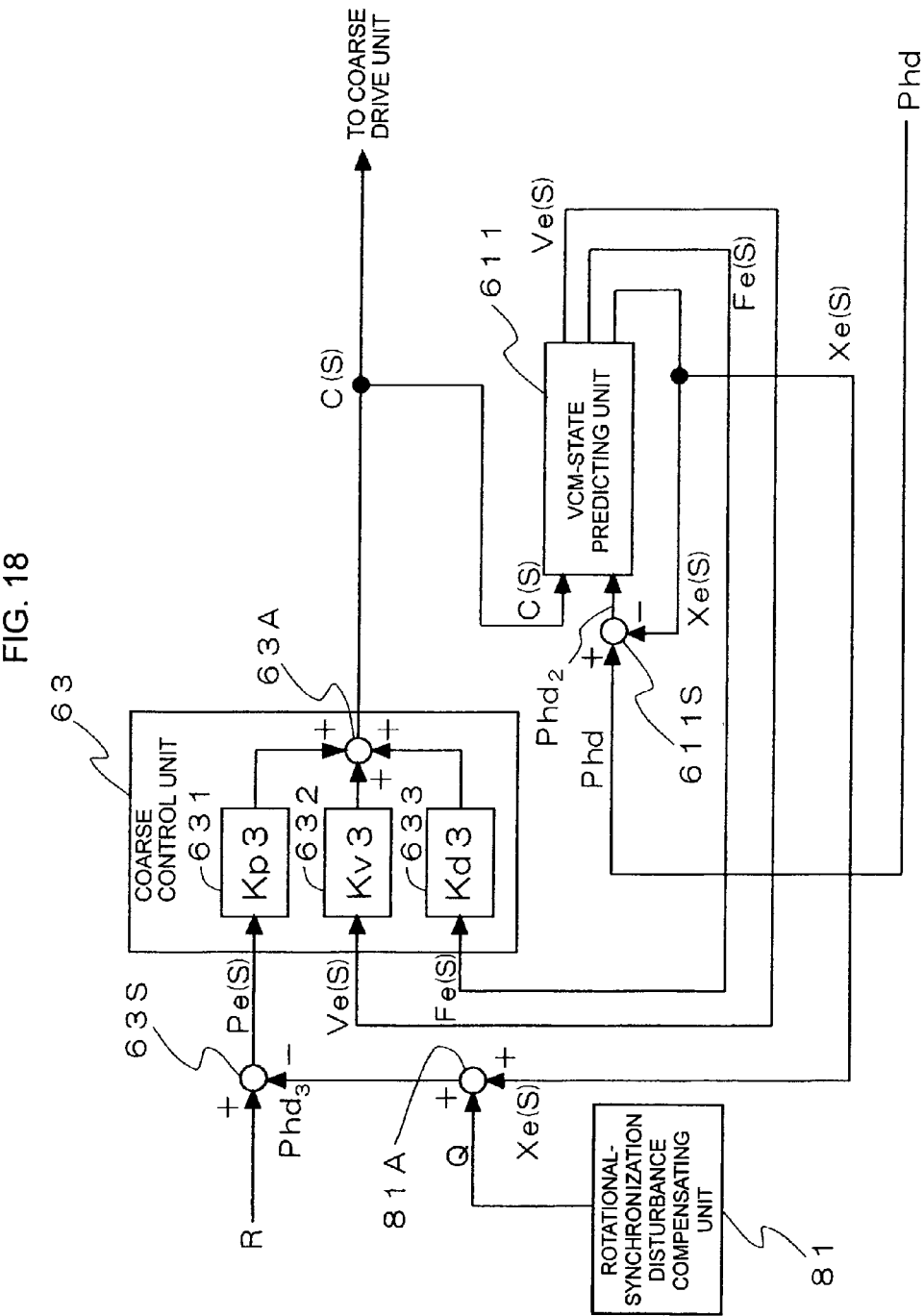
FIG. 18 is a block diagram showing a configuration of a coarse control system according to the fourth embodiment.

As shown in FIG. 18, the VCM-state predicting unit 611 predicts disturbances (such as force disturbances and positional disturbances) that will be imposed on the movement speed of the head 2 and on the head 2 according to a fed-back compensation head position $Phd_2$ and the coarse control signal C(S) received from the coarse control unit 63. Then, the VCM-state predicting unit 611 calculates a prediction displacement signal Xe(S), a prediction speed signal Ve(S), and a prediction disturbance signal Fe(S) that are associated with the fine actuator 51. Thereafter, the VCM-state predicting unit 611 outputs the prediction displacement signal Xe(S) and the prediction disturbance signal Fe(S) to the coarse control unit 63, and outputs the prediction displacement signal Xe(S) to the subtracter 611S. The subtracter 611S subtracts the prediction displacement signal Xe(S) from the head position signal Phd, calculates the compensation head position $Phd_2$, and feeds the compensation head position $Phd_2$ back to the VCM-state predicting unit 611.

The disturbance compensating unit 81 generates a disturbance error signal Q and outputs the signal. The disturbance error signal Q corresponds to a positional deviation occurring because of a rotationally-synchronous disturbance attributable to, for example, the eccentricity of the disk 1. An adder 81A performs the addition of the disturbance error signal Q, which has been received from the disturbance compensating unit 81, to the prediction displacement signal Xe(S), which has been received from the VCM-state predicting unit 611. The result is output as a compensation relative displacement signal $Phd_3$. In the subtracter 63S, a differential between the desired position signal R and the compensation relative displacement signal $Phd_3$ is taken out, and is fed as a compensation relative displacement signal Pe(S) into the coarse control unit 63.

In the coarse control unit 63, a position-error feedback gain 631, a speed feedback gain 632, and a disturbance-amount feedforward gain 633 are multiplied with the compensation relative displacement signal Pe(S), the prediction speed signal Ve(S), the prediction disturbance signal Fe(S), respectively. Thereafter, these individual signals are added in an adder 63A; and as a result, a coarse control signal C(S) for controlling the compensation relative displacement signal Pe(S) to be close to zero is calculated. The coarse control signal C(S) is then output to the coarse drive unit 65, and is fed back to the VCM-state predicting unit 611. In the above, the arrangement may be made such that the coarse control signal C(S) is provided to the VCM-state predicting unit 611 so as to be feed forwarded thereto. The coarse control unit 63 may be configured so as to multiply individual coefficients of a proportional differentiator (phase lead compensator) and an integrator with the compensation relative displacement signal Pe(S) to thereby generate the coarse control signal C(S).

Having been input with the coarse control signal C(S), the coarse drive unit 65 generates a coarse drive signal u(S), outputs the signal to the coarse actuator 51, and thereby controls and drives the coarse actuator 51.

The coarse control unit 63 performs a calculation of a coarse control amount from the position error, which is a difference between a prediction amount of the amount of a head movement amount associated with the coarse actuator 51 and a desired position, and a prediction amount received from the VCM-state predicting unit 611 in the state predicting unit 61. This calculation is the same as a calculation of a position error between a desired position and a head movement amount of the fine actuator 52. To the aforementioned position error, there is added an amount of displacement, namely, the disturbance error signal Q that has been output from the disturbance compensating unit 81, for offsetting the position error caused by rotationally-synchronous disturbances. The addition result is used as a compensated relative displacement signal, namely, the compensation relative displacement signal Pe(S), for the coarse control unit 63. The output of the disturbance compensating unit 81 may be used as an eccentricity amount learned in the step of manufacture or initial activation, that is, as a value representing the amount of a position error caused by rotationally-synchronous disturbances.

Thus, each of the actuator control systems carries out the operation sequence described above. In summary, the positioning control is performed such that the fine actuator 52 functions to converge the error between the current position and the desired position of the head 2 to zero, the coarse actuator 51 functions to converge the head movement amount of the fine actuator 52 to zero, and consequently, the position error between the desired position and the head movement amount associated with the fine actuator 52 is converged to zero. According to the control method, the fine actuator 52 is driven and controlled at a low driving voltage in the vicinity of the center of the operation range, thereby improving the positioning performance.

A position error due to disturbances synchronous with the disk rotation is large. As such, when compensating all the error amount by using the fine actuator 52, the driving voltage exceeds the threshold voltage. For this reason, the position error due to the disturbances synchronous with the disk rotation is compensated for by using the coarse control unit 63 and the coarse actuator 51 according to the disturbance compensating unit 81. Thereby, the positioning accuracy is improved while the fine actuator 52 is driven and controlled in a fine range. In this case, in the driving signal control unit 66, the output to the fine actuator 52 is set below the threshold voltage at which electrochemical reaction of the piezoelectric device is accelerated.

In the present embodiment, the coarse actuator 51 is used to compensate for low-frequency rotationally-synchronous disturbances causing a large position error. Concurrently, the driving-signal limiting unit 66 is used to rotate and control the fine actuator 52, which is constituted of the PZT device, at a voltage that is below the threshold voltage.

Figure 19:
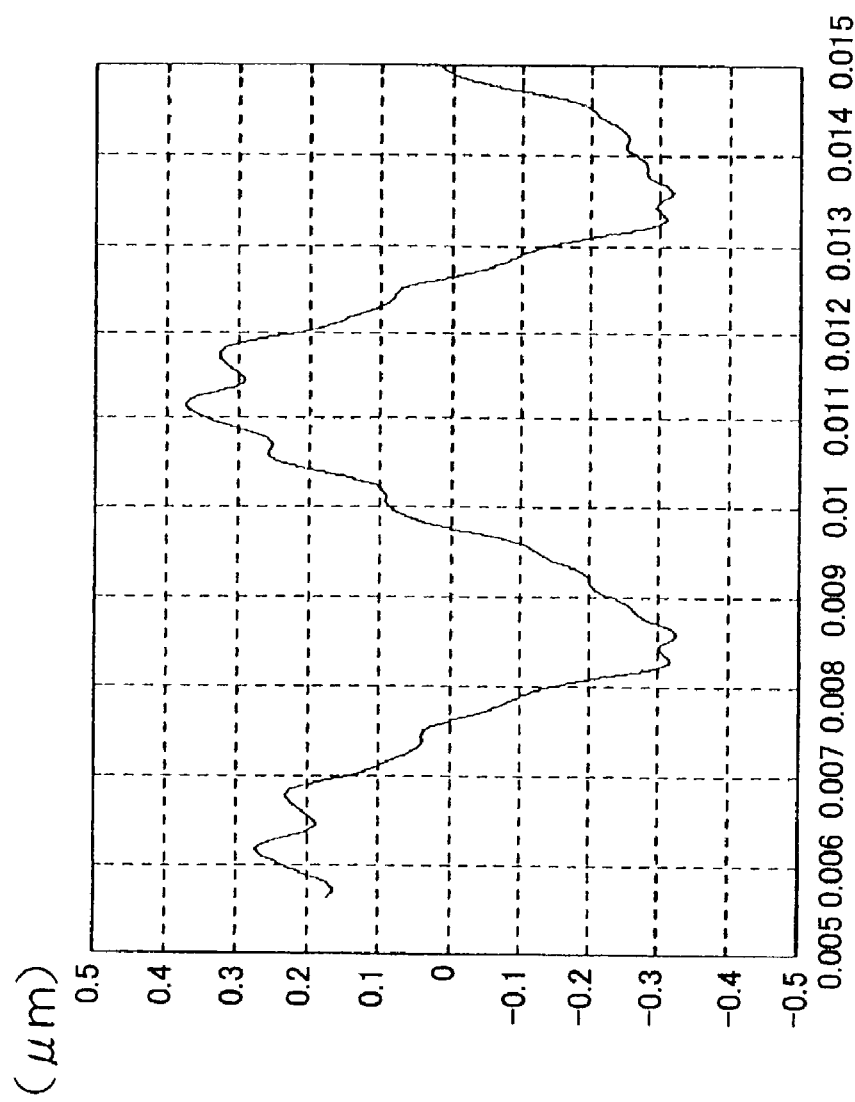
FIG. 19 is an explanatory view of properties of a rotational synchronization disturbance according to the fourth embodiment.

FIGS. 19 to 21 individually show simulation results of an embodied example according to the present embodiment. Conditions of the simulation are as follows:

| | |
|---|---|
| Rotational speed: | 12,000 r/min |
| Track density: | 45,000 track/inch |
| Track pitch: | 0.56 μm |
| Sampling frequency: | 20 kHz |
| Servo band: | 1.5 kHz |

Threshold for the driving-signal limiting unit: 1.2 V

FIG. 19 shows a time response of a rotationally-synchronous disturbance. The warpage width is shown as 0.7 μm.

Figure 20A:
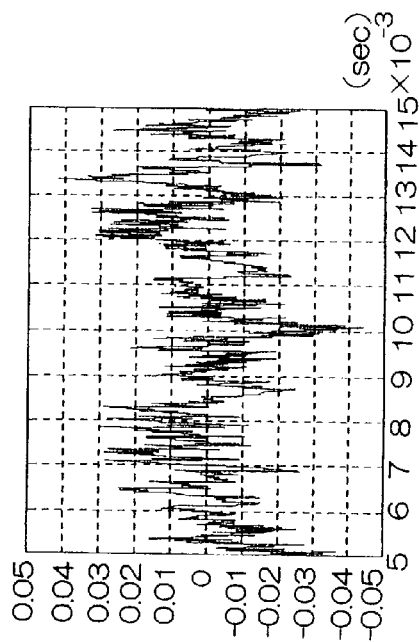
FIG. 20A is a waveform diagram of a head-position error signal at a track-following event plan view according to the fourth embodiment.
Figure 20C:
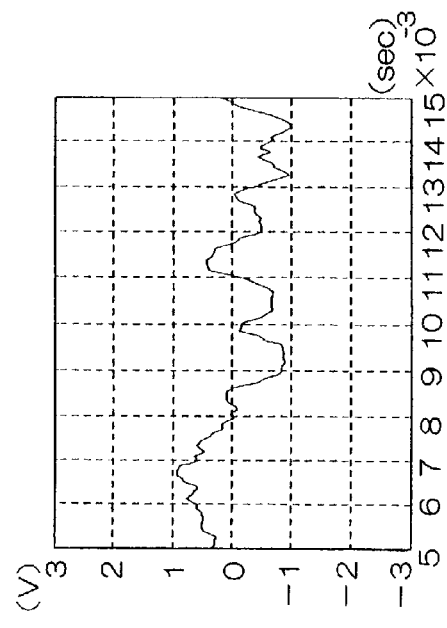
FIG. 20C is a waveform diagram of a driving voltage for a fine actuator according to the fourth embodiment.
Figure 20B:
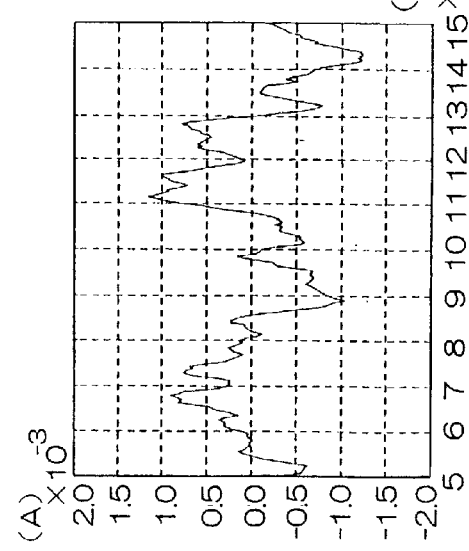
FIG. 20B is a waveform diagram of a driving current for a coarse actuator according to the fourth embodiment.

FIGS. 20A to 20C each show a case where, under the conditions of the present embodiment, the servo loop of the fine actuator 52 includes the driving-signal limiting unit 66, and the servo loop of the coarse actuator 51 includes the disturbance compensating unit 81. FIGS. 21A to 21C each show the case of a controlling-and-driving method for a comparison example including neither the driving-signal (voltage) limiting unit nor the disturbance compensating unit. FIGS. 20A and 21A each show a head-position error signal at a track-following event; FIGS. 20B and 21B each show a driving current for the coarse actuator 51 at the aforementioned event; and FIGS. 20C and 21C each show a driving for the fine actuator 52 at the aforementioned event.

The simulation results will be described. In comparison between the cases shown in FIG. 20A and 21A, as a position error in each of the cases, a 10% track pitch is on-tracked in the track-following event. The driving voltage is equal to or lower than 1 V in the present embodiment shown in FIG. 20C. The driving voltage is 2.5 V at maximum in the comparison example shown in FIG. 21C. In comparison between FIGS. 20B and 21B, while the driving currents of the coarse actuator 51 are substantially the same, phases with respect to the driving voltages of the fine actuator 52 are different from each other. In each of these cases, a positioning accuracy of within a 10% track pitch is achieved; however, in the comparison example, the driving voltage for the fine actuator 52 is high. As such, performance deterioration occurs in the displacement property, thereby reducing the reliability. In addition, in the comparison example, the phase of the driving current is negative with respect to the driving voltage. In this case, control bands of the fine actuator and the coarse actuator are different from each other; that is, the phase of the fine actuator driven in a high band is different from the phase of the coarse actuator driven in a low band. In this case, the relative operations for compensating for rotationally-synchronous disturbances result in force disturbances. In comparison, however, the present embodiment additionally including the disturbance compensating unit 81 enables the fine actuator 52 and the coarse actuator 51 to operate in the same phase. As such, the fine actuator 52 and the coarse actuator 51 operates harmonic, thereby compensating for the rotationally-synchronous disturbances as unidirectional position errors. Consequently, even when the fine actuator 52 is driven in a low voltage, high-accuracy head positioning can be implemented.

In summary, when compensating rotationally-synchronous disturbances occurring because of disk eccentricity and the like to thereby controlling the head to follow a desired track, the coarse control system 2000 compensates for the rotationally-synchronous disturbances. Thereby, the load of the piezoelectric device in the fine actuator 52 is reduced. Furthermore, in this state, the level of the drive signal for the piezoelectric device is limited equal to or lower than the threshold at which property deterioration occurs in the piezoelectric device because of erosion caused by the electrochemical reaction. As a result, the properties are not deteriorated. According to synergetic effects thereof, high-speed and high-accuracy head poisoning on a desired track can be maintained for a long time. Consequently, the embodiment effectively operates for the implementation of a high-record-density disk drive unit.

The present embodiment developed to carry out by software makes the positioning control method including the following steps:

(1) Step 1—Generates position-error data from position error data and desired position data used for positioning. The position error data represents an error occurred between an error in head position data received from servo information on a disk which is to be read by a head, and desired position data is used for positioning.

(2) Step 2—Generates fine control data used for control the amount of displacement of the fine actuator of the head, according to the position error data.

(3) Step 3—Generates real fine control data obtained by limiting the fine control data according to the threshold at which property deterioration occurs because of the electrochemical reaction of the piezoelectric device constituting the fine actuator. Then, the step replaces the real fine control data with the fine control data, and outputs the fine control data to the fine actuator.

(4) Step 4—Inputs relative displacement data corresponding to the amount of displacement of one of the coarse actuator and the fine actuator.

(5) Step 5—Generates compensation relative displacement data representing the result of addition of disturbance error data based on a position error caused by disk-rotation synchronization disturbances to the relative displacement data. Concurrently, according to the compensation relative displacement data, the step generates coarse control data for controlling the amount of displacement of the coarse actuator.

(6) Step 6—Outputs to the coarse actuator a signal based on the coarse control data to be used as a coarse drive signal.

A group of steps (1) to (3) and a group of steps (4) to (6) may be processed in the form of parallel processing to synchronously proceed. Alternatively, the two groups may be processed in the form of sequential processing to precede one of them.

The above-described head-positioning control method is thus capable of solving the problem of property deterioration of the piezoelectric device that can occur because of a high-level drive signal. In addition, the head-positioning control method is capable of maintaining the function of high-speed and high-accuracy positioning the head on a desired track for a long time. Consequently, the head-positioning control method effectively operates for the implementation of a high-record-density disk drive unit.

(Fifth Embodiment)

Figure 22:
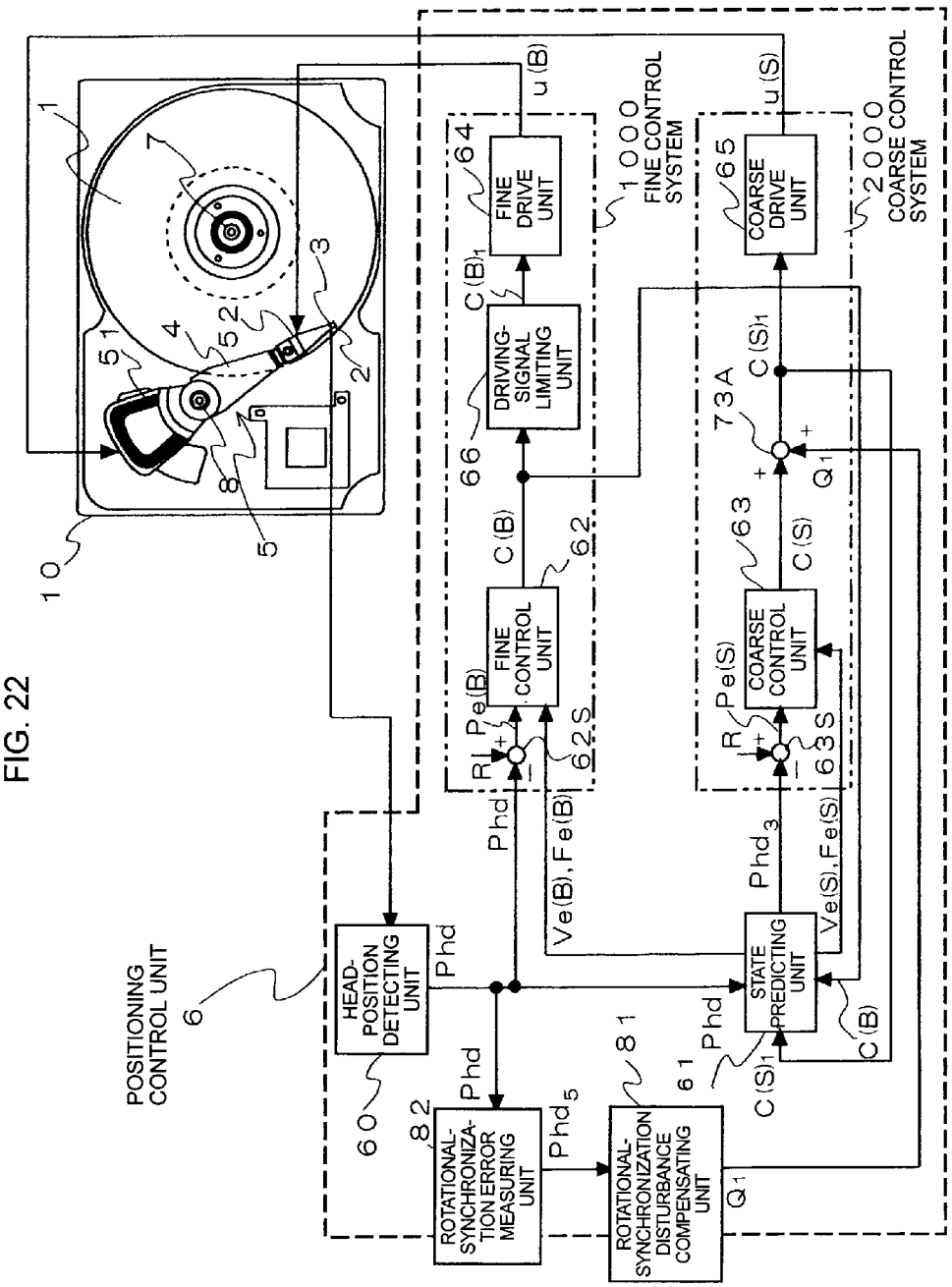
FIG. 22 is a schematic configuration view of a magnetic disk drive including a head positioner according to a fifth embodiment of the present invention.

Hereinbelow, a fifth embodiment of the invention will be described with reference to FIG. 22. In FIG. 22, the same reference numeral/symbols are used to refer to the same configuration members as those in the fourth embodiment shown in FIG. 15. In the fifth embodiment, an error measuring unit 82 is disposed in the stage subsequent to the head-position detecting unit 60, and a disturbance compensating unit 81 is disposed in the stage subsequent to the error measuring unit 82. The error measuring unit 82 calculates the amount of a position error attributed to disturbances that is synchronous with the disk rotation according to the head position signal Phd, thereby generates a compensation position error signal $Phd_5$, and feeds the signal to the disturbance compensating unit 81. According to the received compensation position error signal $Phd_5$, the disturbance compensating unit 81 generates a compensation-dedicated disturbance-controlling signal $Q_1$ and outputs it. Then, an adder 73A performs the addition of a coarse control signal C(S) received from the coarse control unit 63 to the disturbance-controlling signal $Q_1$ received from the disturbance compensating unit 81. A compensation coarse control signal $C(S)_1$ generated through the addition is fed to the coarse drive unit 65, and is also fed back to the VCM-state predicting unit 611 in the state predicting unit 61. Even with the above-described configuration, advantages similar to the fourth embodiment can be obtained. Other portions and operations of the configuration are similar to those in the fourth embodiment; hence, descriptions thereof are omitted herefrom.

(Sixth Embodiment)

Figure 23:
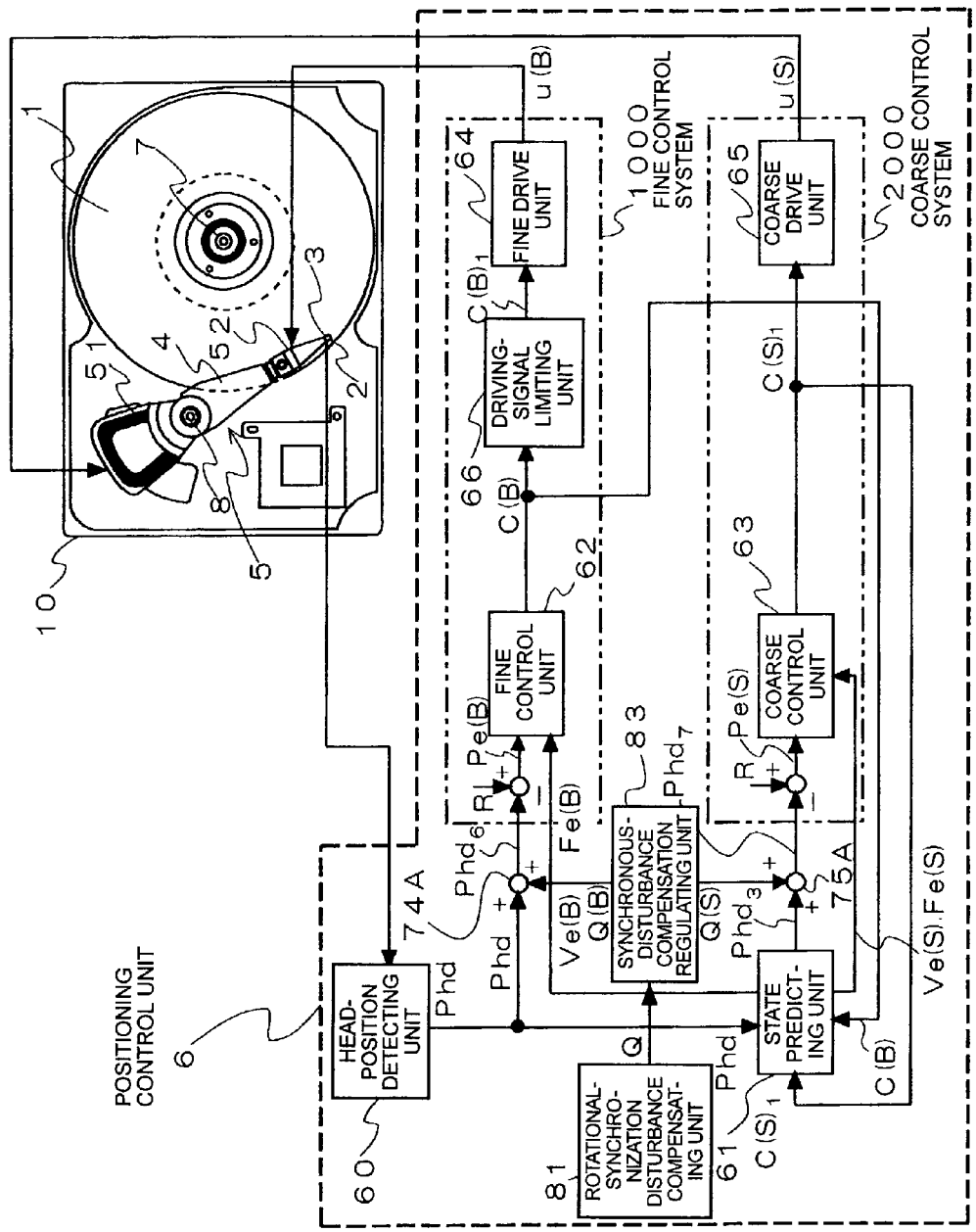
FIG. 23 is a schematic configuration view of a magnetic disk drive including a head positioner according to a sixth embodiment of the present invention.

Hereinbelow, a sixth embodiment of the invention will be described with reference to FIG. 23. In FIG. 23, the same reference numeral/symbols are used to refer to the same configuration members as those in the fourth embodiment shown in FIG. 15. In the sixth embodiment, a compensation regulating unit 83 is additionally provided. The compensation regulating unit 83 weights an input disturbance error signal Q for the fine control unit 62 and the coarse control unit 63. As a result, a fine position error signal Q(B) and a coarse position error signal Q(S) are distributed to the control units 62 and 63, respectively. The signals are output to an adder 74A on the side of the fine control unit 62 and to an adder 75A on the side of the coarse control unit 63.

In the fine control system 1000, the fine position error signal Q(B) is added to the head position signal Phd, and a compensation position error signal $Phd_6$ is thereby generated. In the coarse control system 2000, the coarse position error signal Q(S) is added to the compensation relative displacement signal $Phd_3$, and a compensation position error signal $Phd_7$ is thereby generated. Other portions and operations of the configuration are similar to those in the fourth embodiment; hence, descriptions thereof are omitted herefrom.

According to the present embodiment, even under the condition in which the amount of control according to the operation of the fine control system 1000 and the amount of control according to the operation of the coarse control system 2000 influence each other, rotationally-synchronous disturbances are compensated for through the signal-weighting distribution to the two systems. Thereby, the piezoelectric device can be protected from property deterioration attributable to an excessively high drive signal level. These functions are suitably secured with the present embodiment.

(Seventh Embodiment)

Figure 24:
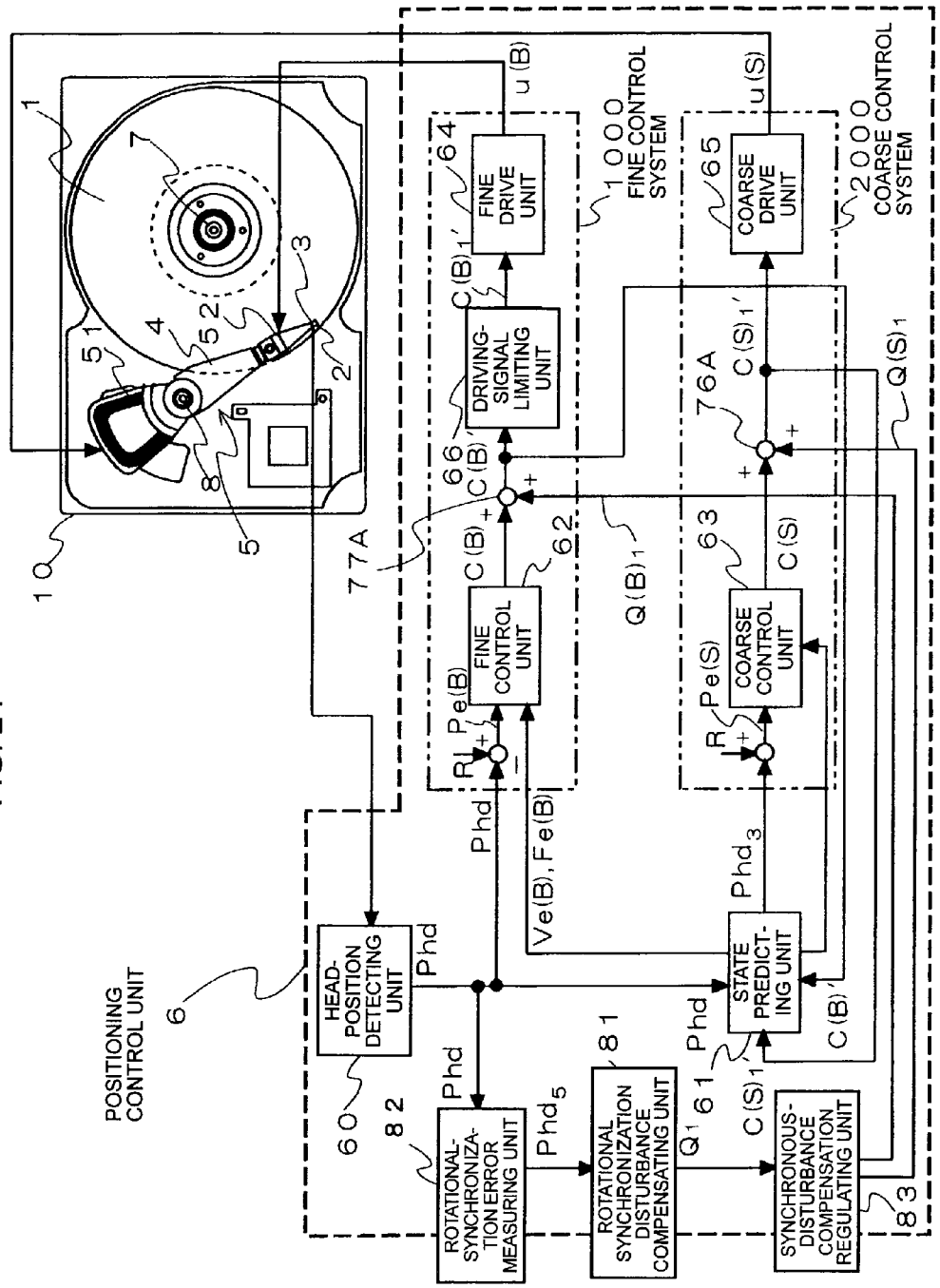
FIG. 24 is a schematic configuration view of a magnetic disk drive including a head positioner according to a seventh embodiment of the present invention.

Hereinbelow, a seventh embodiment of the invention will be described with reference to FIG. 24. In FIG. 24, the same reference numeral/symbols are used to refer to the same configuration members as those in the fourth embodiment shown in FIG. 15. In the seventh embodiment, a rotational-synchronization error measuring unit 82 is disposed in the stage subsequent to the head-position detecting unit 60, a rotational-synchronization disturbance compensating unit 81 is disposed in the stage subsequent to the error measuring unit 82, and a synchronous-disturbance compensation regulating unit 83 is disposed in the stage subsequent to the rotational-synchronization disturbance compensating unit 81. The error measuring unit 82 calculates the amount of a position error attributed to disturbances synchronous with the disk rotation according to the head position signal Phd, thereby generates a compensation position error signal $Phd_5$, and feeds the signal to the disturbance compensating unit 81. According to the received compensation position error signal $Phd_5$, the disturbance compensating unit 81 generates a compensation-dedicated disturbance-controlling signal $Q_1$ and outputs it. According to the received disturbance-controlling signal $Q_1$, the compensation regulating unit 83 generates a synchronous-disturbance coarse control signal $Q(S)_1$ and coarse control signal $Q(B)_1$.

Subsequently, an adder 76A performs the addition of a coarse control signal C(S) received from the coarse control unit 63 to the synchronous-disturbance coarse control signal $Q(S)_1$ received from the disturbance compensating unit 83.

A compensation coarse control signal $C(S)_1'$ generated through the addition is fed to the coarse drive unit 65, and also fed back to the VCM-state predicting unit 611 in the state predicting unit 61.

Concurrently, an adder 77A performs the addition of a fine control signal C(B) received from the fine control unit 62 to the synchronous-disturbance coarse control signal $Q(B)_1$ received from the disturbance compensating unit 83. A compensation fine control signal C(B)' generated through the addition is fed to the fine drive unit 64 via the driving-signal limiting unit 66, and is also fed back to the MA-state predicting unit 612 in the state predicting unit 61.

Even with the above-described configuration, advantages similar to the fifth embodiment can be obtained. Other portions and operations of the configuration are similar to those in the fourth embodiment; hence, descriptions thereof are omitted herefrom.

(Eighth Embodiment)

Figure 25:
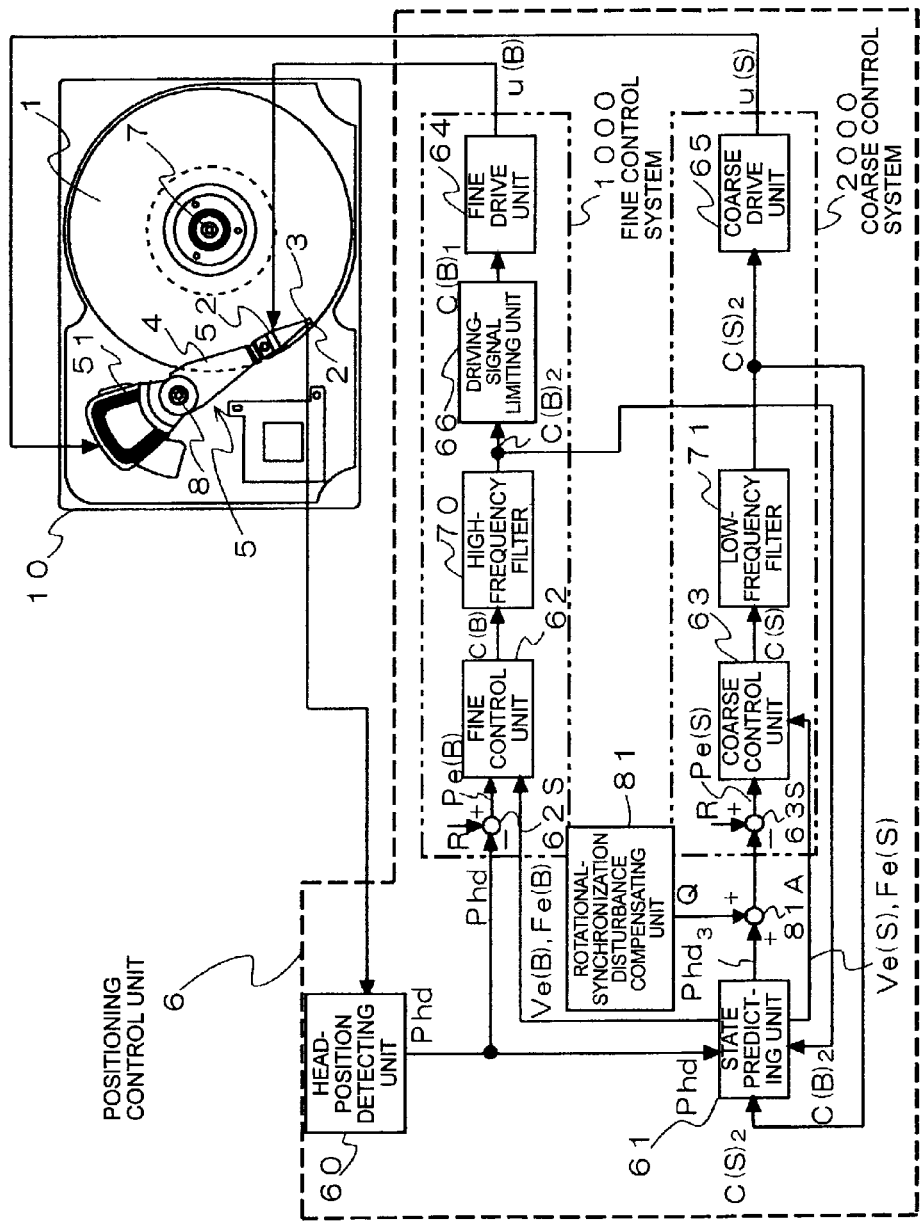
FIG. 25 is a schematic configuration view of a magnetic disk drive including a head positioner according to an eighth embodiment of the present invention.

Hereinbelow, an eighth embodiment of the invention will be described with reference to FIG. 25. In FIG. 25, the same reference numeral/symbols are used to refer to the same configuration members as those in the fourth embodiment shown in FIG. 15. In the eighth embodiment, a high-frequency filter 70 is inserted between the fine control unit 62 and the fine drive unit 64, and a low-frequency filter 71 is inserted between the coarse control unit 63 and the coarse drive unit 65.

The drawing shows a state where a coarse control signal C(S), which has been output from the coarse control unit 63, is input to the coarse drive unit 65 through the low-frequency filter 71 that passes only low-frequency bands.

In the fine control system 1000, the fine control signal C(B) fed from the fine control unit 62 is input to the high-frequency filter 70, and low-band components thereof are cut off. As a result, the fine control signal C(B) is converted into a fine control signal $C(B)_2$ condensed into a state corresponding to a disturbance such as mechanical resonance having a relatively small amplitude and a relatively large number of high frequency components, and the fine control signal $C(B)_2$ is fed into the driving-signal limiting unit 66. For example, when a cut-off frequency is 600 Hz, a rotational-synchronization disturbance component of 120 Hz is compressed to ⅕ thereof. Furthermore, the amount of compensation for the disturbance of a rotational synchronous primary component or a steady-deviation is made small, and the command voltage to a fine actuator is made small.

In the coarse control system 2000, the fine control signal C(B) fed from the fine control unit 62 is input to the low-frequency filter 71, and high frequency components thereof are cut off. As a result, the fine control signal C(B) is converted into a coarse control signal $C(S)_2$ condensed into a state corresponding to a disturbance having a relatively large amplitude and a relatively large number of low frequency components, and the coarse control signal $C(S)_2$ is fed into the coarse drive unit 65. For example, a cut-off frequency is 6,000 Hz, a high-band disturbance component of, for example, a mechanical resonance, is significantly reduced.

The bands to be compensated for are thus separately processed. Thereby, the amount of displacement can be reduced using the fine actuator, and the driving voltage can be reduced equal to or lower than the decomposition voltage. Other portions and operations of the configuration are similar to those in the fourth embodiment; hence, descriptions thereof are omitted herefrom.

(Ninth Embodiment)

Figure 26:
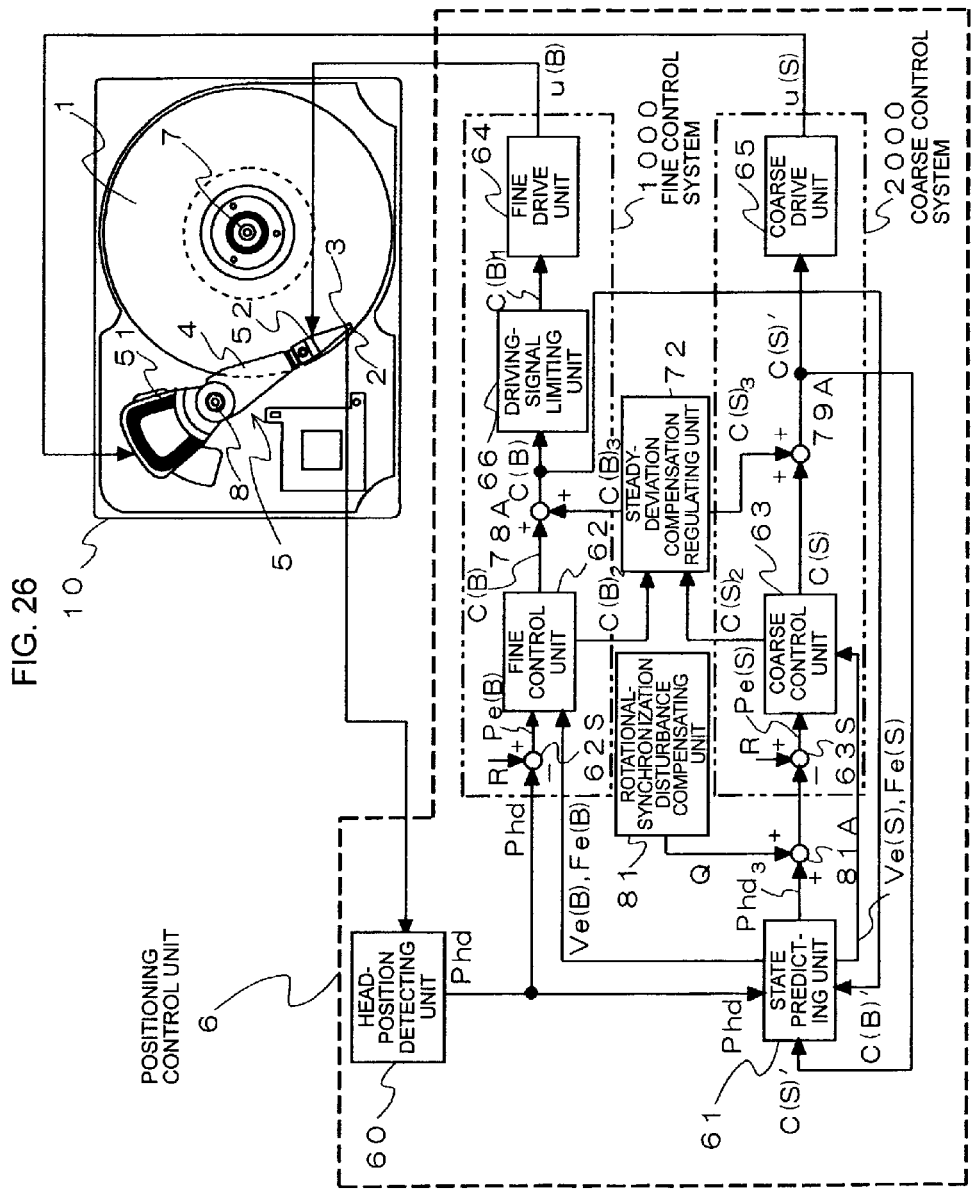
FIG. 26 is a schematic configuration view of a magnetic disk drive including a head positioner according to a ninth embodiment of the present invention.

Hereinbelow, a ninth embodiment of the invention will be described with reference to FIG. 26. In FIG. 26, the same reference numeral/symbols are used to refer to the same configuration members as those in the fourth embodiment shown in FIG. 15. In the ninth embodiment, a steady-deviation compensation regulating unit 72 is additionally provided. The steady-deviation compensation regulating unit 72 inputs a steady-deviation fine compensation signal $C(B)_2$, which is fed from the fine control unit 62 and which is associated with the fine control signal. Also, the compensation regulating unit 72 inputs a steady-deviation coarse compensation signal $C(S)_2$, which is fed from the fine control unit 63 and which is associated with the coarse control signal C(S). The compensation regulating unit 72 weights the signals for distribution to the fine control system 1000 and the coarse control system 2000. Thereby, the compensation regulating unit 72 generates a steady-deviation fine compensation signal $C(B)_3$ and a steady-deviation coarse compensation signal $C(S)_3$, and outputs the signals. Subsequently, an adder 78A performs the addition of the fine control signal C(B) to the steady-deviation fine compensation signal $C(B)_3$. A compensation fine control signal C(B)' generated through the addition is output to the driving-signal limiting unit 66, and is also fed back to the MA-state predicting unit 612 in the state predicting unit 61. Concurrently, an adder 79A performs the addition of the coarse control signal C(S) to the steady-deviation coarse compensation signal $C(S)_3$. A compensation coarse control signal C(S)' generated through the addition is fed to the coarse drive unit 65, and is also fed back to the VCM-state predicting unit 611 in the state predicting unit 61.

The rotational-synchronization disturbance compensating unit 81 may be configured as that shown in FIG. 22 (fifth embodiment). Also with this configuration, similar advantages can be obtained. Other portions and operations of the configuration are similar to those in the fourth embodiment; hence, descriptions thereof are omitted herefrom.

In each of the above-described embodiments, the actuator is disposed on a suspension. However, similar advantages can be obtained when the fine actuator is alternatively disposed on a slider. In addition, the fine actuator and the coarse actuator independently include the state predicting units. However, also with a multi-input multi-output system modeled by combining the individual state predicting units, similar advantages can be obtained. Moreover, the threshold of the driving-signal limiting unit 66 may be set variable depending on the time of operation for which the performance deterioration speed and reliability are required. Alternatively, the threshold may be set variable depending on the mode of an operation, such as a seeking operation or a track following operation.

(Tenth Embodiment)

Hereinbelow, a tenth embodiment of the invention will be described with reference to FIGS. 27 to 30. The same reference numerals/symbols are used to refer to the same configuration members of embodiments already described above. As shown in FIG. 28, in the present embodiment, the MA-state predicting unit 612 outputs the prediction displacement signal Xe(B), generated through calculations, to the 61A. Also, the VCM-state predicting unit 611 outputs the prediction displacement signal Xe(S), generated through calculations, to the adder 61A. The adder 61A performs the addition of the prediction displacement signal Xe(B) to the prediction displacement signal Xe(S), thereby generates a prediction head position signal Phde (corresponding to Xe in FIG. 3), and outputs it to the subtracter 611S and the subtracter 612S. The subtracter 612S performs the subtraction of the prediction head position signal Phde from the head position signal Phd, thereby calculates a compensation head position $Phd_1$, and feeds it back to the MA-state predicting unit 612. The subtracter 611S performs the subtraction of the prediction head position signal Phde from the head position signal Phd, thereby calculates a compensation head position signal $Phd_2$, and feeds it back to the VCM-state predicting unit 611. In this embodiment, the threshold is set to ±5 V, and performed the controlling and driving operation therewith. Also, when C(B)=0, the bias voltage to be applied to the fine actuator 52 is set to 0 V.

Figure 27:
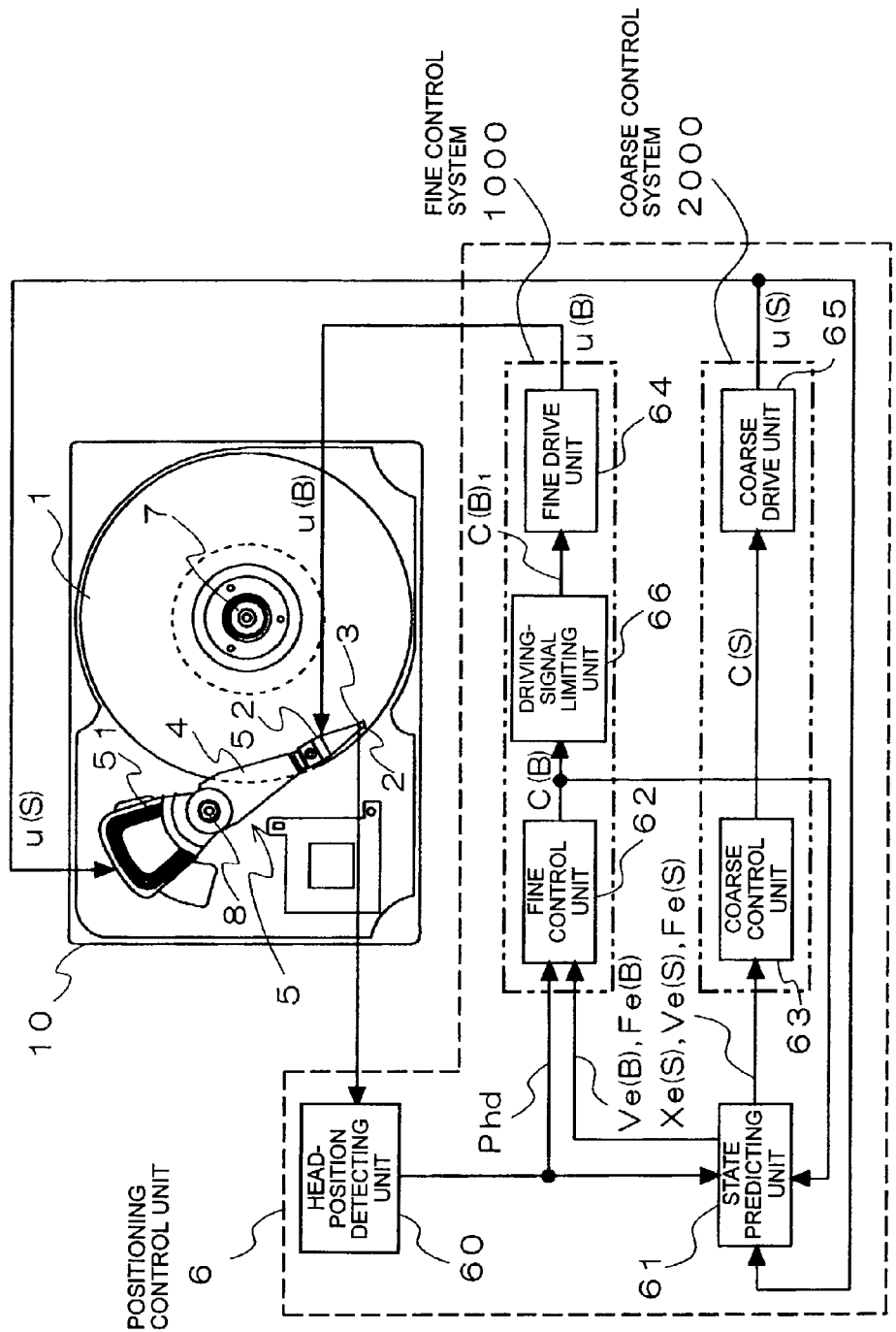
FIG. 27 is a schematic configuration view of a magnetic disk drive including a head positioner according to a tenth embodiment of the present invention.
Figure 28:
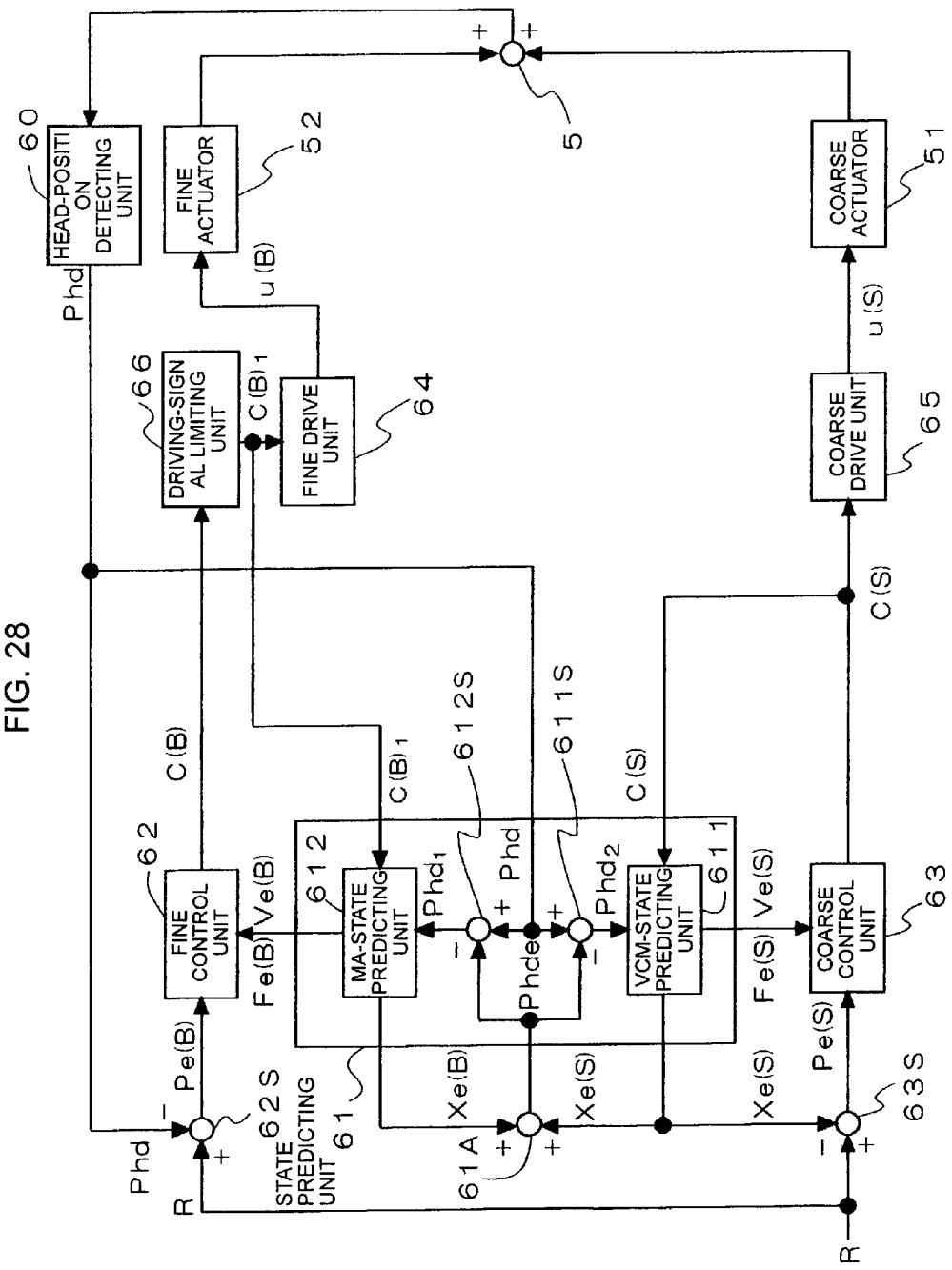
FIG. 28 is a block diagram showing a configuration of the head positioner according to the tenth embodiment.
Figure 29:
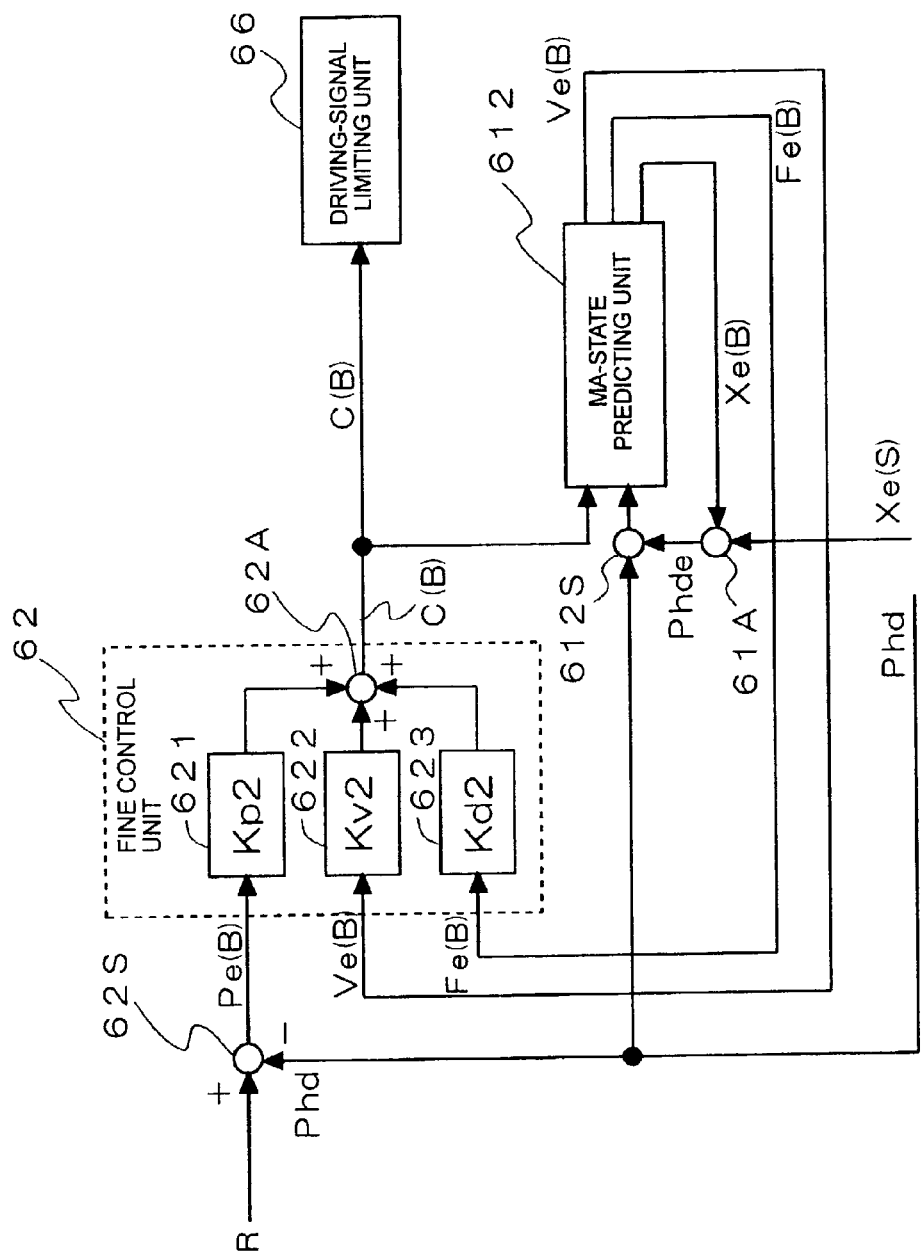
FIG. 29 is a block diagram showing a configuration of a fine control system according to the tenth embodiment.
Figure 30:
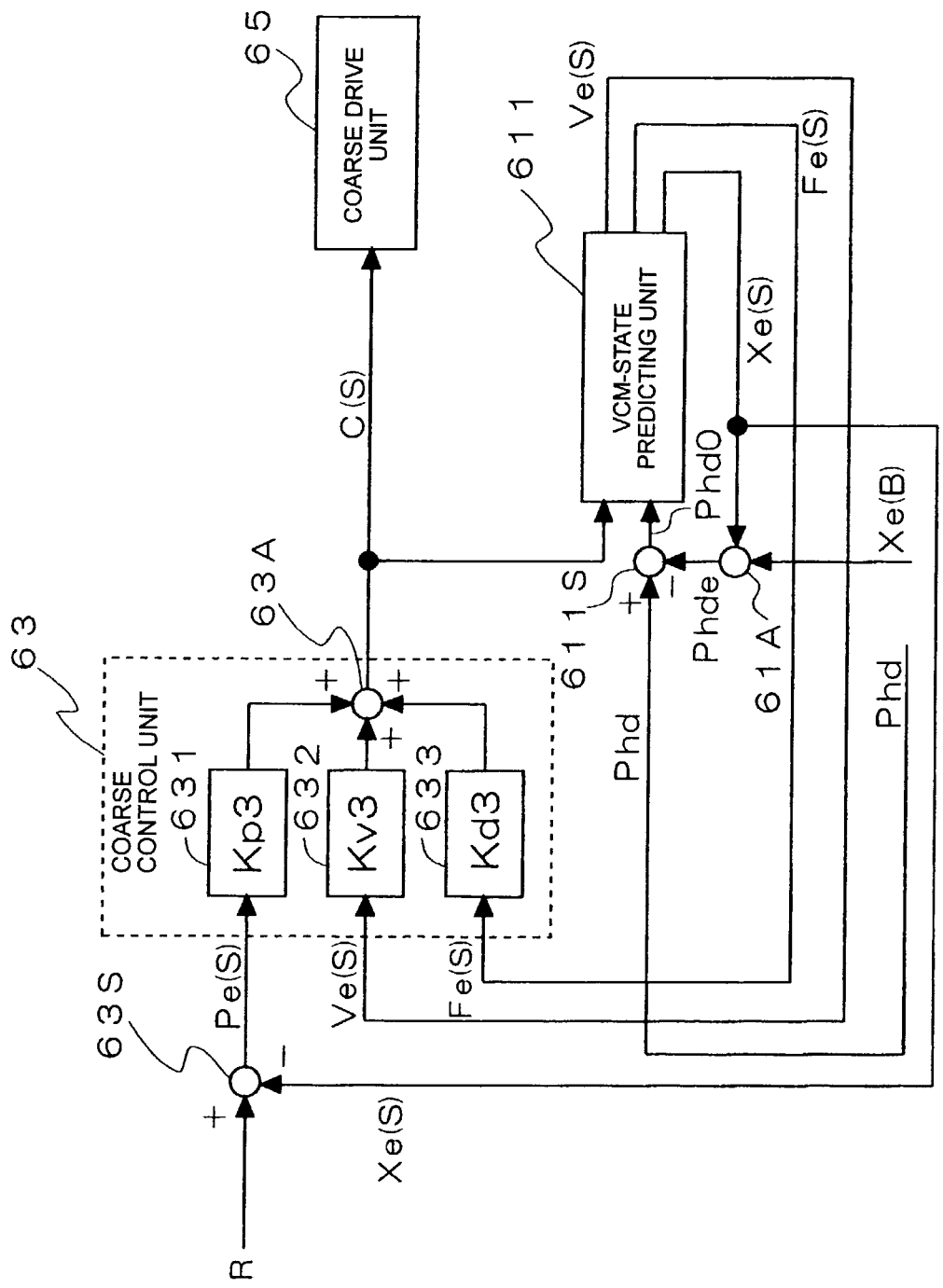
FIG. 30 is a block diagram showing a configuration of a coarse control system according to the tenth embodiment.
Figure 31:
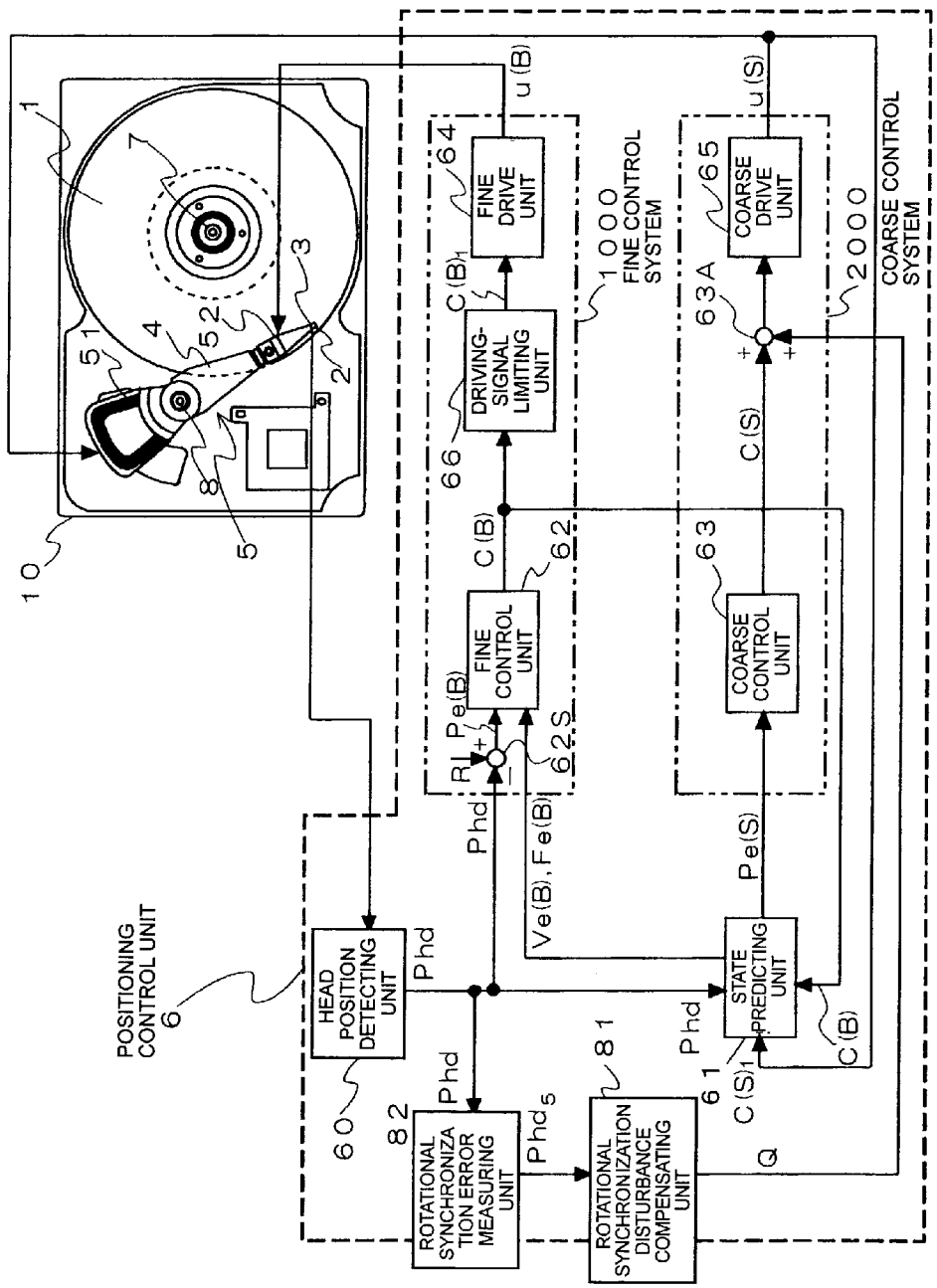
FIG. 31 is a schematic configuration view showing a configuration of a magnetic disk drive including a head positioner according to a modified example of the tenth embodiment.
Figure 32:
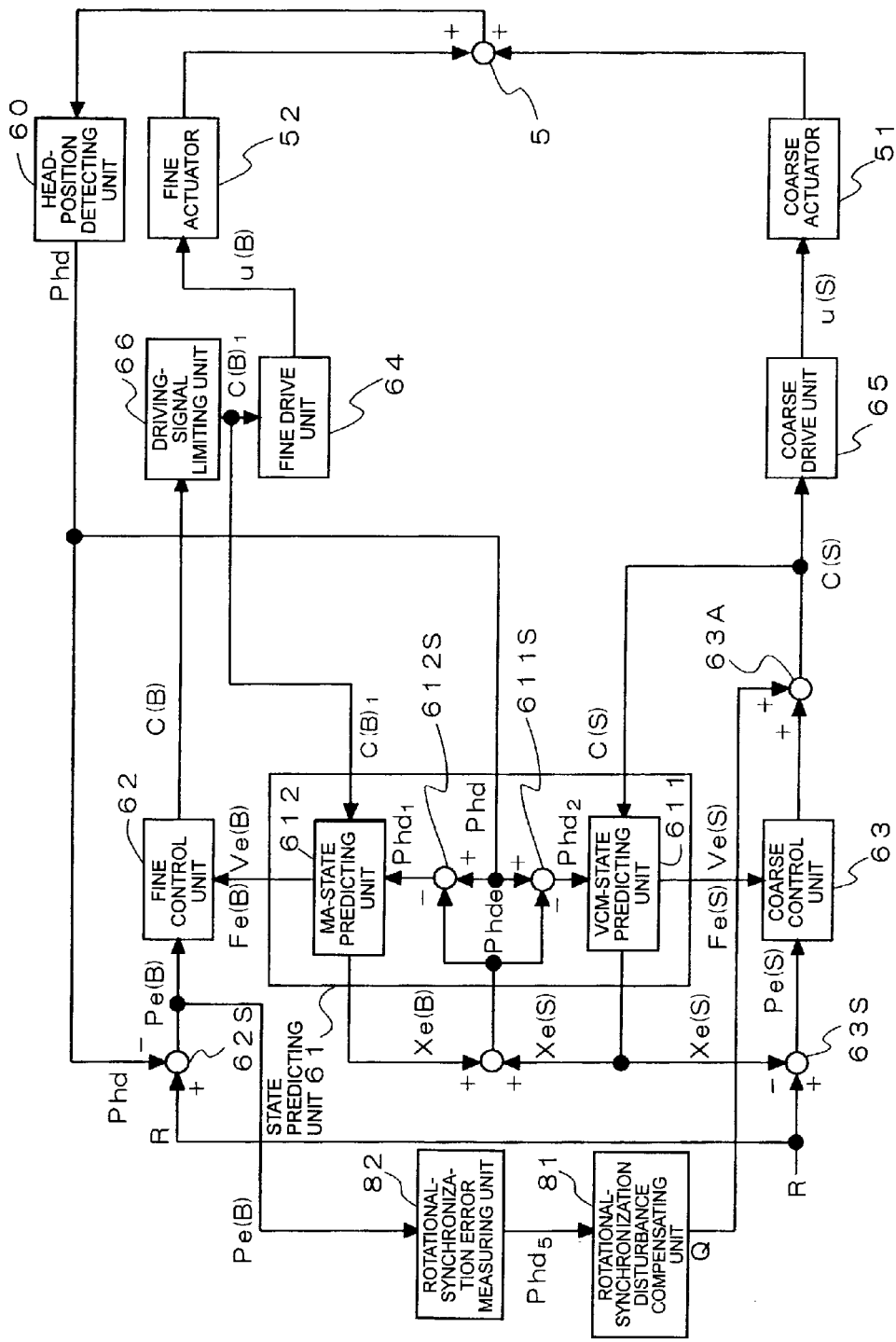
FIG. 32 is a block diagram showing a configuration of a head positioner according to the modified example of the tenth embodiment.
Figure 33:
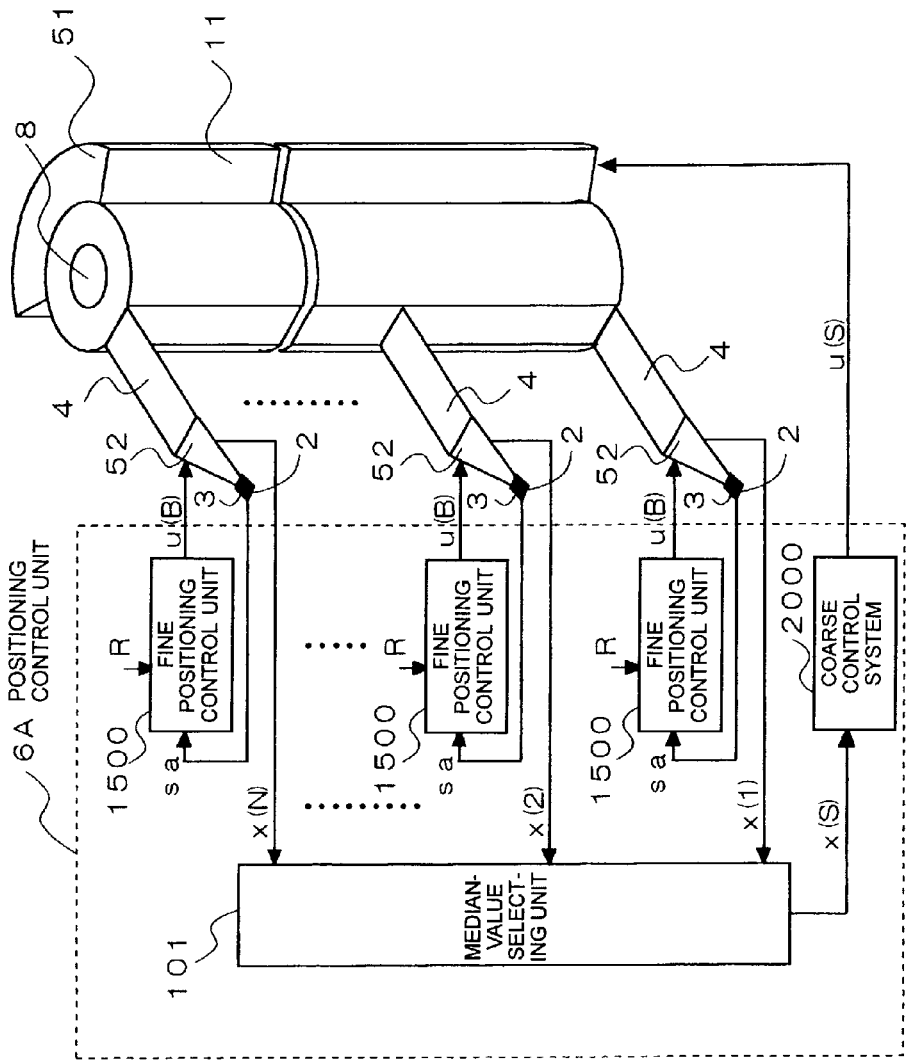
FIG. 33 is a block diagram showing a configuration of a head positioner according to the eleventh embodiment.
Figure 34:
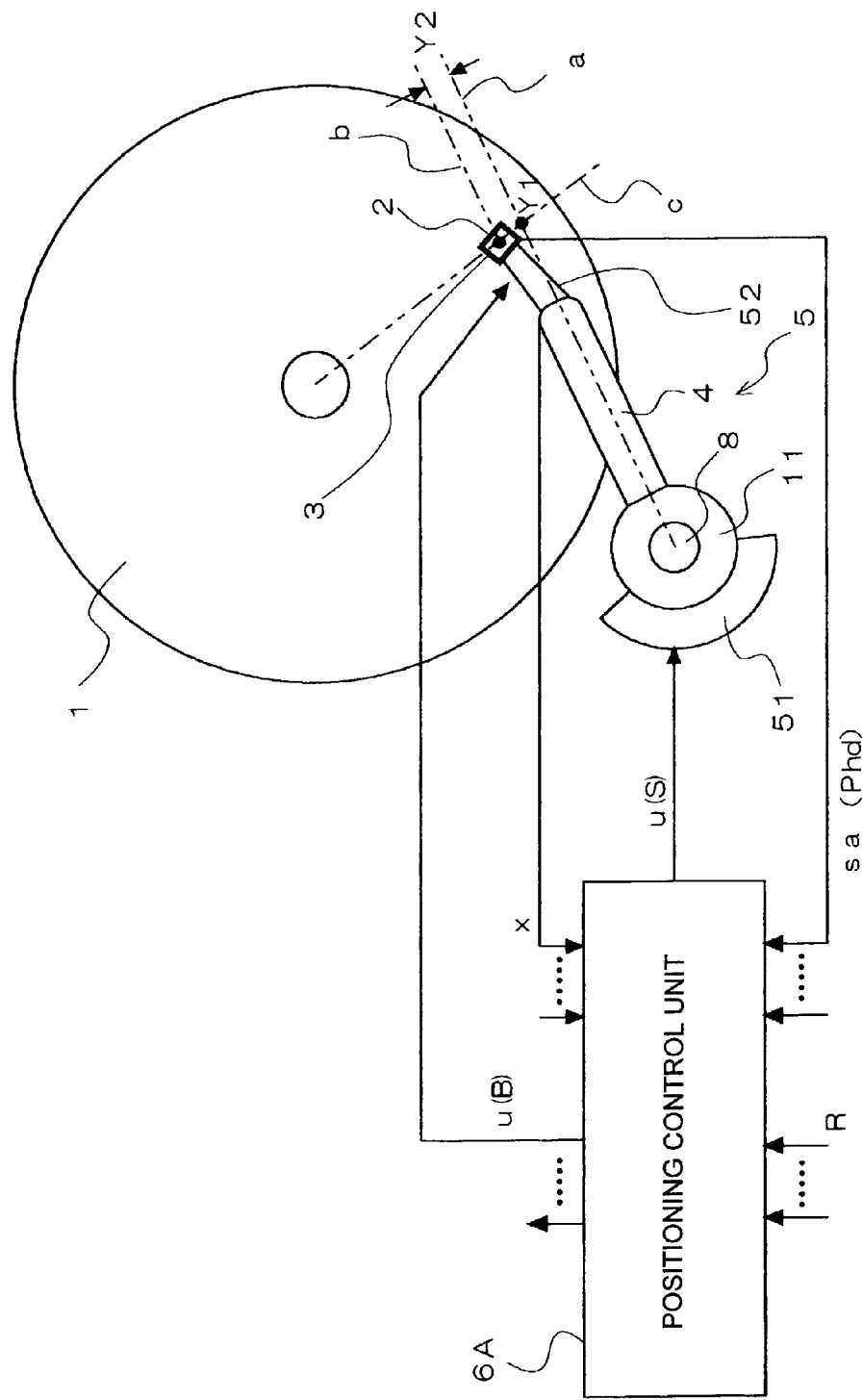
FIG. 34 is a schematic block diagram showing a magnetic disk drive on which the head positioner of the eleventh embodiment is mounted.

The configuration shown in FIGS. 27 and 28 may be replaced with the configuration shown in FIGS. 31 and 32. In a case of directly compensating for a rotational synchronization error, the rotational-synchronization error measuring unit 82 generates a compensation position signal $Phd_5$ according to the input head position signal Phd, and outputs the compensation position signal $Phd_5$. The compensation position error signal $Phd_5$ corresponds to a positional deviation of the head 2 that is caused by a disk-rotation synchronization disturbance that is attributable to, for example, the eccentricity of the disk 1. The rotational-synchronization disturbance compensating unit 81 outputs a disturbance error signal Q as a signal corresponding to the amount of compensation according to the compensation position error signal $Phd_5$ received from the error measuring unit 82. The disturbance error signal Q is then added by an adder 80A to a coarse control signal C(S). The output of the disturbance compensating unit 81 may be used as an eccentricity amount learned in the step of manufacture or initial activation, that is, as a value representing the amount of a position error caused by rotational synchronization disturbances.

Simulation was performed in the following conditions:

| Track density: | 45,000 track/inch |
|---|---|
| Track pitch: | 0.56 μm |
| Sampling frequency: | 20 kHz |
| Servo band: | 1.5 kHz |

In the above, results similar to those shown in FIGS. 19 and 20 were obtained.

For the above conditions, although the threshold of the driving-signal limiting unit 66 was set to 5 V, and the offset voltage was to 0 V, they may be set so that the current flowing through the piezoelectric device becomes equal to or lower than 5 μA. In addition, the threshold may be set variable depending on the time of operation for which the performance deterioration speed and reliability are required. Alternatively, the threshold may be set variable depending on the mode of an operation, such as a seeking operation or a track following operation.

(Eleventh Embodiment)

Hereinbelow, a description will be made regarding a head positioner of a dual-stage actuator method, in which a plurality of disks are disposed, a plurality of fine actuators are individually provided for the plurality of disks, and the plurality of fine actuators are moved in batches by using a common coarse actuator.

Comparison Example

Figure 46:
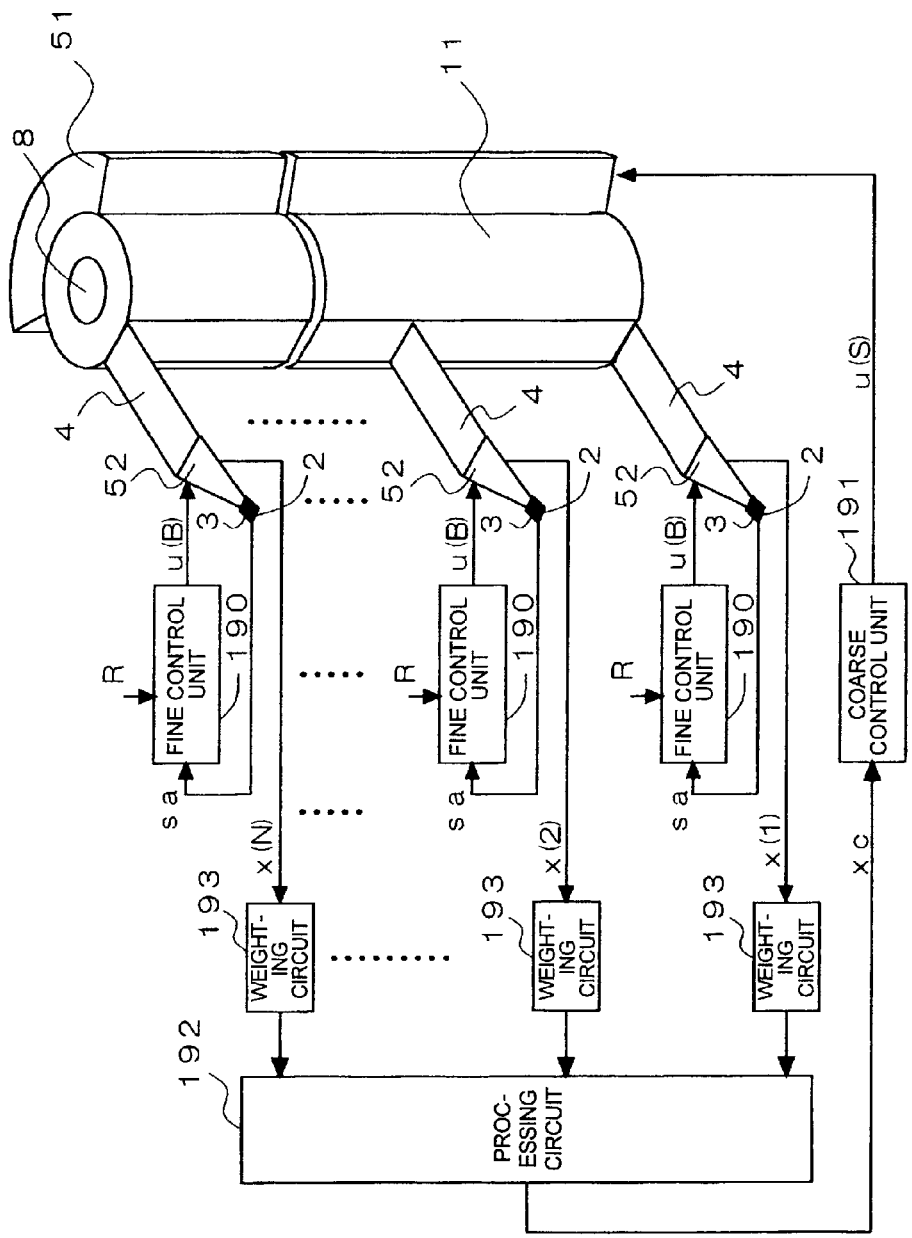
FIG. 46 is a schematic block diagram showing a magnetic disk drive on which a head positioner of an eleventh embodiment is mounted.

Before describing an eleventh embodiment, a comparison example hereinbelow will be described referring to FIGS. 46, 47 for easy understanding.

For the plurality of disks (not shown), a plurality of fine actuators 52 for performing positioning control of the individual heads 2 are provided to individual head supporting mechanisms 4, and the plurality of head supporting mechanisms 4 are mounted to a rotational body 11. The rotational body 11 is supported by a rotational axis 8, and is rotationally driven by the coarse actuator 51. Servo information sa that has been read out by the head 2 is input to a fine control unit 190. The fine control unit 190 detects a head position signal included in the servo information sa, and generates a position error signal by taking out a differential between a desired position signal R and the head position signal. In addition, predetermined processes are performed, a fine-movement drive signal u(B) is thereby generated, and a fine actuator 52 is then output. The fine actuator 52 is driven and controlled by the fine-movement drive signal u(B), and performs fine positioning control. The heads 2 are controlled independently of each other.

Use of a piezoelectric device for the fine actuator 52 facilitates the detection of the amount of displacement of the head 2. The piezoelectric device has both piezoelectric effects and inverse piezoelectric effects. In synchronization with positioning control being performed with fine displacement making use of distortion caused by voltage application, a small amount of displacement voltage can be detected as an amount of displacement by using a voltage generated by the displacement. Relative displacement signals $x(1)$ to $x(N)$ indicative of amounts of displacement of the individual fine actuator 52 are individually input to weighting circuits 193, are individually weighted therein, and individually fed into a processing circuit 192. The weighted signals are added to the relative displacement signals $x(1)$ to $x(N)$ in the processing circuit 193, and as a result, a weighting-added signal xc is output to a coarse control unit 191 performs predetermined processes for the input weighting-added signal xc, generates a coarse drive signal u(S), and outputs it to the coarse actuator 51. The coarse actuator 51 rotationally drives the rotational body 11 according to the coarse drive signal u(S), and thereby causes the plurality of head supporting mechanisms 4 to move in batches. The coarse control unit 191 performs control so as to minimize the value of the weighting-added signal xc. In parallel to the above control, the fine actuators 52 individually control the heads 2. The fine control unit 190 performs control so as to the aforementioned position error signal to be most close to "0".

In the above, the weighting circuits 193 weights the relative displacement signals $x(1)$ to $x(N)$ according to importances preliminarily allocated to the individual heads 2. The importance typically determines the priority in the access order. For example, the greatest weighting is allocated as the first priority to the head 2 for the top disk.

However, the above-described method of controlling the coarse actuator 51 according to the importance arises problems in that the corresponding head supporting mechanism 4 is frequently moved, and oscillations are caused thereby. Hereinbelow, these problems will be described.

Figure 47A:
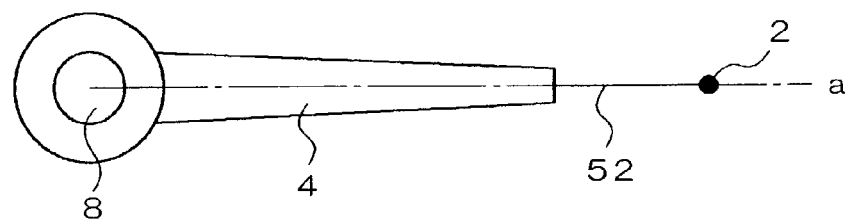
FIG. 47A is an explanatory view of operation of a configuration including one head and one fine actuator.

Suppose there are single head 2 and a single fine actuator 52 as in a case shown in FIG. 47A. In this case, the fine actuator 52 is controlled to be positioned along a center line "a" of the head supporting mechanism 4 upon completion of positioning servo control performed through cooperative operations of the coarse actuator 51 and the fine actuator 52.

Figure 47B:
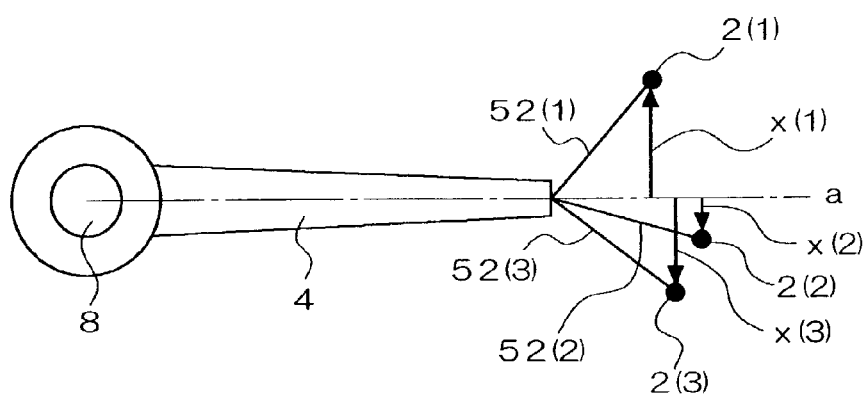
FIG. 47B is an explanatory view of operation of a comparison example.

Suppose there are a plurality of heads 2 and a plurality of fine actuators 52 as in a case shown in FIG. 47B (showing three heads 2 and three fine actuators 52 as an example case). In this case, the coarse actuator 51 performs positioning control of the head supporting mechanism 4 so that a value obtained by multiplying weightings $w_1$ to $W_3$ with displacement signals $x(1)$ to $x(3)$ (that is, weighting-added signal xc $xc=w_1 \blacklozenge x(1)+w_2 \blacklozenge x(2)+w_3 \blacklozenge x(3)$) converges to zero on a center line a. In this case, the relative displacement signals $x(1)$ to $x(3)$ individually have positive and negative values as directional components (vectors). Each of the fine actuators 52 in the state of being displaced from the center line a is controlled to be positioned in the direction of a desired track.

In the case shown in FIG. 47A, after the head 2 has reached a desired track, the fine actuator 52 performs track-following operations with a home position set along the zero-displacement center line a as the center. The track-following operation with the center at which the amount of displacement is zero is a most stabilized track-following operation.

In comparison, in a case shown in FIG. 47B, the fine actuator 52 performs tracking-following operations with home position set at positions displaced from the center line a. In this case, since the tracking-following operations are performed in the displaced states, the operation of the fine actuator 52 is unstable. As such, cases can occur in that the operation cannot be controlled, and abnormal oscillations are caused. Moreover, the frequency of oscillations increases because of frequent movements of the coarse actuator 51 and the fine actuator 52, the operation of the fine actuator 52 is more likely to be unstable. This will be described in detail hereinbelow.

Referring to FIG. 47B, a desired track of the disk corresponding to a head 2(1) corresponds in position to the head 2(1). Similarly, a desired track of the disk corresponding to a head 2(2) corresponds in position to the head 2(2), and a desired track of the disk corresponding to a head 2(3) corresponds in position to the head 2(3). Suppose the highest importance is set to the head 2(1). In this case, when the highest-importance head 2(1) is positioned near the center line a, the influence thereof is less. However, when the head 2(1) is positioned far from the center line a, the influence thereof is great. In the state shown in the drawing, the amount of displacement of the highest-importance head 2(1) is relatively is large. The weighting $w_1$ of the highest-importance head 2(1) is greatest. When the highest-importance head 2(1) is positioned off-track from the desired track, the influence is great in proportion to the weighting $w_1$. As such, the amount of operation of the coarse actuator 51 is large. It is preferably imagined that wobbling of the desired track corresponding in position to the highest-importance head 2(1) large in the drawing. According to the large amount of operation of the coarse actuator 51, each of the fine actuators 52 are also displaced and restarts tracking-following operation. The command frequency of access to the highest-importance head 2(1) is highest. As such, the movement frequencies of the coarse actuator 51 and the fine actuator 52 are relatively high in the tracking-following operations started from a state in which the value of the weighting-added signal xc is converged to zero when the amount of displacement of the highest-importance head 2(1). The high-frequency operations influences as oscillations to the individual fine actuators 52, thereby influencing the stability in the mechanism of the individual fine actuators 52. As such, mechanical resonances are caused by mutual interference between the fine actuators 52. That is, the positioning control itself for the head 2 to the desired track induces a positional deviation from the desired track. As a result, the positioning accuracy of the head 2 is deteriorated; and consequently, errors are tend to occur during, for example, a read/write operation of the head 2 on the desired track.

The eleventh embodiment of the invention resolves these problems. According to the eleventh embodiment, there is provided a head positioner capable of stably positioning individual heads on a plurality of disk surfaces. The positioning is implemented such that, taking the displacement amounts of individual fine actuators into account, one of the fine actuators that corresponds to a median value of a displacement-amount distribution is selected, and control is performed in cooperative operations of the selected one fine actuator and the coarse actuator.

Hereinbelow, the eleventh embodiment of the present invention will be explained.

The eleventh embodiment will be described with reference to FIGS. 33 to 36. Referring to the drawings, N (=integer representing the number of pieces) identical configuration members are provided corresponding to a plurality of coaxially disposed disks. When the individual configuration members need to be identified, the members are referred to with identification numerals 1 to N suffixed to the individual reference numerals/symbols thereof.

Figure 35:
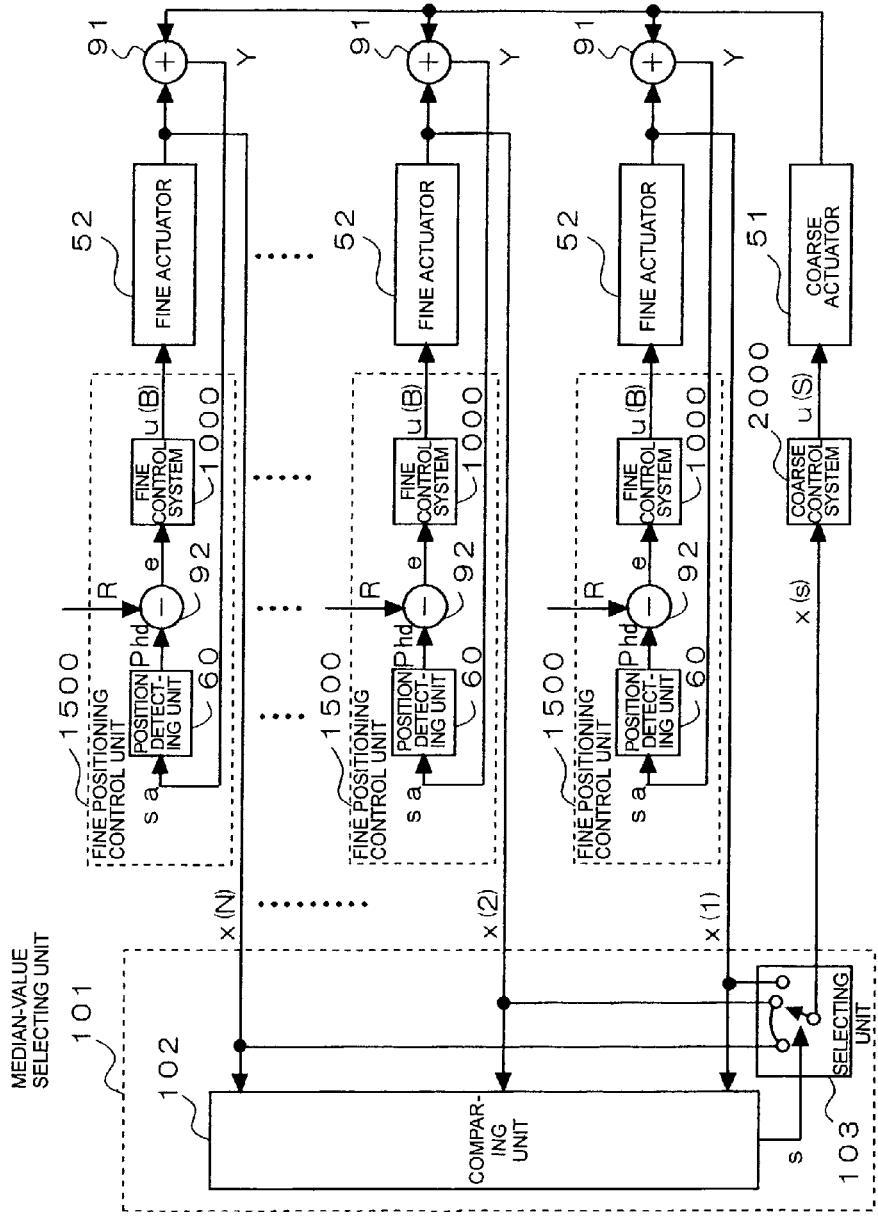
FIG. 35 is a block diagram showing a configuration of the head positioner according to the eleventh embodiment.

The reference numerals denote the configuration members as: 1 for a disk, 2 for a head, 3 for a head slider, 4 for a head supporting mechanism, 8 for a rotational axis, 11 for a rotational body, 51 for a coarse actuator, and 52 for a fine actuator. These configuration members are configured as already described above. A positioning control unit 6A includes a plurality of fine positioning control units 1500, a median-value selecting unit 101, and a coarse control system 2000. FIG. 35 shows the fine positioning control units 1500 and the median-value selecting unit 101 in detail.

The positioning mechanism 5 is formed of the head supporting mechanism 4, the coarse actuator 51, the fine actuator 52, and the head slider 3. The positioning mechanism 5 thus formed is driven according to a control signal fed from the positioning control unit 6A, and is thereby positioned. The positioning control unit 6A generates a fine drive signal u(B) and a coarse drive signal u(S) according to signals, such as a relative displacement signal x corresponding to the amount of displacement of the fine actuator 52 and servo information sa read out by the head 2 from the disk 1. Using the generated two signals, the positioning mechanism 5 performs positioning control of the fine actuator 52 and the coarse actuator 51.

The fine actuator 52 is displaced from an original position Y1 on the center line a of the head supporting mechanism 4 to inwardly and outwardly in the radial direction of the disk 1. Thereby, fine positioning of the head 2 is implemented. Reference symbol Y denotes the amount of displacement pf the head 2 from the original position Y1 to the current position. A head position Y is obtained through addition of a displacement amount Y2 of the fine actuator 52 to a displacement caused by the coarse actuator 51. According to the control thus performed, the head 2 is moved to a desired position and is positioned on-track over a desired track.

The head positioner includes the same plural numbers of the heads 2, the head sliders 3, and the fine actuators 52. Each of the fine actuators 52 is controlled to be finely displaced according to the fine drive signal u(B) of the fine control system 1000 in the fine positioning control unit 1500. The coarse actuator 51 drives the rotational body 11 according to the coarse drive signal u(S) fed from the coarse control system 2000. According to the rotational movement of the rotational body 11, the plural head supporting mechanisms 4, fine actuators 52, and heads 2 are moved in batches.

Each of the fine positioning control units 1500 inputs the servo information sa that has been read out by the head 2 from the disk 1. Then, the control unit 1500 generates a fine drive signal u(B) according to a head position signal Phd, which is included in the servo information sa and which is indicative of the current position of the head 2, and a desired position signal R. Then, the fine positioning control unit 1500 outputs the fine drive signal u(B) to the fine actuator 52. The fine actuator 52 is driven according to the fine drive signal u(B), and performs positioning control of the head 2, which involves fine displacement. The relative displacement signal x indicative of the amount of displacement of the head 2 is detected in the fine actuator 52, and is then output to the median-value selecting unit 101 in the positioning control unit 6.

The median-value selecting unit 101 compares the individual values of N relative displacement signals x(1) to x(N), prioritizes the values in the collating order thereof. Then, the median-value selecting unit 101 selects an s-th relative displacement signal representing the median value ranked in the center of the sequential values as a median-value signal x(s), and then outputs the selected median-value signal x(s). According to the input median-value signal x(s), the coarse control system 2000 generates a coarse drive signal u(S) and then provides output to the coarse actuator 51. According to the coarse drive signal u(S), the coarse actuator 51 drives the rotational body 11 to rotationally move. Thereby, the plurality of head supporting mechanisms 4 and the plurality of heads 2 are moved in batches to implement the positioning of the heads 2.

Next, a servo system of the present embodiment will be described with reference to FIG. 35. From the input servo information sa, the head-position detecting unit 60 reads head position information that corresponds to the current head position Y. The head position Y is obtained such that a virtual adder 91 formed as a mathematical model is used to perform addition of a virtual signal of the original position Y1, which is associated with the coarse actuator 51, to the displacement amount Y2, which is associated with the fine actuator 52. The information of the head position Y is represented by a model included in the servo information sa. Having received the information of the head position Y, the head-position detecting unit 60 outputs a head position signal Phd.

The servo information sa includes position information, such as track numbers used to identify tracks, and burst signals that is used to stabilize the positions within a track range. From the burst signal, the amount of deviation of the head 2 from the center of the track range is obtained. In addition, the head position signal Phd in a state where the amount of deviation is added to the number of tracks is output therefrom. In the subtracter 92, the head position signal Phd is subtracted from the desired position signal R, and the result is output as a position error signal Pe(B) to the fine control system 1000. The fine control system 1000 performs phase compensation for the input position error signal Pe(B) by using predetermined frequency characteristics, and then amplifies the signal by using a predetermined gain. In this case, as in the already described embodiments, a limiting process is performed for the position error signal Pe(B) in order to limit the level of drive signal for driving the fine actuator 52 at a voltage equal to or lower than a threshold whereat property deterioration of the piezoelectric device is caused through the electrochemical reaction. Thereby, the fine control system 1000 generates a fine drive signal u(B) and produces output. According to the fine drive signal u(B), the fine actuator 52 positions the head 2 according to the fine drive signal u(B).

A comparing unit 102 in the median-value selecting unit 101 compares the N relative displacement signals x(1) to x(N), prioritizes the values with numbers being allocated in the collating order of the values. Then, the median-value selecting unit 101 extracts a median-value signal x(s), and outputs a selected signal s corresponding to an intended identification number to a selecting unit 103. According to the selected signal, the selecting unit 103 selects the median-value signal x(s) from the relative displacement signals x(1) to x(N), and then provides output to the coarse control system 2000. The coarse control system 2000 performs phase compensation for the input median-value signal x(s) by using predetermined frequency characteristics, amplifies the signal by using a predetermined gain, and then produces a coarse drive signal u(S). The coarse actuator 51 drives the rotational body 11 according to the coarse drive signal u(S). In this way, all the heads 2 are moved in batches via the individual head supporting mechanisms 4.

The control in the coarse control system 2000 and the control in the fine control system 1000 are performed in synchronization with each other, and the individual heads 2 are finely positioned. More specifically, among the fine actuators 52 displaced toward individual desired positions, one of the fine actuators 52, which is positioned in the center, is selected. Then, the head positioning is performed in cooperative operations of the selected single central fine actuator 52 and the coarse actuator 51. In the above-described comparison example, all the fine actuators 52 operate in cooperation with the coarse actuator 51 to implement positioning operations. However, in the present embodiment, only the selected single central fine actuator 52 operates in cooperation with the coarse actuator 51. The control in this case is performed so that the amount of displacement of the fine actuator 52 is converged to zero. Consequently, the fine actuator 52 located in the center and the head 2 are positioned on the center line a of the head supporting mechanism 4. Each of the fine actuator 52 other than the central fine actuator 52 can perform head positioning in the state of being displaced from the center line a.

Hereinbelow, the operations of the present embodiment will be described more specifically with reference to FIGS. 36. The plurality of fine actuators 52 and the corresponding heads 2 are provided at end portions of the head supporting mechanism 4 that are rotationally driven by the coarse actuator 51 around the rotational axis 8. Although the invention is not limited by the number of the heads 2, description will hereinbelow will be made with reference to an example case where five heads 2 and five fine actuators 52 are provided. The fine actuators 52 are each displaced clockwise and counterclockwise about the rotational axis 8 with respect to the center line a.

Referring to FIG. 36A, the first to fifth relative displacement signals x(1) to x(5) are sorted for priorities in the order of X(1), x(5), x(2), x(4), and x(3) as a result of the prioritization performed by the comparing unit 102. The median-value signal x(s) corresponds in priority to x(2). In addition, the relative displacement signal x(2) corresponds to a fine actuator 52(2) ranked in the center among the plurality of fine actuators 52. The median-value selecting unit 101 selects the relative displacement signal x(2) and then provides output to the coarse control system 2000. Among the fine actuators 52 displaced toward the individual desired positions of the heads 2, the head positioning is implemented through cooperative operations of the coarse actuator 51 and the fine actuator 52(2) positioned in the center. Consequently, as shown in FIG. 36B, the control is performed so that the amount of deformation of the central fine actuator 52(2) is converged to zero, and the fine actuator 52(2) is positioned on the center line a of the head supporting mechanism 4. The head supporting mechanism 4 is displaced through the operation of the coarse actuator 51, and the head 2 is displaced through the operation of the fine actuator 52 with respect to the head supporting mechanism 4.

A command for a desired position for a central head 2(s) is changed, the central head 2(s) is moved by a fine actuator 52(s) toward a new desired position. As a result, a case can occur in that the median-value signal x(s) of the fine actuator 52(s) does not correspond to the median-value signal. In this case, a selecting operation similar to that described above is performed again by the median-value selecting unit 101.

Thus, the present embodiment is arranged such that, regardless of the degree of importance for, for example, the access priority, the positioning control is implemented for the coarse actuator 51 according to the single median-value signal x(s) selected from the relative displacement signals x(1) to x(N). According to the thus-arranged embodiment, the control is performed such that the central fine actuator 52 is always given precedence, and the central fine actuator 52 is always positioned on the center line a of the head supporting mechanism 4. As such, even when tracks of the plurality of disks are wobbly moved, the amounts of displacement and the displacement directions vary either in real time or at random, frequent movements of the rotational body 11 and the plurality of head supporting mechanisms 4 according to the coarse actuator 51 do not easily occur. For example, suppose the highest-importance head 2(1) maximally displaced in the forward direction is changed to a state where it is maximally displaced backward because of wobbly movements of tracks. Alternatively, suppose the highest-importance head 2(3) maximally displaced in the backward direction is changed to a state where it is maximally displaced forward because of wobbly movements of tracks. Even in this case, the control is performed such that the displacement of the central head 2(s) because of the change in the aforementioned state is sufficiently small, compared with the displacement of the highest-importance head 2(1) or the head 2(3). Concurrently, the control is performed stable with less movement with respect to the movement of the head supporting mechanism 4 according to the coarse actuator 51 based on the median-value signal x(s) corresponding to the relative displacement signal x of the central fine actuator 52.

As shown in FIG. 36B, in tracking-following operations, after a central head 2(2) has reached a desired track, the amount of displacement of the fine actuator 52(2) converges to zero. As long as the central head 2(2) is maintained in the center of the plurality of heads, the linear state with respect to the center line a between the fine actuator 52(2) and the head supporting mechanism 4 is maintained. As such, since the median-value signal x(s) has already converged to zero, the movement of the head supporting mechanism 4 according to the coarse actuator 51 is stopped, and tracking-following operations of the head 2 is performed in that state. In this case, the tracking-following operations are implemented in a most stable state. As such, high-accuracy and stable head-positioning control in a state where the occurrence of oscillations is suppressed can be implemented.

Hereinbelow, essential portions of the above will be repeatedly described. In the configuration including the plurality of tracks of the plurality of disks of which the track numbers are the same, the distances from the disk rotational centers are randomly variable because of wobbly movements thereof. As such, a case can occur in that the precedences in the distance are randomly interchanged among the plurality of tracks. The head supporting mechanism 4 is controlled to move for targeting a track (not limited the same one) that is always positioned in the center among the plurality of tracks. In other words, the head supporting mechanism 4 is controlled to move for targeting the vicinity of the center of an occupation region (of which the shape and the width are randomly changeable) of all the plural tracks. At this event, the coarse actuator 51 and the central fine actuator 52 operate in cooperation so that the central head is positioned on-track over a central track (so that the relative displacement signal x is converged to zero). The central fine actuator 52 and the head supporting mechanism 4 are positioned in close proximity such as to be linear. Both the fine actuator 52 and fine actuator 52 operate. When the central head 2 is positioned on-track over the central track, the central fine actuator 52 and the head supporting mechanism 4 are positioned linear. The relative displacement signal x of the central head 2 is converged to zero. Thereafter, the movement of the head supporting mechanism 4 according to the coarse actuator 51 is stopped. The head 2 at a portion other than the center is positioned on-track by using the fine actuator 52. The fine actuator 52 at the position other than the center discretely operates. During the above-described operations, the coarse actuator 51 and the central fine actuator 52 are stopped inactive, and only the fine actuator 52 at a portion other than the center is operated. As such, the overall stability is significantly high. This state is maintained until the desired track is changed. In the present embodiment described above, unlike the comparison example, the present embodiment does not employ the degree of importance, and perform the processing on the condition that all the heads 2 are mutually equal.

As described above, according to the present embodiment, the operational burden to be imposed on the coarse actuator 51 is minimized, and also operational burden to be imposed on the individual fine actuators 52 is minimized. Accordingly, the embodiment is capable of suppressing the occurrence of oscillations, thereby enabling stable and high-accuracy head-positioning control to be implemented. Furthermore, a record/replay may perform in good condition.

In the comparison example, on-track operations need to be performed at a higher speed to suppress occurrence of oscillations. To achieve the higher speed operations, a proportionally higher voltage needs to be applied to the piezoelectric devices constituting the fine actuators 52. However, application of an excessively high voltage causes lead precipitation and property deterioration in the piezoelectric devices as well as breakdown of the piezoelectric devices, as described above in detail.

This invention employs the novel and improved method in which the application voltage for the piezoelectric devices is limited. Therefore, the median-value signal x(s) prevents the occurrence of oscillations in the control of the coarse actuator 51.

(Twelfth Embodiment)

Figure 37:
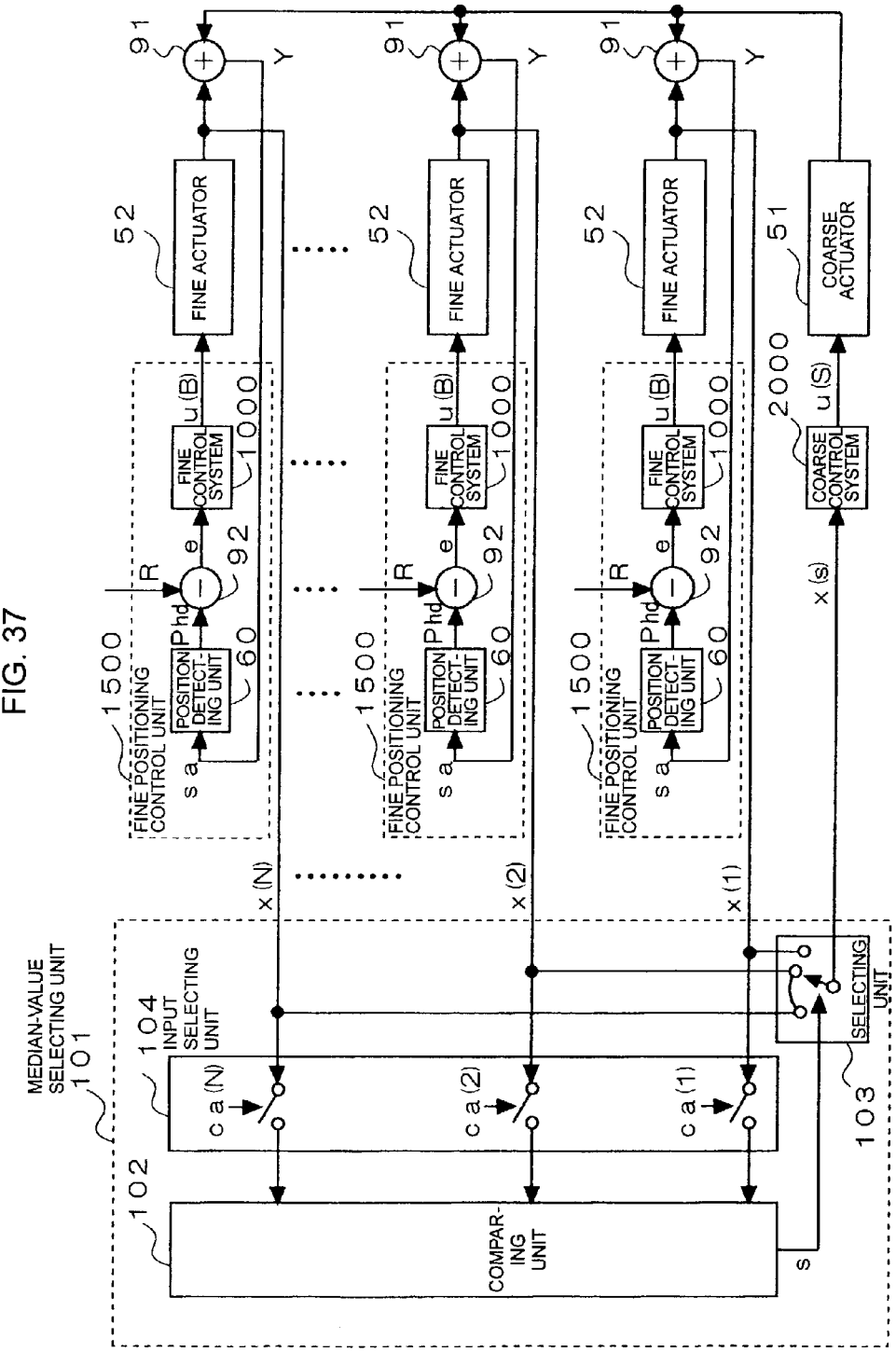
FIG. 37 is a block diagram showing a configuration of a head positioner according to a twelfth embodiment.

Hereinbelow, a twelfth embodiment will be described with reference to FIG. 37. In FIG. 37, the same reference numeral/symbols are used to refer to the same configuration members as those of the eleventh embodiment shown in FIG. 35. The interior configuration of the median-value selecting unit 101 of the embodiment is different from that of the median-value selecting unit 101 shown in FIG. 35.

The operations of the coarse actuator 51 and the fine actuator 52 for positioning control are identical to those of the eleventh embodiment.

Hereinbelow, features of the present embodiment will be described. The median-value selecting unit 101 includes an input selecting unit 104 as an additional configuration member. The input selecting unit 104 inputs relative displacement signals x(1) to x(N) of the individual fine actuators 52 and access, command signals ca(1) to ca(N) generated by a control unit (not shown) of the overall disk drive unit for the individual heads 2. An access command signal ca is issued to one of the heads 2 for carrying out an read/write access to a desired track request. This enables the detection of whether the corresponding head 2 is in access to the desired track. The input selecting unit 104 selects only a relative displacement signal of the responsible fine actuator 52 as a candidate for selecting a median value the input relative displacement signals x(1) to x(N). That is, the responsible fine actuator 52 has the head 2 for which the access command signal ca is active. Then, the input selecting unit 104 provides output to the comparing unit 102. The comparing unit 102 performs operation that is similar to that in the eleventh embodiment. However, the comparing unit 102 performs processing with the relative displacement signal selected by the input selecting unit 104 as a candidate for selecting a median value. A selected median-value signal x(s) is output to the coarse control system 2000.

The coarse actuator 51 cooperates with the central fine actuator 52 in the state of accessing the desired track, and thereby performs positioning of the head 2. In the eleventh embodiment, when the command of the desired position signal R for a central fine actuator 52 is changed, a fine actuator 52 to newly be positioned in the center is selected, and the selected fine actuator 52 cooperates with the coarse actuator 51 to perform subsequent positioning control. In comparison, the twelfth embodiment is different from the eleventh embodiment as described hereunder. In the present embodiment, the access command signal ca becomes inactive upon completion of a read/write access of the central head 2. When the access command signal ca has become inactive, the signal corresponding to the head 2 is excluded from selection candidates in the input selecting unit 104. That is, the selection candidates are reduced by one. As a result, upon completion of the previous access, the subsequent positioning control is performed through cooperative operations of the coarse actuator 51 and the central fine actuator 52 that has the head 2 for which the access command is issued and that has the central relative displacement signal x. After completion of the read/write access, the operated head 2 stays on the on-track accessed track. In this manner, positioning control is serially performed for heads 2 required to access individual desired tracks.

Thus, in addition to the operations of the eleventh embodiment, after completion of a read/write access of a head 2, the head 2 stays at the accessed track position. The operated heads 2 completed read/write access serially stop. Consequently, the number of unoperated heads 2 and the number of fine actuator 52 corresponding thereto are reduced. Accordingly, the displacement frequency of the fine actuators 52 can be reduced.

Thus, the number of unoperated heads 2 is reduced one by one. As such, the number of the heads for selecting the median value alternately assumes an odd number and an even number. Namely, the number of the relative displacement signals alternately assumes odd and even numbers. When the number of the relative displacement signals assumes an odd number $(2n+1)$, $((2n+1)+1)/2=1$ is a natural number. In this case, since the central object exists, a (n+1)-th median-value signal x(s) in the center may be selected. On the other hand, however, when the number of the relative displacement signals is an even number (2n), (2n+1)/2 is not a natural number. In this case, no central head exists. That is, since two n-th and (n+1)-th heads can be central heads, the one head corresponding to a smaller relative displacement signal is selected.

A head that has completed a read/write access (read/write-completion head) staying at the on-track accessed track position is not any more the candidate of relative displacement signals for the coarse control system 2000. As such, the read/write-completed head 2 is excluded from objects of control of the coarse actuator 51. While control is performed for a coarse actuator 51 according to a median-value signal x(s) corresponding to a central head 2(less-displaced head 2 in the even-number case) among heads 2 that have not yet completed a read/write operation (read/write-incompletion heads), a fine actuator 52 corresponding to the central head 2 is positioned on the center line a of the head supporting mechanism 4. Also, a case can occur in that since the read/write-completion head 2 is finely displaced to stay on the track position, it deviates from the center line a. Thus, the candidate relative displacement signal x for controlling the coarse actuator 51 is selected only from those corresponding to read/write-incompletion heads 2. Thereby, the stability of a currently writing/reading head 2 is improved. The read/write-completion head 2 is irrelevant to the read/write. Other operations are similar to those in the eleventh embodiment.

According to the above-described synergetic effects, occurrence of oscillations can further be reduced, high-accuracy and stable head-positioning control can be implemented, and read/write can suitably be implemented. Furthermore, since the displacement frequency is reduced, service life of each of the fine actuators 52 can be prolonged thereby.

(Thirteenth Embodiment)

Figure 38:
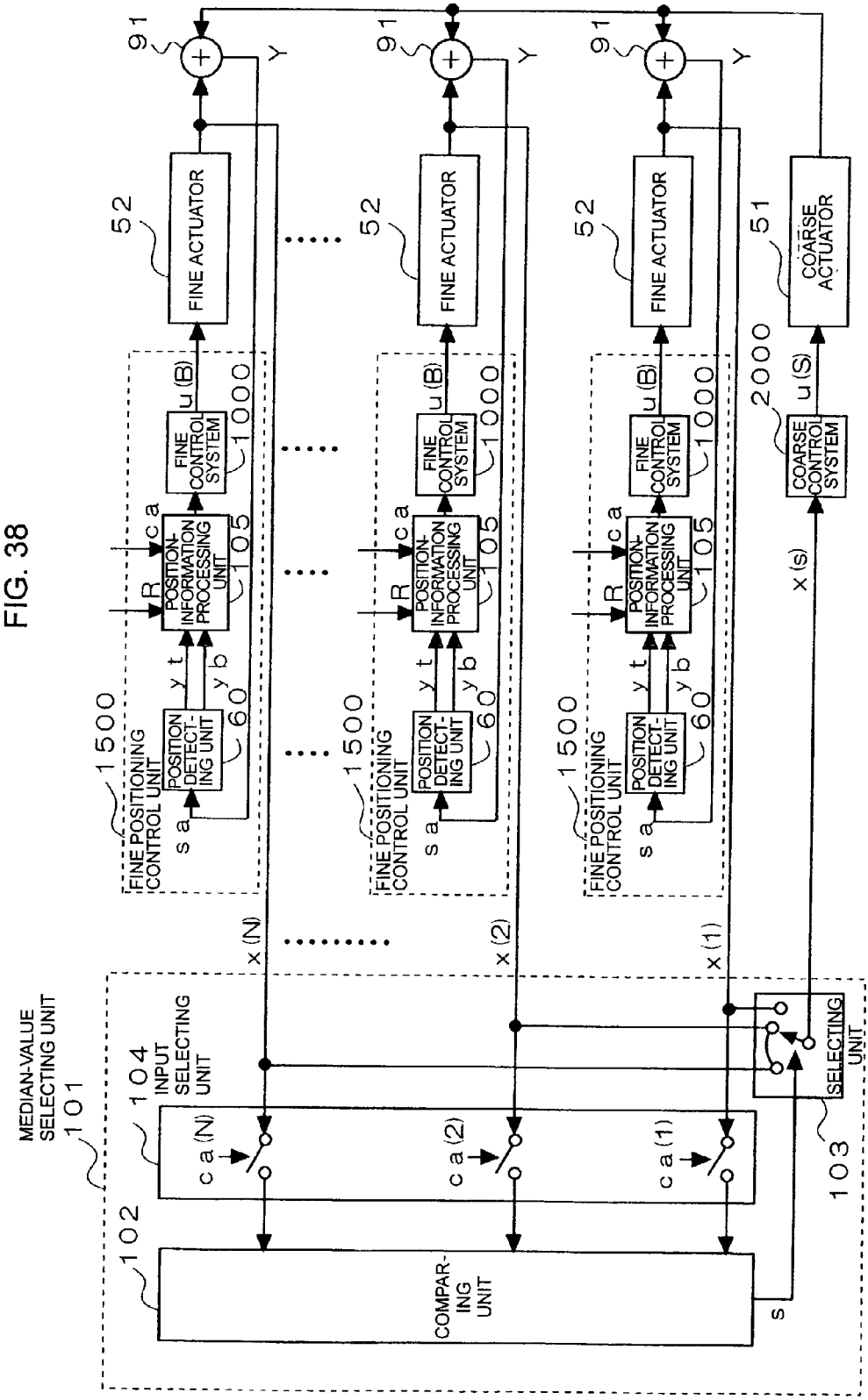
FIG. 38 is a block diagram showing a configuration of a head positioner according to a thirteenth embodiment.
Figure 39:
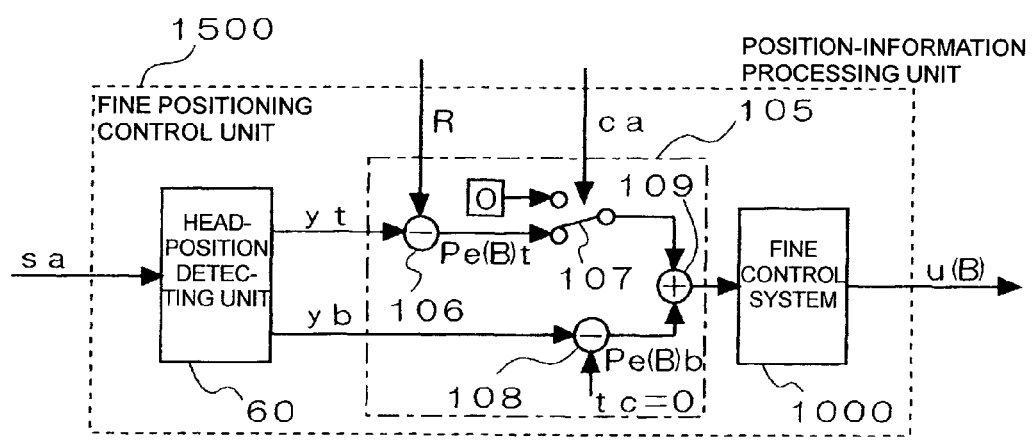
FIG. 39 is a block diagram showing a configuration of a fine positioning control unit according to the thirteenth embodiment.

Hereinbelow, a thirteenth embodiment will be described with reference to FIGS. 38 and 39. In FIG. 38, the same reference numeral/symbols are used to refer to the same configuration members as those of the twelfth embodiment shown in FIG. 37. The interior configuration of the fine positioning control unit 1500 is different from that of the fine positioning control unit 1500 used in the twelfth embodiment. The operations of the coarse actuator 51 and the fine actuator 52 for positioning control are identical to those of the twelfth embodiment.

Hereinbelow, feature portions of the thirteenth embodiment will be described. The thirteenth embodiment is an improved example of the twelfth embodiment. In the twelfth embodiment, the read/write-completion head 2 involves fine displacement. However, the thirteenth embodiment even reduces displacement of the read/write-completion head 2. The fine positioning control unit 1500 of the present embodiment includes a position-information processing unit 105 as a new configuration member. The position-information processing unit 105 inputs a head position signal from the head-position detecting unit 60. The head position signal is included in servo information sa read out from the head 2. In addition, the position-information processing unit 105 inputs an access command signal ca, which is fed to the head 2, and a desired position signal R from a disk control unit (not shown).

In specific, the head position signal fed from the head-position detecting unit 60 to the position-information processing unit 105 includes a track position signal yt and a burst demodulation signal yb. The servo information sa to be read through the head 2 from the disk 1 includes address information and a burst signal. The address information contains, for example, track numbers and sector numbers. The burst signal is used for a tracking-following operation, and is formed within a track. Using the burst signal, track-following control is performed, and the head 2 is resultantly placed over a desired position within one track. The track position signal yt is indicative of a track number. The burst demodulation signal yb carries information of a position within one intratrack region in the radial direction of the disk. The position-information processing unit 105 processes the track position signal yt and the burst demodulation signal yb in response to the access command signal ca. Then, the position-information processing unit 105 provides outputs to the fine control system 1000. Thereby, the displacement of the fine actuator 52 is controlled.

When the access command signal ca is active, the track position signal yt becomes valid. Thereby, a fine drive signal u(B) is generated through the cooperation of the track position signal yt and the burst demodulation signal yb. When the access command signal ca is inactive, the track position signal yt becomes invalid. As such, the fine drive signal u(B) is generated only by the burst demodulation signal yb. In the head-position detecting unit 60, a subtracter 106 subtracts the track position signal yt from the desired position signal R indicative of a command for movement to the desired track. The differential obtained through the subtraction is output as an off-track error signal Pe(B)t to a switch 107. The off-track error signal Pe(B)t is indicative of an off-track error with respect to a desired track. In accordance with the access command signal ca, the switch 107 selects one of the off-track error signal Pe(B)t and a zero signal indicating that no off-track error has been detected. The burst demodulation signal yb is output to a subtracter 108. The subtracter 108 subtracts the burst demodulation signal yb from a track center signal tc that corresponds to a central portion of one intratrack region. Specifically, a position error from the central portion of the one intratrack region is detected as a burst error signal Pe(B)b. An adder 109 appropriately performs level matching of the signals, thereby performs addition of the signal to an output of the switch 107 and an output of the subtracter 108. Then, the adder 109 outputs the addition result to the fine control system 1000.

Before an inactive access command signal ca is generated, operations similar to those in the twelfth embodiment are performed. The fine control system 1000 synthesizes the track position signal yt and the burst demodulation signal yb, and generates a fine drive signal u(B) as a result. The synthesization of the track position signal yt and the burst demodulation signal yb therefore corresponds to the case of the head position signal Phd in the twelfth embodiment.

Upon completion of a read/write operation of a central head 2 that is performed as in the case of the twelfth embodiment, an access command signal ca corresponding to the head 2 becomes inactive. Then, the switch 107 performs switching operation, the track position signal yt is invalidated, and the off-track error is set to zero. Then, the fine control system 1000 generates a fine drive signal u(B) according to only the burst error signal Pe(B)b, which is based on the burst demodulation signal yb. The fine control system 1000 controls the fine actuator 52 by using the fine drive signal u(B).

Suppose a case has occurred in which, when performing a tracking-following operation of a read/write-incompletion head 2, the coarse actuator 51 is driven to move the head supporting mechanism 4 toward a different desired track such as an adjacent track. In this case, in the twelfth embodiment, since the previous on-track-accessed track is continually followed, the amount of displacement tends to increase. According to the present embodiment, however, the track position signal yt is disregarded, and only the burst demodulation signal yb is used. As such, even when the desired track is set to a different track as in the above case, control is performed such that track-following operation is performed in the direction to a central position within the track region, and the movement of a fine actuator 52 corresponding to a read/write-completion head 2 is inhibited. As a result, the read/write-completion fine actuator 52 is substantially kept positioned over the center line a of the head supporting mechanism 4. More specifically, regardless of the position of rotation according to the coarse actuator 51, fine actuators 52 not yet commanded for a read/write operation are each kept positioned in the vicinity of center line a of the head supporting mechanism 4 in a standby mode for a subsequent operation. The fine actuator 52 is structurally most stabilized when it is positioned in the vicinity of the center line a of the head supporting mechanism 4. In addition, the position-information processing unit 105 functions to inhibit the movement of the read/write-completion fine actuator 52 toward the previous on-track-accessed track. Thereby, occurrence of oscillations can be reduced, and read/write operation can be implemented stable in a high-accuracy positioning state.

Furthermore, since the level of driving voltage to be applied to the read/write-completion fine actuator is reduced before being applied to the read/write-completion fine actuators 52, service life of the piezoelectric device constituting each of the fine actuators 52 can be prolonged.

Each of the embodiments 11 to 13 has the arrangement in which the relative displacement signal x having detected the amount of displacement of the fine actuator 52 is used for the input signal of the median-value selecting unit 101. However, the arrangement may be such that a state predicting unit for a modeled unit of each of the fine actuators 52 is provided, and a signal generated by the state predicting unit is used as the relative displacement signal x. Even in the case, similar advantages can be obtained.

(Fourteenth Embodiment)

Figure 40:
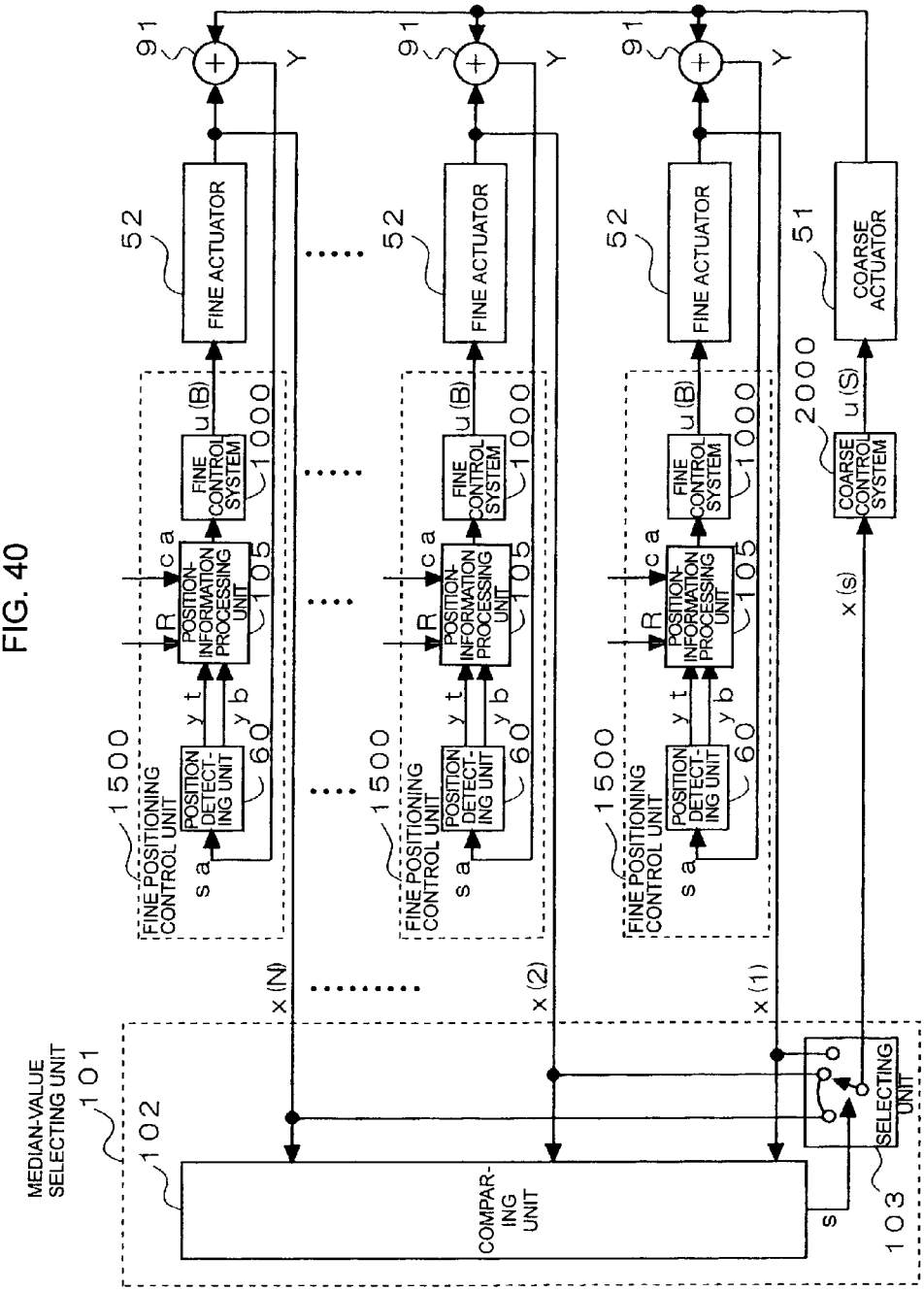
FIG. 40 is a block diagram showing a configuration of a head positioner according to a fourteenth embodiment.

Hereinbelow, a fourteenth embodiment of the invention will be described referring to FIG. 40. The fourteenth embodiment is a modified embodiment of the thirteenth embodiment shown in FIGS. 38 and 39. The modified embodiment may be configured such that the input selecting unit 104 is excluded from the median-value selecting unit 101 shown in FIG. 38 to be similar to the median-value selecting unit 101 of the fifteenth embodiment shown in FIG. 35. Moreover, the fine positioning control unit 1500 includes the position-information processing unit 105 shown in FIGS. 38 and 39.

Hereinbelow, embodiments of software configurations will be described.

(Fifteenth Embodiment)

Figure 41:
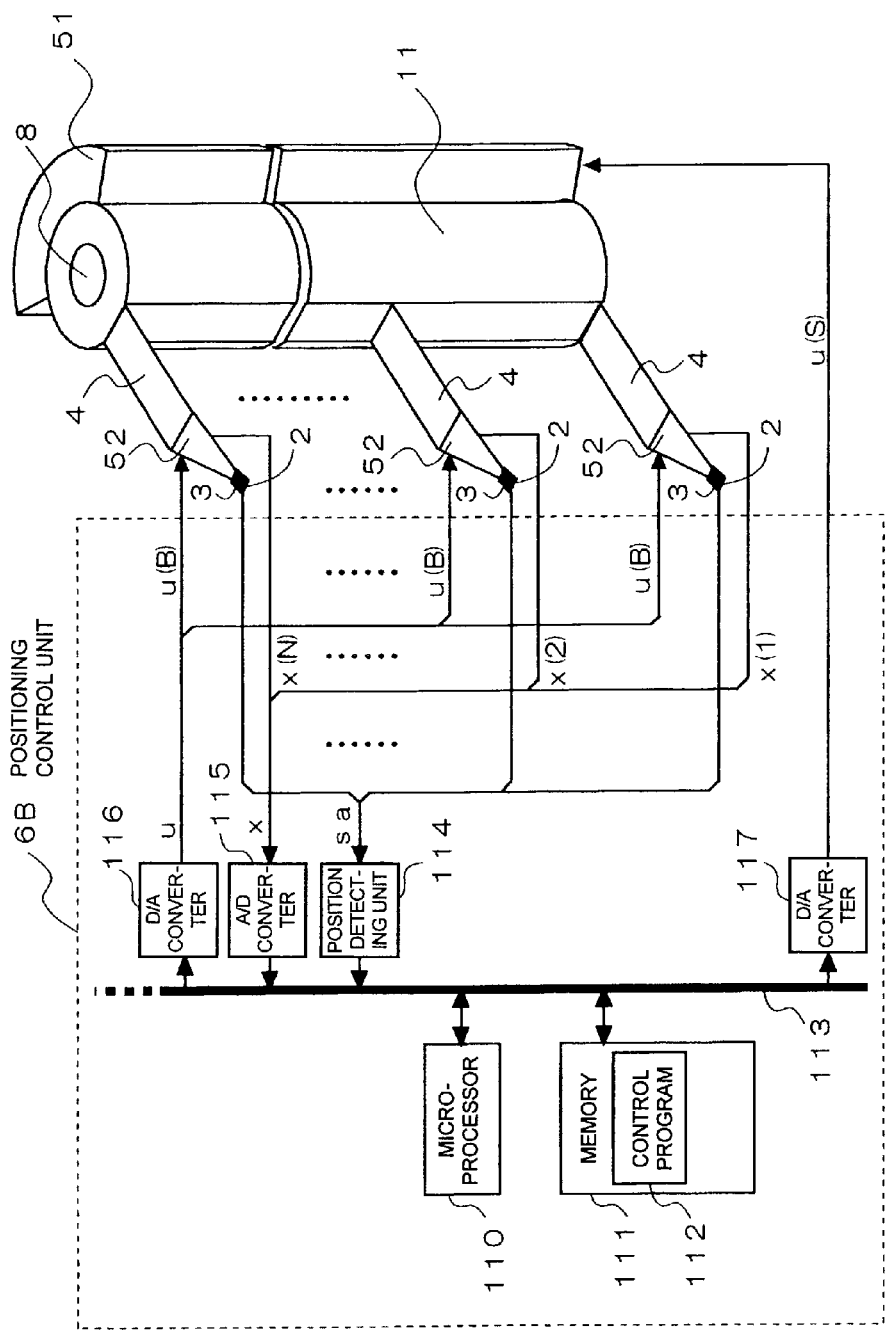
FIG. 41 is a schematic block diagram showing a magnetic disk drive on which a head positioner of a fifteen embodiment is mounted.
Figure 42:
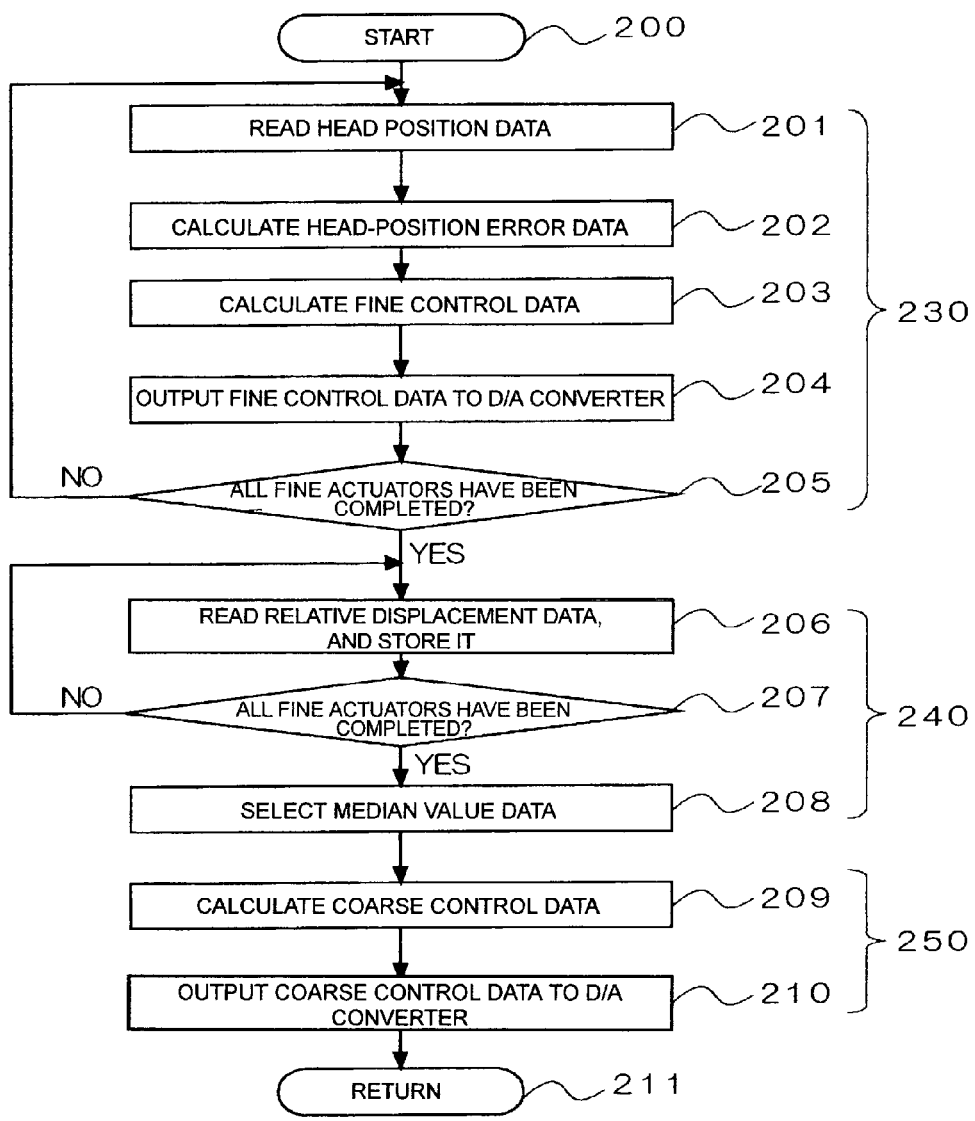
FIG. 42 is a flowchart showing a function configuration of the head positioner according to the fifteenth embodiment.

Hereinbelow, a fifteenth embodiment will be described with reference to FIGS. 41 and 42. The fifteenth embodiment is a software configuration corresponding to the eleventh embodiment shown in FIG. 35. The present embodiment has a structural configuration that is similar to that shown in FIGS. 33 and 34. In the present embodiment, major processes are performed by a microprocessor.

A positioning control unit 6 B includes a microprocessor 110, a memory 111, a head-positioning control program 112 stored in the memory 111, a common bus 113, a head-position detecting unit 114, an A/D converter 115, and D/A converters 116 and 117. The head-position detecting unit 114, the A/D converter 115, and the D/A converter 116 are individually equal in number to the number of the fine actuators 52.

The microprocessor 110 performs total control according to the control program 112. Analog relative displacement signals x(1) to x(N) fed from the individual fine actuators 52 are converted by the individual A/D converters 115 into digital relative displacement data, and the digital data is sent to the microprocessor 110 via the common bus 113. Each of the head-position detecting units 114 inputs servo information from each of the heads 2, extracts head position data, and sends outputs to the microprocessor 110 via the common bus 113. The microprocessor 110 inputs the relative displacement data and the head position data, and generates control data according to the input data and desired position data. Then, the microprocessor 110 sends the generated control data to the D/A converters 116 and 117 via the common bus 113. At this time, the control data for controlling the individual fine actuators 52 is sent the individual D/A converters 116, and the control data for controlling the coarse actuator 51 is sent to the individual D/A converters 117. Each of the D/A converters 116 converts the input digital data into an analog fine drive signal u(B), and controls each of the fine actuators 52. Each of the D/A converters 117 converts the input digital data into an analog coarse drive signal u(S), and controls the coarse actuator 51.

Hereinbelow, control operations according to the control program 112 will be described with reference to a flowchart of FIG. 42.

At step 200, the control program 112 is invoked by the system, and processing is started. At step 201, head position data indicative of the current position is read from the servo information that has been read by the head-position detecting unit 114. At step 202, the head position data is subtracted from the desired position data, and resultant head-position error data is temporarily stored. At step 203, phase-compensation calculations are performed for the head-position error data by using predetermined phase characteristics and frequency characteristics and a predetermined gain, and outputs of the calculations are temporarily stored as fine control data. At step 204, the fine control data is output to the D/A converter 116. The D/A converter 116 outputs a fine drive signal u(B) generated according to the fine control data to the fine actuator 52. At step 205, the program verifies as to whether the processes have been completed for all the fine actuators 52(N pieces). If the processes have not yet been completed, the program executes the routine starting with step 201 for the remaining fine actuators 52. If the processes have been completed for all the fine actuators 52, the operation proceeds to a subsequent step. The above-described routine of steps 201 to 205 provides a function of fine control means 230 for controlling the fine actuators 52.

Subsequently, at step 206, relative displacement data of the fine actuator 52 is read from the A/D converter 115 and is then temporarily stored. At step 207, the program verifies as to whether readout of the relative displacement data has been completed for all the fine actuators 52. If the readout has not yet been completed, a step similar to step 206 is executed for each of the remaining fine actuators 52. If the process has been completed for all the fine actuators 52, the operation proceeds to a subsequent step. At step 208, the plurality items of read-out relative displacement data are compared for their values and are prioritized in the collating order thereof. Then, an item of the relative displacement data ranked in the center of the order is selected as median value data. The above-described routine of steps 206 to 208 provides a function of median-value selecting means 240 for selecting median value data from each item of the relative displacement data.

Subsequently, at step 209, phase-compensation calculations are performed for the selected median value data by using predetermined phase characteristics and frequency characteristics, and outputs of the calculations are temporarily stored as coarse control data. At step 210, the coarse control data is output to the D/A converter 117. The D/A converter 117 outputs a coarse drive signal u(S) generated according to the coarse control data to the coarse actuator 51. The above-described routine of steps 209 and 210 provides a function of coarse control means 250 for controlling the coarse actuator 51.

At step 211, processing control returns to a main program that controls the overall disk drive unit. In the positioning control, the main program monitors, for example, seeking-operation control and track-following operation control. After processing control has returned to the main program, the main program iterates the steps shown in FIG. 42. Thereby, the positioning control for each of the heads 2 is implemented.

The present embodiment is based on the same operation principles described for the positioning control system of the eleventh embodiment shown in FIG. 35. The present embodiment enables advantages similar to those of the eleventh embodiment to be obtained.

(Sixteen Embodiment)

Figure 43:
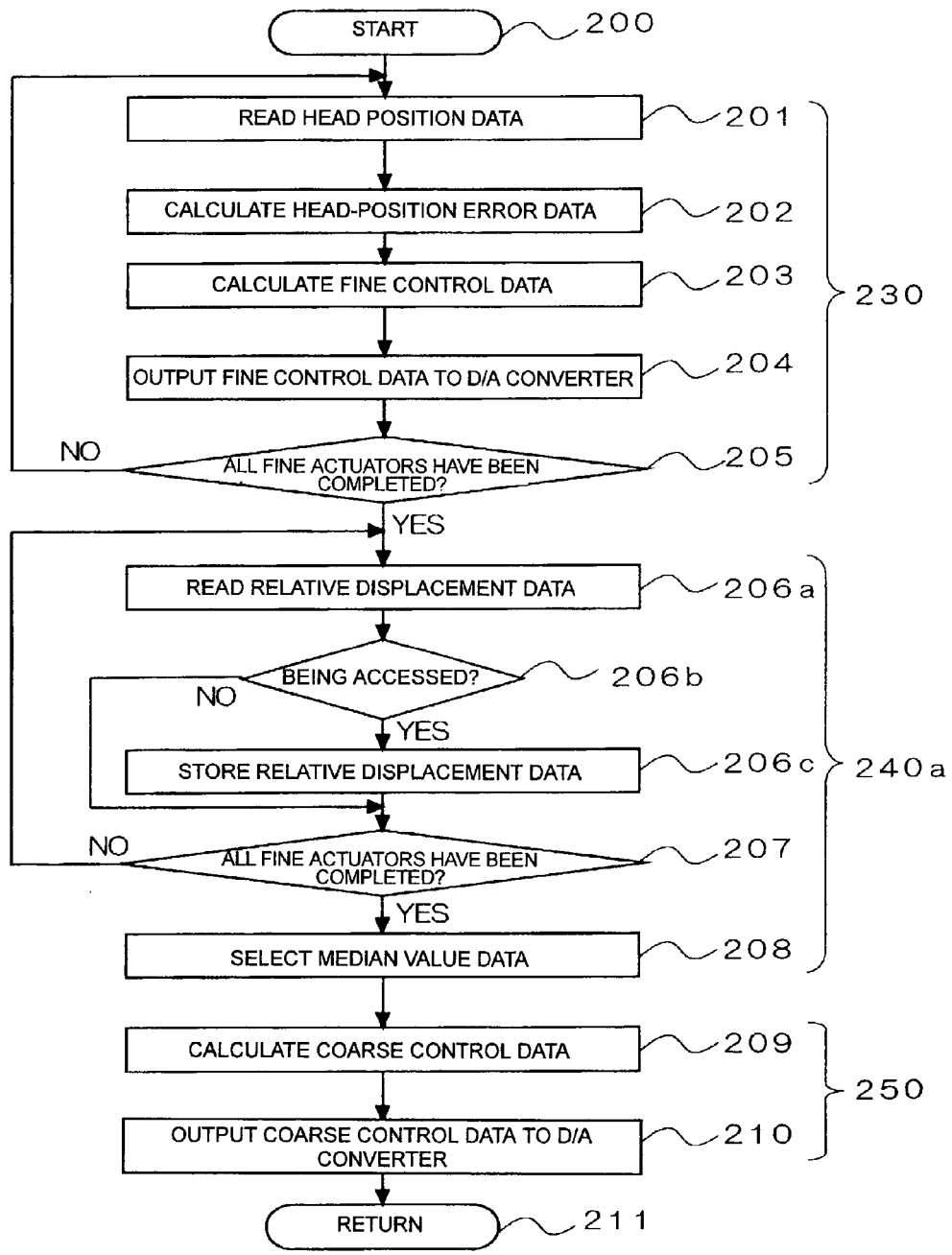
FIG. 43 is a flowchart showing a function configuration of a head positioner according to a sixteenth embodiment.

Hereinbelow, a sixteenth embodiment will be described with reference to FIGS. 41 and 43. The sixteen embodiment is a software configuration corresponding to the twelfth embodiment shown in FIG. 37.

At step 206*a*, relative displacement data of the fine actuator 52 is read from the A/D converter 115 and is then temporarily stored. At step 206*b*, using information of access command data generated by the main program, a determination is made as to whether the head 2 is in access to a desired track. If the head 2 is in access to the positioned on-track, the operation proceeds to step 206*c*, and the relative displacement data is temporarily stored. If the head 2 is not in access to the desired track, the operation skips to step 207. At step 207, the program verifies as to whether readout of the relative displacement data has been completed for all the N fine actuators 52. If the readout has not yet been completed, a routine of steps similar to steps 206*a* to 207 is executed for each of the remaining fine actuators 52. If the process has been completed for all the fine actuators 52, the operation proceeds to a subsequent step. At step 208, the plurality items of read-out relative displacement data are compared for their values and are prioritized in the collating order thereof. Then, an item of the relative displacement data in the center of the order is selected as median value data. The above-described routine of steps 206*a* to 208 provides a function of median-value selecting means 240 a for selecting median value data from each item of the relative displacement data. Other operations are the same as those in the fifteenth embodiment; therefore, descriptions thereof will be omitted herefrom.

The present embodiment is based on the same operation principles described for the positioning control system of the twelfth embodiment shown in FIG. 38. The present embodiment enables advantages similar to those of the twelfth embodiment to be obtained.

(Seventeenth Embodiment)

Figure 44:
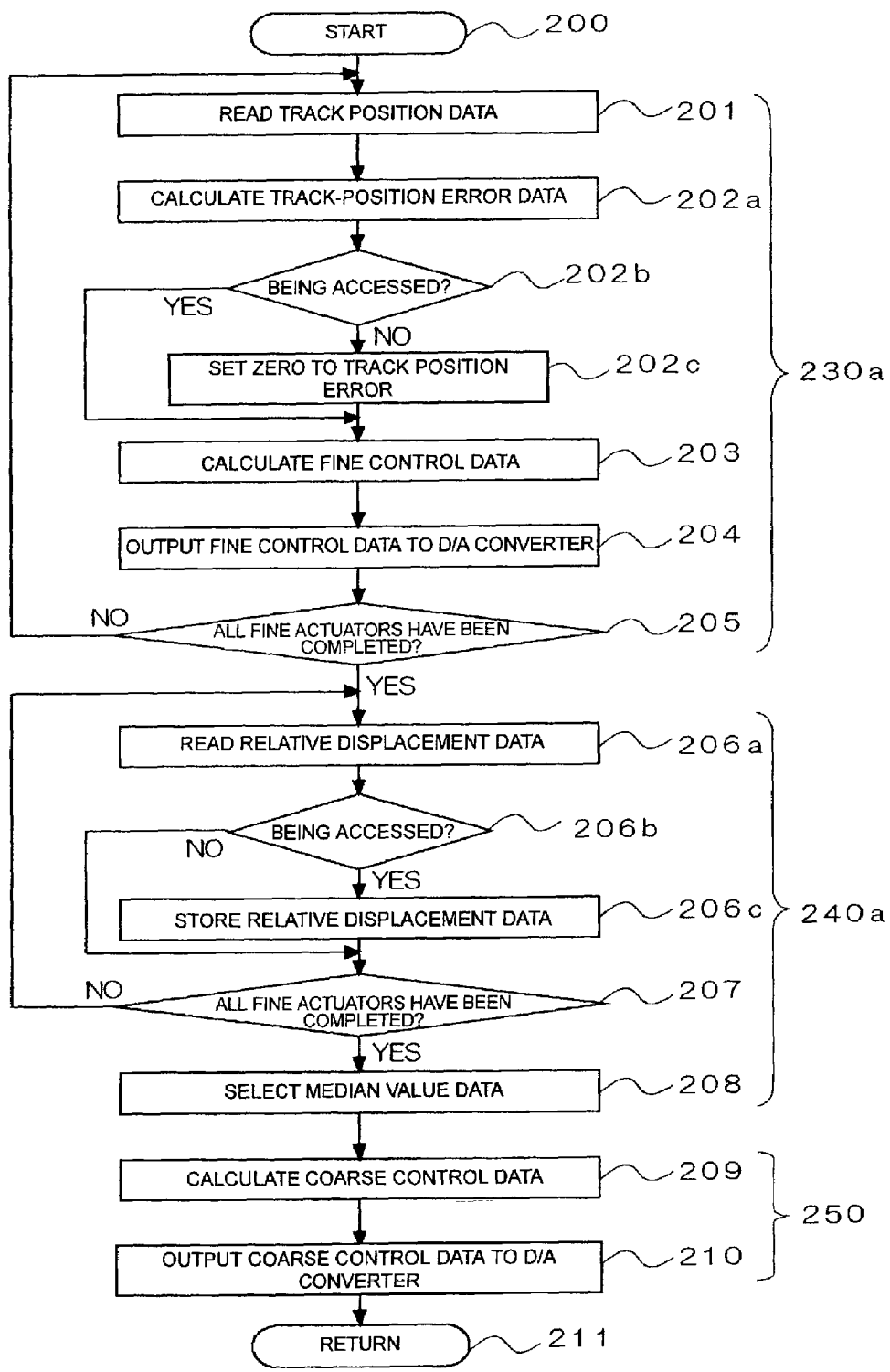
FIG. 44 is a flowchart showing a function configuration of a head positioner according to a seventeenth embodiment.

Hereinbelow, a seventeenth embodiment will be described with reference to FIGS. 41 and 44. The seventeenth embodiment is a software configuration corresponding to the thirteenth embodiment shown in FIG. 38.

At step 201, track position data indicative of the current track is read from the servo information that has been read by the head-position detecting unit 114. At step 202*a*, the track position data is subtracted from desired position data, and resultant track-position error data is temporarily stored. In addition, intratrack position error data is detected from a burst signal contained in the servo information, and detected data is temporarily stored. At step 202*b*, using information of access command data generated by the main program, a determination is made as to whether the head 2 is in access to a desired track. If the head 2 is not in access to the desired track, the operation proceeds to step 202*c*, and the track-position error data is set to zero. If the head 2 is in access to the positioned on-track, the operation skips to step 203. At step 203, the stored track-position error data and the intratrack position error data are read out, the read-out items of data are synthesized to be head-position error data. In addition, phase-compensation calculations are performed for the head-position error data by using predetermined phase characteristics and frequency characteristics and a predetermined gain, and outputs of the calculations are temporarily stored as fine control data. At step 204, the fine control data is output to the D/A converter 116. The D/A converter 116 outputs a fine drive signal u(B) generated according to the fine control data to the fine actuator 52. At step 205, the program verifies as to whether the processes have been completed for all the fine actuators 52(N pieces). If the processes have not yet been completed, the program executes the routine starting with step 201 for the remaining fine actuators 52. If the processes have been completed for all the fine actuators 52, the operation proceeds to a subsequent step. The above-described routine of steps 201 to 205 provides a function of fine control means 230*a* for controlling the fine actuators 52. In the subsequent steps 206*a* to 208, steps similar to those shown in FIG. 43. Other operations are the same as those in the fifteenth embodiment; therefore, descriptions thereof will be omitted herefrom.

The present embodiment is based on the same operation principles described for the positioning control system of the twelfth embodiment shown in FIG. 38. The present embodiment enables advantages similar to those of the thirteenth embodiment to be obtained.

(Eighteenth Embodiment)

Figure 45:
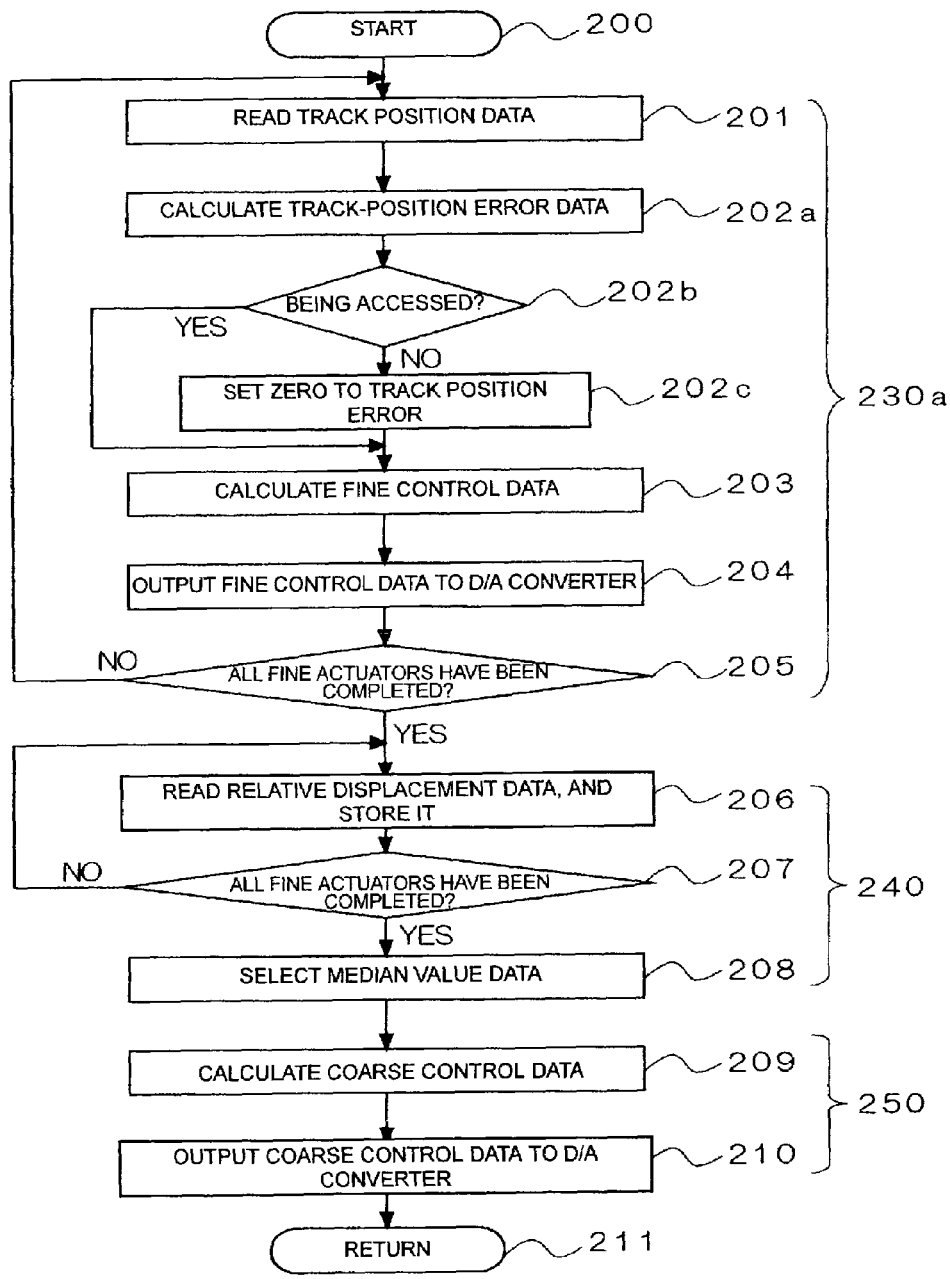
FIG. 45 is a flowchart showing a function configuration of a head positioner according to an eighteenth embodiment.

Hereinbelow, an eighteen embodiment will be described with reference to FIGS. 41 and 45. The eighteenth embodiment is a software configuration corresponding to the fourteenth embodiment shown in FIG. 42. Steps 202*a* to 202*c* in the seventeenth embodiment instead of step 202 in fifteenth embodiment shown in FIG. 42 are applied to the present embodiment.

In the above-described configuration, either a read only memory (ROM) or a random access memory (RAM) for storing data downloaded from other recording media may be used for the memory 111 provided as a machine-readable recording medium. In addition, the control program 112 may be stored in a memory integrated with a microprocessor.

Each of the fifteenth to eighteenth embodiments has been described such that the relative displacement data based on the detection signal indicating the detected amount of displacement of the fine actuator 52 is used for the relative displacement data used in the median-value selecting means.

However, the relative displacement data may be data generated in a step that functions as state predicting means formed by modeling each of the individual fine actuators. Also in this case, similar advantages is obtained In each of the fifteenth to eighteenth embodiments, a case can occur in which, for example, the number of items of relative displacement data is an even number, or data items having identical values occur. In such a case, a step may be provided in which the one having a smaller value is selected from two items of the relative displacement data.

Also in an optical disk drive, tracking is performed by using a dual-stage actuator method using, for example, a coarse-positioning stepping motor or DC motor and an optical pickup. In a long-stroke seeking operation in the optical disk drive, the DC motor is driven for coarse positioning, and the optical pickup drives the head to follow up to a desired track. At this time, in order to prevent the optical pickup from exceeding a predetermined operation range, the DC motor is controlled so that, among position errors occurring in the control of the optical pickup, a DC component converges to zero. In addition, control is performed for a track-following operation, a one-track seeking operation, or the like so that a head-position error from a desired position is fed back to the fine actuator, and a head-displacement detection signal is converged to zero. Concurrently, in order to improve the operation speed, control is performed for a long seeking operation such that the amount of head movement associated with the coarse actuator is calculated according to the head-displacement detection signal, and the position error between the head movement amount and the desired position is fed back to the fine actuator. Moreover, in order to improve the operation speed, data of the desired position is input also to the coarse actuator in a tracking operation toward a desired position exceeding the operation range of the fine actuator. This invention can even be applied to the above-described optical disk drive.

Each of the above-described embodiments having the hardware configuration may be implemented by a software configuration using a microcomputer. In addition, each of the above-described embodiments having the software configuration may be implemented by a hardware configuration.

While there has been described what is at present considered to be preferred embodiments of the invention, it will be understood that various modifications may be made therein, and it is intended to cover in the appended claims all such modifications as fall within the true spirit and scope of the invention.

What is claimed is:

1. A head positioner having a configuration employing a dual-stage actuator method, wherein:
    positioning control is performed for a write/read head for accessing an information storage disk by using a coarse actuator and a fine actuator;
    the fine actuator is configured using a piezoelectric device; and
    the level of a drive signal to be fed to the fine actuator using the piezoelectric device is set equal to or lower than a threshold at which property deterioration of the piezoelectric device is caused by an electrochemical reaction.

2. The head positioner according to claim 1, wherein the piezoelectric device of the fine actuator is a thin-film PZT device composed of lead, zirconia, and titanium.

3. The head positioner of claim 1, wherein the threshold is set in a state including a lead decomposition voltage range.

4. The head positioner according to claim 1, wherein the threshold is set under conditions in which a water decomposition voltage range is included, and the piezoelectric device has an electric resistance of 1 MΩ or higher.

5. The head positioner according to claim 1, wherein the threshold is set under conditions in which a water decomposition voltage range is included, and the relationship between a voltage level V of the drive signal for the fine actuator and a current I flowing through the piezoelectric device is expressed as $$V/I > 10^6 [\Omega].$$

6. The head positioner according to claim 1, wherein the threshold is set under conditions in which a water decomposition voltage range is included, and the relationship between a voltage level V of the drive signal for the fine actuator and a film thickness t of the piezoelectric device is expressed as $$V/t < 2 \times 10^7 [V/m].$$

7. The head positioner according to claim 1, wherein the threshold is set under conditions in which the piezoelectric device has an electric resistance of 1 MΩ or higher in a 500-hour continuous operation in an environment having a temperature of 85° C. and a humidity of 90%.

8. The head positioner according to claim 1, wherein the fine control system performs controlling and driving operations such that:
    when an amount of compensation by the fine actuator is zero, the fine control system outputs a specific value of an offset voltage at a voltage of zero for the piezoelectric device or at ½ of the threshold; and
    when the amount of compensation is other than zero, the fine control system adds a positive/negative voltage corresponding the amount of compensation to the offset voltage.

9. The head positioner according to claim 8, wherein the offset voltage in the drive signal for the fine actuator is equal to or lower than a water decomposition voltage (including zero).

10. The head positioner according to claim 1, wherein the electrochemical reaction is caused by moisture permeating through the piezoelectric device during processing or in the atmospheric environment during operation.

11. A head positioner comprising:
    a coarse actuator and a fine actuator for performing positioning-control according to a dual-stage actuator method for a write/read head provided for accessing an information storage disk; and
    a positioning control unit for controlling the coarse actuator and the fine actuator, wherein: the fine actuator is configured using a piezoelectric device;
    the positioning control unit comprises
    a coarse control system comprising a coarse drive unit for driving at least the coarse actuator and coarse control unit for controlling the coarse drive unit, and
    a fine control system comprising a fine drive unit for driving the fine actuator and a fine control unit for controlling the fine drive unit; and
    the head positioner further comprises a driving-signal limiting unit for limiting the level of a fine control signal fed from the fine control unit to the fine drive unit to be equal to or lower than a threshold at which property deterioration of the piezoelectric device is caused by an electrochemical reaction.

12. The head positioner according to claim 11, further comprising:
a property inspection unit for performing detection of the relationship between a command-driving voltage for the fine actuator and a current flowing through the piezoelectric device; and
a limitation-voltage modifying unit for modifying a threshold of the command-driving voltage according to the result of the detection performed by the property inspection unit.

13. The head positioner according to claim 11, further comprising a time function filter for limiting a time in which the driving voltage is continually output according to a command-driving voltage when the command-driving voltage for the fine actuator is higher than or equal to the threshold.

14. The head positioner according to claim 11, wherein the electrochemical reaction is caused by moisture permeating through the piezoelectric device during processing or in the atmospheric environment during operation.

15. A head positioner having a configuration employing a dual-stage actuator method, wherein:
positioning control is performed for a write/read head for accessing an information storage disk by using a coarse actuator and a fine actuator;
the fine actuator is configured using a piezoelectric device;
compensation is performed through operation of the coarse actuator for a positional deviation of the head that occurs from a desired track because of a disturbance exceeding a predetermined operation range of the fine actuator; and
the level of a drive signal to be fed to the fine actuator using the piezoelectric device is set equal to or lower than a threshold at which property deterioration of the piezoelectric device is caused by an electrochemical reaction.

16. The head positioner according to claim 15, wherein the electrochemical reaction is caused by moisture permeating through the piezoelectric device during processing or in the atmospheric environment during operation.

17. A head positioner comprising:
a coarse actuator and a fine actuator for performing positioning-control according to a dual-stage actuator method for a write/read head provided for accessing an information storage disk; and
a positioning control unit for controlling the coarse actuator and the fine actuator, wherein:
the fine actuator is configured using a piezoelectric device;
the positioning control unit comprises
a coarse control system comprising a coarse drive unit for driving at least the coarse actuator and coarse control unit for controlling the coarse drive unit, and
a fine control system comprising a fine drive unit for driving the fine actuator and a fine control unit for controlling the fine drive unit; and
the head positioner further comprises
a position-error separating unit for separating compensation so as to be performed through operation of the coarse actuator for a positional deviation of the head that occurs from a desired track because of a disturbance exceeding a predetermined operation range of the fine actuator; and
a driving-signal limiting unit for limiting the level of a fine control signal fed from the fine control unit to the fine drive unit to be equal to or lower than a threshold at which property deterioration of the piezoelectric device is caused by an electrochemical reaction.

18. A head positioner having a configuration employing a dual-stage actuator method, wherein:
positioning control is performed for a write/read head for accessing an information storage disk by using a coarse actuator and a fine actuator;
the fine actuator is configured using a piezoelectric device;
compensation is performed through operation of the coarse actuator for a positional deviation of the head that occurs from a desired track because of a rotational synchronization disturbance of the disk; and
the level of a drive signal to be fed to the fine actuator using the piezoelectric device is set equal to or lower than a threshold at which property deterioration of the piezoelectric device is caused by an electrochemical reaction.

19. A head positioner comprising:
a coarse actuator and a fine actuator for performing positioning-control according to a dual-stage actuator method for a write/read head provided for accessing an information storage disk; and
a positioning control unit for controlling the coarse actuator and the fine actuator, wherein:
the fine actuator is configured using a piezoelectric device;
the positioning control unit comprises
a coarse control system comprising a coarse drive unit for driving at least the coarse actuator and coarse control unit for controlling the coarse drive unit, and
a fine control system comprising a fine drive unit for driving the fine actuator and a fine control unit for controlling the fine drive unit; and
the head positioner further comprises
a disturbance compensating unit for performing compensation in the coarse control system for a positional deviation of the head that occurs from a desired track because of a rotational synchronization disturbance of the disk; and
a driving-signal limiting unit for limiting the level of a fine control signal fed from the fine control unit to the fine drive unit to be equal to or lower than a threshold at which property deterioration of the piezoelectric device is caused by an electrochemical reaction.

20. The head positioner according to claim 19, wherein the positioning control unit comprises:
a disturbance compensating unit for performing compensation at a track following event for a positional deviation of the head from a desired track that occurs because of a rotational synchronization disturbance of the disk;
a synchronous-disturbance compensation regulating unit for individually performing weighting of amounts of compensation performed by the disturbance compensating unit for the coarse control system and the fine control system, and then providing weighting-added amounts of compensation to the coarse control system and the fine control systems.

21. The head positioner according to claim 19, wherein the positioning control unit comprises:
a steady-deviation compensating unit for causing the head to follow to the desired track in opposition to a steady disturbance such as friction;
a steady-deviation compensation regulating unit for performing weighting of an output of the steady-deviation compensating unit in each of the two control units for the reason that the fine control unit does not output a control amount exceeding a threshold at a track following event.

22. The head positioner according to claim 19, wherein:
the coarse control system comprises a low-frequency filter for providing the coarse actuator with an amount as a control amount obtained through multiplication of a weighting function having weighting effects in a low frequency band with the control amount; and
the fine control system comprises a high-frequency filter for providing the fine actuator with an amount as a control amount obtained through multiplication of a weighting function having weighting effects in a high frequency band with the control amount.

23. The head positioner according to claim 19, wherein the positioning control unit comprises:
a steady-deviation compensating unit for causing the head to follow to the desired track in opposition to a steady disturbance such as friction; and
a steady-deviation compensation regulating unit for performing weighting of an output of the steady-deviation compensating unit in each of the two control units for the reason that the fine control unit does not output a control amount exceeding a threshold at a track following event.

24. The head positioner according to claim 19, wherein:
the coarse control system comprises a low-frequency filter for providing the coarse actuator with an amount as a control amount obtained through multiplication of a weighting function having weighting effects in a low frequency band with the control amount; and
the fine control system comprises a high-frequency filter for providing the fine actuator with an amount as a control amount obtained through multiplication of a weighting function having weighting effects in a high frequency band with the control amount.

25. A head positioner comprising:
a plurality of write/read heads for individually accessing a plurality of concentric information storage disks;
a plurality of fine actuators for finely displacing the individual heads;
a plurality of head supporting mechanisms for supporting the individual fine actuators; and
a coarse actuator for driving the plurality of head supporting mechanisms in batches, wherein:
according to a head position signal read out by each of the head from each of the disks, control is performed for each of the fine actuators so that the corresponding head follows a desired track; and
a median value is selected from relative displacement values of the individual fine actuators, and control is performed for the coarse actuator according to the selected median value.

26. The head positioner according to claim 25 further comprising a control unit for controlling the displacement of each of the fine actuators and the movement of each of the head supporting mechanisms according to the coarse actuator, wherein the control unit comprises:
a plurality of fine positioning control units that individually generate a head-position error signal representing a differential between a head position signal contained in servo information stored on the disk and which is reproduced (read out) in units of each of the heads and a desired position signal of each of the heads, that individually control the fine actuators according to the head-position error signal, and that individually perform positioning control in unit of the head;
a median-value selecting unit for selecting the relative displacement signal, as a median-value signal, ranked in the center of the plurality of relative displacement signals sent from the individual fine actuators; and
a coarse control system for performing control according to the selected median-value signal for the batch movements of the head supporting mechanisms according to the coarse actuator.

27. The head positioner according to claim 26, wherein the median-value selecting unit performs:
selection of relative displacement signals as candidates of the median-value selection, the relative displacement signals corresponding to active access command signals for the heads, from the plurality of relative displacement signals sent from the individual fine actuators; and
selection of the relative displacement signal ranked in the center as the median-value signal from the plurality of relative displacement signals selected as the candidates.

28. The head positioner according to claim 26, wherein the fine positioning control unit performs:
positioning control for the head according to a synthetic signal of a track position signal contained in the servo information stored on the disk and which is reproduced (read out) in units of each of the head and a burst demodulation signal when an access command signal for the head is active; and
positioning control for the head by using the burst demodulation and without using the track position signal when the access command signal is inactive.

29. The head positioner according to claim 26, wherein:
the median-value selecting unit performs selection of relative displacement signals as candidates of the median value to be selected, the relative displacement signals corresponding to active access command signals for the heads, from the plurality of relative displacement signals sent from the individual fine actuators, and selection of the relative displacement signal ranked in the center as the median-value signal from the plurality of relative displacement signals selected as the candidates; and
the fine positioning control unit performs positioning control for the head according to a synthetic signal of a track position signal contained in the servo information stored on the disk and which is reproduced (read out) in units of each of the head and a burst demodulation signal when an access command signal for the head is active, and positioning control for the head by using the burst demodulation and without using the track position signal when the access command signal is inactive.

30. The head positioner according to claim 26, wherein, when the number of the relative displacement signals for selecting the median-value signal is an even number, the relative displacement signal corresponding to smaller one of two median-value signals is selected as the median-value signal.

31. The head positioner according to claim 26, wherein the relative displacement signal is generated by a predictor formed by modeling each of the fine actuators.

32. The head positioner according to claim 26, wherein the control unit comprises:
a microprocessor capable of controlling the individual fine actuators and the coarse actuator;
a memory for storing a program used to operate the microprocessor; and
the program used to operate the microprocessor, wherein the program comprises, a head-positioning control program that is read and executed by the microprocessor to implement functions of the head positioning.

33. The head positioner according to claim 32, wherein the head-positioning control program comprises:
a plurality of fine positioning control means that individually generate head-position error data representing a differential between head position data contained in servo information stored on the disk and which is reproduced (read out) in units of each of the head and desired position data of each of the heads, that individually control the fine actuators according to the head-position error data, and that individually perform positioning control in units of the head;
a median-value selecting means for selecting the relative displacement data, as median-value data, ranked in the center of the plural items of relative displacement data sent from the individual fine actuators; and
a coarse control system means for performing control according to the selected median-value data for the batch movements of the head supporting mechanisms according to the coarse actuator.

34. The head positioner according to claim 33, wherein the median-value selecting means performs:
selection of relative displacement data as candidates of the median value to be selected, the relative displacement data corresponding active access command data for the heads, from the plural items of relative displacement data sent from the individual fine actuators; and
selection of the relative displacement data ranked in the center as the median-value data from the plural items of relative displacement data selected as the candidates.

35. The head positioner according to claim 33, wherein the fine positioning control means performs:
positioning control for the head according to a synthetic data of a track position data contained in the servo information stored on the disk and which is reproduced (read out) in units of each of the head and burst demodulation data when access command data for the head is active; and
positioning control for the head by using the burst demodulation and without using the track position data when the access command data is inactive.

36. The head positioner according to claim 33, wherein:
the median-value selecting means performs selection of items of relative displacement data as candidates of the median value to be selected, the relative displacement data corresponding to active access command data for the heads, from the plural items of relative displacement data sent from the individual fine actuators; and
selection of the relative displacement data ranked in the center as the median-value data from the plurality of relative displacement data selected as the candidates, and
the fine positioning control means performs positioning control for the head according to synthetic data of track position data contained in the servo information stored on the disk and which is reproduced (read out) in units of each of the head and a burst demodulation data when access command data for the head is active; and
positioning control for the head by using the burst demodulation and without using the track position data when the access command data is inactive.

37. The head positioner according to claim 33, wherein, when the number of items of the relative displacement data for selecting the median-value data is an even number, the relative displacement data corresponding to smaller one of two items of the median-value data is selected as the median-value data.

38. The head positioner according to claim 33, wherein the relative displacement data is generated by a predictor formed by modeling each of the fine actuators.

39. An information recording/replaying apparatus comprising:
a rotatable information storage disk;
a write/read head, for,accessing the disk;
a fine actuator for finely displacing the head;
a head supporting mechanism for supporting the fine actuator;
a coarse actuator for driving the head supporting mechanism; and
a positioning control unit for performing positioning control for the write/read head according to a dual-stage actuator method using the coarse actuator and the fine actuator, wherein:
the fine actuator is configured using a piezoelectric device; and
the level of a drive signal to be fed to the fine actuator using the piezoelectric device is set equal to or lower than a threshold at which property deterioration of the piezoelectric device is caused by an electrochemical reaction.

40. The information recording/replaying apparatus according to claim 39, wherein the electrochemical reaction is caused by moisture permeating through the piezoelectric device during processing or in the atmospheric environment during operation.

41. An information recording/replaying apparatus comprising:
a rotatable information storage disk;
a write/read head for accessing the disk;
a fine actuator for finely displacing the head;
a head supporting mechanism for supporting the fine actuator;
a coarse actuator for driving the head supporting mechanism; and
a positioning control unit for performing positioning control for the write/read head according to a dual-stage actuator method using the coarse actuator and the fine actuator, wherein:
the fine actuator is configured using a piezoelectric device;
the positioning control unit comprises
a coarse control system comprising a coarse drive unit for driving at least the coarse actuator and coarse control unit for controlling the coarse drive unit, and
a fine control system comprising a fine drive unit for driving the fine actuator and a fine control unit for controlling the fine drive unit; and
the head positioner further comprises a driving-signal limiting unit for limiting the level of a fine control signal fed from the fine control unit to the fine drive unit to be equal to or lower than a threshold at which property deterioration of the piezoelectric device is caused by an electrochemical reaction.

42. The head positioner according to claim 41, further comprising:
a property inspection unit for performing detection of the relationship between a command-driving voltage for the fine actuator and a current flowing through the piezoelectric device; and a limitation-voltage modifying unit for modifying a threshold of the command-driving voltage according to the result of the detection performed by the property inspection unit.

43. The head positioner according to claim 41, further comprising a time function filter for limiting a time in which the driving voltage is continually output according to a command-driving voltage when the command-driving voltage for the fine actuator is higher than or equal to the threshold.

44. The information recording/replaying apparatus according to claim 35, wherein the electrochemical reaction is caused by moisture permeating through the piezoelectric device during processing or in the atmospheric environment during operation.

45. An information recording/replaying apparatus comprising:
a rotatable information storage disk;
a write/read head for accessing the disk;
a fine actuator for finely displacing the head;
a head supporting, mechanism for supporting the fine actuator;
a coarse actuator for driving the head supporting mechanism; and
a positioning control unit for performing positioning control for the write/read head according to a dual-stage actuator method using the coarse actuator and the fine actuator, wherein:
the fine actuator is configured using a piezoelectric device;
compensation is performed through operation of the coarse actuator for a positional deviation of the head that occurs from a desired track because of a disturbance exceeding a predetermined operation range of the fine actuator; and
the level of a drive signal to be fed to the fine actuator using the piezoelectric device is set equal to or lower than a threshold at which property deterioration of the piezoelectric device is caused by an electrochemical reaction.

46. The information recording/replaying apparatus according to claim 45, wherein the electrochemical reaction is caused by moisture permeating through the piezoelectric device during processing or in the atmospheric environment during operation.

47. An information recording/replaying apparatus comprising:
a rotatable information storage disk;
a write/read head for accessing the disk;
a fine actuator for finely displacing the head;
a head supporting mechanism for supporting the fine actuator;
a coarse actuator for driving the head supporting mechanism; and
a positioning control unit for performing positioning control for the write/read head according to a dual-stage actuator method using the coarse actuator and the fine actuator, wherein:
the fine actuator is configured using a piezoelectric device;
the positioning control unit comprises
a coarse control system comprising a coarse drive unit for driving at least the coarse actuator and coarse control unit for controlling the coarse drive unit, and
a fine control system comprising a fine drive unit for driving the fine actuator and a fine control unit for controlling the fine drive unit; and
the head positioner further comprises
a position-error separating unit for separating compensation so as to be performed through operation of the coarse actuator for a positional deviation of the head that occurs from a desired track because of a disturbance exceeding a predetermined operation range of the fine actuator; and
a driving-signal limiting unit for limiting the level of a fine control signal fed from the fine control unit to the fine drive unit to be equal to or lower than a threshold at which property deterioration of the piezoelectric device is caused by an electrochemical reaction.

48. An information recording/replaying apparatus comprising:
a rotatable information storage disk;
a write/read head for accessing the disk;
a fine actuator for finely displacing the head;
a head supporting mechanism for supporting the fine actuator;
a coarse actuator for driving the head supporting mechanism; and
a positioning control unit for performing positioning control for the write/read head according to a dual-stage actuator method using the coarse actuator and the fine actuator, wherein:
the fine actuator is configured using a piezoelectric device;
compensation is performed through operation of the coarse actuator for a positional deviation of the head that occurs from a desired track because of a rotational synchronization disturbance of the disk; and
the level of a drive signal to be fed to the fine actuator using the piezoelectric device is set equal to or lower than a threshold at which property deterioration of the piezoelectric device is caused by an electrochemical reaction.

49. An information recording/replaying apparatus comprising:
a rotatable information storage disk;
a write/read head for accessing the disk;
a fine actuator for finely displacing the head;
a head supporting mechanism for supporting the fine actuator;
a coarse actuator for driving the head supporting mechanism; and
a positioning control unit for performing positioning control for the write/read head according to a dual-stage actuator method using the coarse actuator and the fine actuator, wherein:
the fine actuator is configured using a piezoelectric device;
the positioning control unit comprises
a coarse control system comprising a coarse drive unit for driving at least the coarse actuator and coarse control unit for controlling the coarse drive unit, and
a fine control system comprising a fine drive unit for driving the fine actuator and a fine control unit for controlling the fine drive unit; and
the head positioner further comprises
a disturbance compensating unit for performing compensation in the coarse control system for a positional deviation of the head that occurs from a desired track because of a rotational synchronization disturbance of the disk; and
a driving-signal limiting unit for limiting the level of a fine control signal fed from the fine control unit to the fine drive unit to be equal to or lower than a threshold at which property deterioration of the piezoelectric device is caused by an electrochemical reaction.

50. The head positioner according to claim 49, wherein the positioning control unit comprises:

a disturbance compensating unit for performing compensation at a track following event for a positional deviation of the head from a desired track that occurs because of a rotational synchronization disturbance of the disk; and a synchronous-disturbance compensation regulating unit for individually performing weighting of amounts of compensation performed by the disturbance compensating unit for the coarse control system and the fine control system, and then providing weighting-added amounts of compensation to the coarse control system and the fine control systems.

* * * * *